United States Patent
Burns, Sr. et al.

(10) Patent No.: US 11,232,383 B1
(45) Date of Patent: Jan. 25, 2022

(54) SYSTEMS AND METHODS FOR TRANSFORMATIVE CORPORATE FORMATION AND AUTOMATED TECHNOLOGY ASSESSMENT

(71) Applicant: SPG Holding, LLC, Chantilly, VA (US)

(72) Inventors: Thomas D. Burns, Sr., Chantilly, VA (US); Dan B. Tolley, Purcellville, VA (US); Nicole M. Athey, Charlottesville, VA (US)

(73) Assignee: SPG HOLDING, LLC, Chantilly, VA (US)

( * ) Notice: Subject to any disclaimer, the term of this patent is extended or adjusted under 35 U.S.C. 154(b) by 0 days.

(21) Appl. No.: 17/191,168

(22) Filed: Mar. 3, 2021

Related U.S. Application Data

(60) Provisional application No. 62/986,344, filed on Mar. 6, 2020.

(51) Int. Cl.
| | |
|---|---|
| *G06Q 10/06* | (2012.01) |
| *G06Q 50/18* | (2012.01) |
| *G06F 16/951* | (2019.01) |
| *G06Q 30/02* | (2012.01) |
| *G06N 20/00* | (2019.01) |

(52) U.S. Cl.
CPC ....... *G06Q 10/0637* (2013.01); *G06F 16/951* (2019.01); *G06N 20/00* (2019.01); *G06Q 10/067* (2013.01); *G06Q 10/0635* (2013.01); *G06Q 10/06393* (2013.01); *G06Q 30/0204* (2013.01); *G06Q 50/184* (2013.01)

(58) Field of Classification Search
CPC .......... G06Q 10/0637; G06Q 10/0635; G06Q 10/06393; G06Q 10/067; G06Q 30/0204; G06Q 50/184; G06N 20/00; G06F 16/951
USPC ....................................................... 705/7.36
See application file for complete search history.

(56) References Cited

U.S. PATENT DOCUMENTS

| | | | |
|---|---|---|---|
| 7,584,117 | B2 | 9/2009 | Bubner |
| 7,966,212 | B2 | 6/2011 | Kasravi et al. |
| 8,170,894 | B2 | 5/2012 | Mtts |
| 2003/0182166 | A1 | 9/2003 | Silver |
| 2004/0054545 | A1 | 3/2004 | Knight |
| 2006/0247943 | A1 | 11/2006 | Kapoor |

(Continued)

FOREIGN PATENT DOCUMENTS

AU  2010201574 A1 * 5/2010 ............. G06Q 10/06

OTHER PUBLICATIONS

Cuny, et al., The Staging of Venture Capital Financing: Milestone vs. Rounds, EFA 2005 Moscow meetings paper (2005) (Year: 2005).*

(Continued)

*Primary Examiner* — Charles Guiliano
(74) *Attorney, Agent, or Firm* — Neo IP

(57) ABSTRACT

A system and method for automated analysis, evaluation, and assessment of technology, intellectual property, innovation, corporate management resources and structure and commercialization opportunity for applications for new business ventures and investment including an automatic rating system to increase commercial impact success rates, commercial development rates and improve return on investment.

20 Claims, 47 Drawing Sheets
(46 of 47 Drawing Sheet(s) Filed in Color)

(56) References Cited

U.S. PATENT DOCUMENTS

| | | |
|---|---|---|
| 2009/0216589 A1* | 8/2009 | Ricci .................... G06Q 50/184 |
| | | 705/36 R |
| 2012/0203595 A1 | 8/2012 | Patterson |
| 2013/0346146 A1 | 12/2013 | Jaster et al. |
| 2014/0046736 A1* | 2/2014 | Sanders ................. G06Q 50/01 |
| | | 705/12 |
| 2017/0032386 A1* | 2/2017 | Borza ................. G06Q 30/0201 |
| 2018/0053092 A1 | 2/2018 | Hajizadeh |
| 2018/0293678 A1 | 10/2018 | Shanahan |
| 2019/0332978 A1 | 10/2019 | Farooq et al. |
| 2019/0340516 A1 | 11/2019 | Kumar |

OTHER PUBLICATIONS

Yang, Venture capital decision based on FPGA and machine learning, Microprocessors and Microsystems, p. 103457 (2020) (Year: 2020).*

* cited by examiner

| TCF Track | Phase 0 Unique Opportunity Identified? | CF |
|---|---|---|
| Market 360 | | |
| | Macro Market Characterized | |
| | Micro Market Characterized | |
| | Clear Pain Point/Need Defined | |
| | $100M+ Addressable/Target Market | |
| | Favorable Competitive Landscape | |
| | League of User Candidates Identified | |
| | Potential Partners Identified | |
| Innovation | | |
| | One-of-One Solution Identified | |
| | Tech Rounding Requirements Defined | |
| | Technology Readiness Level Quantified | |
| | Initial Tech Assumptions Evaluated | |
| | Relevant Regulations/Policies Defined | |
| | Defined LOE and Funds to Advance Tech | |
| | Patent/IP Protection Plan Devised | |
| Business Operations | | |
| | Proposed TMT membership meets criteria | |
| | Proposed BoD membership meets criteria | |
| | Develop Solution Concept | |
| | Build out TO System Model | |
| | Approved Quantum Business Plan (QBP) | |
| | Determine Market Viability of Solution | |
| | Estimate Cost to Mature Solution Set | |
| | Identify Candidate Partnerships | |
| Sales and Marketing | | |
| | Potential Customer Communities Identified | |
| | Initial Pricing Model and Strategy | |
| | Customer Acquisition Timelines Scoped | |
| | Preliminary Marketing Approach Set | |
| | Preliminary Marketing Pathways Id'ed | |
| | Societal Impact Level Characterized | |
| CF: Confidence Factor on a Scale of 1-5 | | |
| Metrics used for auto-eval of the TCF process ICF: Initial Confidence Factor MCF: Mid-phase Confidence Factor PPR: Post-Phase Review | | |

FIG. 9C

| | | | |
|---|---|---|---|
| Marketing Products | | | |
| Support | Input to Product concept development (w/ Innov) | Input to MVP development (w/ Innov) | Capital raise activities (w/CEO, Pres) |
| | Prep for LoG | Prep for VCP | |
| Play/Scope | Early distribution, pricing, marketing plans | Refine distribution, pricing, marketing plans | |
| | | Draft brand guidelines | |
| | | Scope and budget website design | |
| Deliver | Hype video | Product/Feature benefits video | Investor video |
| | | Draft marketing and sales budget needs | Updated budget needs for launch |
| | | | Preliminary S&OP margin and revenue projections and timing (w/ BusOps) |
| | | | Final distribution, pricing & marketing plans |
| | | | Brand guidelines |
| | | | Live website |
| | | | Testimonial, company hi-lite videos |
| | | | Activate approved S&OP |
| Sales Products | | | |
| Support | | | |
| Play/Scope | Draft Go-to-Market (GTM) strategy | Scope sales toolkits and budget | |
| | Sales team demo/equipment needs | | |
| | Salesperson "DNA" hiring requirements | | |
| Deliver | Define sales team org structure | Finalize GTM plan | Activate approved GTM plan |
| | | Activate sales team hiring plans | |
| | | Activate sales team training plans | |

FIG. 16

SPG Process and Asset Library

TCF relies upon standardized processes, templates and tools wherever possible to enable consistency, efficiency and accountability. The TCF governance process expects and enforces the use of all TCF standards, so it is imperative that TCF practitioners know exactly where to go to find every resource necessary to follow the TCF process. The TCF Process and Asset Library (PAL) is a location for all TCF documentation, data and tools. To avoid dispersal of non-authoritative and disparate versions of key documents across the enterprise, the Process and Asset Library serves as a one-stop-shop for all elements necessary to comply with the TCF process. This repository allows easy access to the most up-to-date and authoritative static documentation.

Within the static portion of the repository live templates, supplemental processes, procedures, and other documents needed to maintain consistency across TCFs. These are items that do not change with a greater frequency than quarterly or yearly. An accurate catalogue of available resources is listed below that itemizes each document, its author, its purpose or use case and its date of last revision. Each item is linked to the document, allowing immediate access to any item in the list.

There are organizational standards applied to all resources in the Process and Asset Library and there are rules assigned within both SPG and each TD indicating who has the authority and responsibility to maintain each element. Multiple copies of the source document are not stored in this location and anything in the library is considered the authoritative version. Archived copies of previous documents are kept but not available in an active state in the repository. Any item in the Static List is approved for use. All suggested or modified changes are submitted through the TCF vetting process and are directed to the author of the document. This ensures that the suggested changes are not unsystematically cause issues and that cross-document consistency is maintained.

The SPG Process and Asset Library is the authoritative source for all SPG processes, documents, templates and tools. Documents are accessible for use by all SPG and SPG TDs. Templates can be modified for individual TD use but source documents are not to be changed except by the author noted below. Requests for modification can be made via the Idea tool. Individual copies are not to be maintained. All SPG employees are encouraged to configure their account to "watch" this Confluence page to enable notifications of changes made to documents.

Static Contents List

| Item # | Item Name | Description | Category | TCF Track Focus | Relevant TCF Phase(s) | Author | Revision Date |
|---|---|---|---|---|---|---|---|
| 1 | TCF Executive Summary | Two page overview of Transformative Corporate Formation (TCF) | | | | | |
| 2 | TCF Process | TCF Process Execution Manual and Reference Book *THIS IS TO BE OPENED ONLY ON AN SPG COMPUTER - DO NOT DISTRIBUTE* | Process | All | All | Athey | xx.xx.Mon.xxxx |
| 3 | TCF Provisional Patent Application and Associated Drawings | TCF Provisional Patent Application filed March 11, 2020 | Reference Document | All | Reference Document | Athey | xx.xx.Mon.xxxx |

| Review Type | Meeting Objective | Participants | Frequency |
|---|---|---|---|
| Management Status Review | Top tier discussion of opportunities, risks and resource needs. TOs report on any significant changes to the QEP and upcoming events of interest to the CEO. This is not a detailed status review of each TO, but rather a forum to highlight emergent opportunities, risks, issues and/or resource needs. | Chaired by: CEO Executives, TO CEOs, TO Presidents | Monthly |
| Engineering Status Review | Top tier discussion of TO technical resource needs in the next 1-6 months. Topics range from software development needs, licenses, equipment, IV&V support, patent lawyer support, and so forth. | Chaired by: CTO CTO, TO Presidents, TO Innovation Leads | Monthly |
| TO Phase Entry Review | Determine whether the TO has met phase entry criteria and funds are available to progress to the next phase. TO President will present phase output in TCF standard format and CEO in consultation with TMT verifies readiness. | Chaired by: SPG CEO Executives, TO TMT, TO Leads | Directly Prior to Phase Entry |
| TMT In-Phase Planned Review | Detailed review of issues, risks and strategy. TO CEO & President check-in with TMT for vector check in all four TCF tracks. Evaluate progress using normalized TILLER metrics in comparison with QEP baseline. | Chaired by: TO President TO CEO & President, TO TMT, TO Leads | QEP Defined |
| TMT In-Phase Ad Hoc Review | Determine path forward for a specific emergent need. TO CEO & President, relevant area lead(s) and TMT gather as-needed when a schedule, cost of success influencing need arises. | Chaired by: TO President TO CEO & President, TO TMT, TO Leads | As Needed |
| TO End-of-Phase Review | Determine whether the TO has met phase exit criteria and what the entry criteria needs are for the next phase. TO President will present phase output in TCF standard format and CEO in consultation with TMT verifies readiness. | Chaired by: SPG CEO CEO, TO CEO & President, TO TMT, Executives, TO Leads | End of Phase |

SYSTEMS AND METHODS FOR TRANSFORMATIVE CORPORATE FORMATION AND AUTOMATED TECHNOLOGY ASSESSMENT

CROSS REFERENCE TO RELATED APPLICATIONS

This application claims the benefit of U.S. Provisional Application No. 62/986,344 filed Mar. 6, 2020, which is incorporated by reference in its entirety.

BACKGROUND OF THE INVENTION

1. Field of the Invention

The present invention relates generally to automated work systems and, more particularly, to automated work systems and methods for analyzing technology, intellectual property, and corporate management and structure for commercialization.

2. Description of the Prior Art

It is generally known in the prior art to provide systems and/or methods to evaluate innovation potential.

Prior art patent documents include the following:

US Patent Publication No. 2019/0332978 for optimizing a business model of an enterprise by inventor Farooq et al., filed Jul. 9, 2019 and published Oct. 31, 2019, is directed to a method and system for operating an enterprise in accordance with an optimized enterprise level business model. A model optimization engine is iteratively processed based on an updated benchmark value and model, until updating the benchmark value involves changing the benchmark value by less than a predetermined benchmark value error threshold to generate the optimized enterprise-level business model. The enterprise is operated in accordance with the optimized enterprise level business model, including: generating and dynamically displaying real-time performance measures of usage of a computer resource during execution of a business process, determining from the performance measures that the computer resource is a bottleneck, and the computer resource's usage is optimized using the performance measures to reduce data throughput delay and increase throughput of bottleneck operations during execution of the business process. Optimizing the computer resource's usage includes making a computer system work more efficiently and/or use fewer resources.

US Patent Publication No. 2019/0340516 for system and method for quantitatively analyzing an idea by inventor Kumar, filed May 6, 2019, and published Nov. 7, 2019, is directed to a system and a computer-implemented method for quantitatively analyzing an idea, for example, a business idea, and generating decision-based contextual recommendations on the idea. The system selectively extracts data sets associated with a context of an idea input, from one or more internal and external data sources. The system computes measurement indices related to market buzz, competition, investor and entrepreneur interest, domain and technology skill, commitment, funding and geography risk, etc., by performing a quantitative analysis of the data sets with reference to configurable thresholds and/or based on predetermined criteria. The system computes an execution risk index using the user-defined parameters, in communication with one or more of the internal and external data sources The system generates a recommendation score based on the measurement indices and the execution risk index for generating decision-based contextual recommendations to arrive at one or more decisions related to the idea.

US Patent Publication No. 2018/0293678 for method and apparatus for the semi-autonomous management, analysis and distribution of intellectual property assets between various entities by inventor Shanahan, filed Apr. 7, 2017 and published Oct. 11, 2018, is directed to a machine assistance platform for management, analysis, and transaction of intellectual property assets. In an example implementation, a system provides automated analysis of intellectual assets using machine learning techniques. In an example, a software program is provided to continuously manage and monitor government intellectual property office data. In the context of asset analysis, a virtual data room (or deal room) is provided to strategically organize assets. In an intellectual asset analysis example, a machine learning program is provided to interpret intellectual assets. The machine learning program provides insights into the innovation landscape, relevant organizations, products, research and the like. The machine learning program performs tasks analogous to a professional intellectual asset analysis.

US Patent Publication No. 2006/0247943 for system and method for generating and evaluating an innovation by inventor Kapoor, filed Apr. 29, 2005 and published Nov. 2, 2006, is directed to a method for systematically generating and evaluating an innovation. The method includes identifying and selecting an entrepreneurial opportunity. The method also includes conceptualizing the entrepreneurial opportunity into a plurality of potential products and distributing an economic risk. The economic risk is associated with the opportunity. The method also includes envisioning an organization for introducing products and pursing the opportunity.

US Patent Publication No. 2018/0053092 for method and system for innovation management and optimization under uncertainty by inventor Hajizadeh, filed Aug. 22, 2017 and published Feb. 22, 2018, is directed to an integrated and comprehensive method and system for management and optimization of innovation and associated processes under uncertainty. A first embodiment of the invention consists of a data mining and clustering module to compare a new innovation submission with existing internal and external entries and databases, identify similarities and group similar entries together. A second embodiment of the invention is directed towards an intelligent machine learning module to learn from the available data of previous innovation projects and provide estimates of outputs or target values for new innovation submissions or entries. In a third embodiment of the invention, an uncertainty quantification method and system is introduced to handle uncertain inputs of innovation entries and provide probabilistic estimates of outputs by generating a plurality of solutions and scenarios. In a fourth embodiment of the invention, a multiobjective optimization module is used to simultaneously optimize multiple competing objectives.

U.S. Pat. No. 7,966,212 for quantitative alignment of business offerings with the expectations of a business prospect by inventor Kasravi et al., filed Sep. 6, 2007 and issued Jun. 21, 2011, is directed to a method for quantitative alignment of business offerings with the expectations of a business prospect includes accessing a novelty indicator for an offering, the novelty indicator being based on one or more characteristics of the offering and rating an innovation level of the offering. The method further includes accessing an innovation perception indicator for a prospect of the offering, the innovation perception indicator providing an indication of how the prospect views innovation. The method further includes comparing the novelty indicator for the offering with the innovation perception indicator for the prospect to determine if the offering is aligned with the expectations of the prospect. In certain embodiments, the method includes generating a recommendation, possibly in the form of a report, based on the comparison of the novelty indicator for the offering and the innovation perception indicator for the prospect.

US Patent Publication No. 2003/0182166 for entrepreneurship evaluation methods and system by inventor Silver, filed Mar. 19, 2002 and published Sep. 25, 2003, is directed to methods, systems and computer program products for evaluating the probability of success or failure of an entrepreneurial endeavor. A plurality of entrepreneurial issues associated with the entrepreneurial endeavor are generally designated, such that a value is assigned from among a plurality of values to each entrepreneurial issue. A score than be compiled based on a summation of the values respectively assigned the entrepreneurial issues, such that the compiled score is indicative of the probability of success or failure of the entrepreneurial endeavor.

U.S. Pat. No. 8,170,894 for method of identifying innovations possessing business disrupting properties by inventor Yitts, filed Sep. 26, 2008 and issued May 1, 2012, is directed to a method for determining the expected presence of disruptive business process innovations by performing various nonlinear dynamic processes and analysis with both expected data values and referenced data values. After processing the necessary data, the method allows for the prediction of said disruptive business processes innovations (i.e. innovations that have a game changing effect on the market or markets to which the innovation belongs). After determining the presence or non-presence of any disruptive business process innovations, the method comprises steps for providing advice to users of said method. Further, the instant invention encompasses variants of its method that are facilitated by the use of at least one computing machine.

US Patent Publication No. 2004/0054545 for system and method for managing innovation capabilities of an organization by inventor Knight, filed Sep. 13, 2002 and published Mar. 18, 2004, is directed to a method including storing one or more quantitative values associated with one or more innovation capabilities of an organization. Each quantitative value is also associated with one of a plurality of innovation levels. The method also includes determining an expected innovation level for the organization. The expected innovation level comprises one of the plurality of innovation levels. The method further includes identifying an innovation capability having a quantitative value associated with an innovation level that falls below the expected innovation level value. In addition, the method includes identifying one or more solutions associated with the identified innovation capability. The one or more solutions are operable to increase the innovation level associated with the quantitative value.

US Patent Publication No. 2013/0346146 for universal customer based information and ontology platform for business information and innovation management by inventor Jaster et al., filed Jun. 18, 2013 and published Dec. 26, 2013, is directed to a system that may include a search engine coupled to an Outcome Driven Innovation (ODI) repository. The system may include a segmentation engine having segmentation tools that segments a market using segmentation tools. A metadata engine may tag and bundle data records algorithmically, append meta-data associated with business information (BI) to data records, facilitate portfolio optimization decisions, facilitate capturing relationships between different records and record types, and facilitate calculation, ranking, analysis, and reporting of opportunity scores. A strategy engine may include strategic tools for pulling in data from various sources, visualizing, interacting with, capturing and synthesizing insights so as to facilitate strategic planning. An extract, transform, load (ETL) engine may extract data from outside sources, transform the data to fit operational requirements, and load the transformed data into to ODI data repository.

US Patent Publication No. 2012/0203595 for computer readable medium, file server system, and method for market segment analysis, selection, and investment by inventor Patterson, filed Jan. 23, 2012 and published Aug. 9, 2012, is directed to a computer readable medium, file server system, and method including a marketing tool suite with a competitive advantage tool, a target tool, and an opportunity calculator tool. The marketing tool suites includes a plurality of instructions that, when executed by a processor, cause the processor to provide a graphical user interface including text, a plurality of user-selectable options, and text input fields to prompt a user through the plurality of marketing tools and receive user input based on a selected case to generate a marketing report.

U.S. Pat. No. 7,584,117 for analysis of business innovation potential by inventor Bubner, filed Feb. 5, 2002 and issued Sep. 1, 2009, is directed to a method of determining a business's innovation capability consisting of using a computer and internet based system which has a questionnaire program to obtain answers relating to 6 foundation capabilities and 6 innovation capabilities which are weighted and transformed by an algorithm into a value index which is used by management to improve innovation performance and by management and investors to forecast future growth and profitability of the business.

SUMMARY OF THE INVENTION

The present invention relates to automated work systems and methods for analyzing technology, intellectual property, and corporate management and structure for commercialization for improved impact and return on investment.

It is an object of this invention to provide a system and method for automated analysis, evaluation, and assessment of technology, intellectual property, innovation, corporate management resources and structure and commercialization opportunity for new business ventures and investment.

In one embodiment, the present invention includes a system for providing an end to end, systematic, and repeatable approach for starting, building, and launching a single startup company or simultaneously launching a plurality of startup companies including at least one server platform including a logic engine, and at least one remote device including a graphical user interface (GUI), wherein the at least one server platform includes at least one set of parameters and at least one ruleset, wherein the at least one set of parameters and the at least one ruleset include focused and repeatable metrics for the single startup company and/or the plurality of startup companies to reduce risk, cost, and time to achieve success, wherein the at least one server platform includes a web crawler, a web mining tool, an application interface, and at least one database accessible via network communication, wherein the at least one server platform is configured to receive input data from the at least one remote device, the web crawler, the web mining tool and/or the at least one database via network communication, wherein the input data includes management data, intellectual property data, market data, innovation data, financial data, future sales data, time data, consumer data, and product data, wherein the web crawler is configured to automatically generate the input data, wherein the input data is updated in real-time or near real-time, wherein the at least one server platform is configured to transform the input data to pre-normalized, standard, consistent, time-stamped input data, wherein the at least one server platform includes a management system, wherein the management system includes a first phase, a second phase, a third phase, and a fourth phase, wherein each phase includes continuous, predictive, and classical analysis with a plurality of entry thresholds and a plurality of exit thresholds to achieve business success, wherein the plurality of entry thresholds and plurality of exit thresholds must be met before moving to the next phase, wherein the management system further includes an infrastructure, wherein the infrastructure is separated into a plurality of functionality tracks, wherein the plurality of functionality tracks include a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time and is designed to keep the startup company and/or the plurality of startup companies on track to meet the plurality of exit thresholds, wherein the at least one server platform includes a management summary, wherein the management summary includes summary data corresponding to each functionality track of the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or the plurality of startup companies, wherein the management system is configured for analysis of future needs based on the input data and the related needs of the startup company and/or the plurality of startup companies in its current phase, wherein under the continuous market analysis track, the at least one server platform is configured to continuously sample, research, and determine market and consumer needs, create and refine a product concept, and provide a plurality of recommendations to identify and maintain a representative customer base based on the input data, wherein under the innovation track, the at least one server platform is configured to assess the startup company's technology and develop a truly unique, "one-of-one" solution, wherein the "one-of-one solution" is directed to meet unfulfilled or underserviced market pain points and address a societal need, wherein under the business operations track, the at least one server platform is directed to incrementally staged project and business management functions, wherein the at least one server platform is configured to identify potential business partnerships, create a production and supply strategy, determine the cost efficiency of manufacturing, and provide a plurality of financial management recommendations and projections related to the startup company's and/or the plurality of startup companies' market and technology, wherein under the marketing and sales track, the at least one server platform is configured to plan a product lifecycle and at least one early revenue generating action, wherein the at least one server platform is further configured to perform risk identification routines, and generate alerts related to competition, wherein the at least one server platform is configured to generate a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track of the plurality of functionality tracks, wherein the management system is configured to prioritize at least one functionality track based on the input data for each functionality track of the plurality of functionality tracks, wherein the at least one server platform is configured to track the progress of each phase, wherein the progress of each phase is displayed via the GUI, wherein the at least one server platform is further configured to track the amount of time spent for each functionality track of the plurality of functionality tracks, wherein the at least one server platform is configured to generate at least one confidence score for the input data and for the progress of the startup company and/or the plurality of startup companies, wherein the at least one confidence score indicates the risk of the startup company and/or the plurality of startup companies, wherein the at least one server platform is configured to record and timestamp the input data and the at least one confidence score during and after the startup company and/or the plurality of startup companies progresses through a phase for analysis, wherein the first phase includes creating a management team and performing automatic assessment of the startup company and/or the plurality of startup companies, wherein the at least one server platform is configured to provide at least one recommendation for the management team, wherein the management team initially includes employees predominantly external to the startup company and employs a specialized mentored management strategy that transitions executive management roles to the startup company by the end of the fourth phase, wherein under the continuous market analysis track, the at least one server platform is configured to assess at least one market need and at least one impact to the other functionality tracks based on the at least one market need, wherein under the innovation track, the at least one server platform is configured to devise the one-of-one solution with associated tradeoffs to allow for coordination with the other functionality tracks of the plurality of functionality tracks, wherein under the business operations track, the at least one server platform is configured to frame an execution plan with manufacturing and design considerations in coordination with the other functionality tracks of the plurality of functionality tracks, and wherein under the marketing and sales track, the at least one server platform is configured to create a pricing plan in coordination with the other functionality tracks of the plurality of functionality tracks, wherein all functionality tracks of the plurality of functionality tracks of the phase provide information to the at least one server platform, wherein the at least one server platform is configured to analyze the data for each functionality track of the plurality of functionality tracks based on the at least one ruleset and the at least one set of parameters, wherein each functionality track of the plurality of functionality tracks is configured to incorporate data captured during other functionality tracks of the plurality of functionality tracks, wherein the at least one server platform is further configured to determine if the startup company and/or the plurality of startup companies should proceed to the second phase, wherein the at least one server platform is further configured to determine if the startup company and/or plurality of startup companies should receive more funding based on the progression of the startup company and/or the plurality of startup companies, whether the startup company and/or the plurality of startup companies has met the plurality of goals and/or the plurality of milestones, and whether the at least one confidence score are acceptable, wherein the plurality of goals, the plurality of milestones, and the at least one confidence score is based on data captured during the plurality of functionality tracks in the previous phase, wherein during the second phase, under the continuous market analysis track, the at least one server platform is configured to continuously collect data and provide a plurality of recommendations for a minimum viable product (MVP) based on consumer needs, wherein the at least one server platform is further configured to confirm the market need, and perform a patentability analysis, wherein under the innovation track, the at least one server platform is configured to provide at least one recommendation for securing or generating new intellectual property to meet the market need with coordination across the other functionality tracks of the plurality of functionality tracks, wherein under the business operations track, the at least one server platform includes documentation and recommendations for establishing corporate framework and legal partnerships, infrastructure, and facilities with coordination across the other functionality tracks, wherein establishing corporate framework includes establishing the management team, and wherein under the marketing and sales track, the at least one server platform is configured to develop a marketing and sales strategy and perform an appropriate level of cost/price modeling in coordination with the other functionality tracks of the plurality of functionality tracks, wherein each functionality track of the plurality of functionality tracks of the phase provide information to and gain information from the other functionality tracks of the plurality of functionality tracks using the at least one ruleset and the at least one set of parameters, wherein the at least one server platform is configured to determine if the startup company and/or the plurality of startup companies should continue to the third phase and if the startup company and/or the plurality of startup companies should receive more funding based on the progression of the startup company and/or the plurality of startup companies, whether the startup company and/or the plurality of startup companies has met the plurality of goals and/or the plurality of milestones, and if at least one confidence score is of sufficient value across the plurality of functionality tracks, wherein all functionality tracks of the plurality of functionality tracks of the phase provide information to and gain information from the other tracks using the at least one ruleset and the at least one set of parameters, wherein during the third phase, under the continuous market analysis track, the at least one server platform is configured to continuously compare the MVP to the consumer data, wherein under the innovation track, the at least one server platform is configured to provide at least one detailed design and at least one working prototype of the MVP, wherein under the business operations track, the at least one server platform is configured to identify an investor and/or at least one distribution partner based on the input data and in coordination with the other functionality tracks of the plurality of functionality tracks, wherein under the marketing and sales track, the at least one server platform is configured to provide marketing and sales input data for the execution plan, wherein the execution plan is configured to define every function necessary to plan the marketing and sales activities in the next phase supporting the plurality of exit thresholds, wherein all functionality tracks of the phase provide information to and gain information from the other functionality tracks of the plurality of functionality tracks using the at least one ruleset and the at least one set of parameters, wherein the at least one server platform is configured to determine if the startup company and/or the plurality of startup companies should continue to the fourth phase and if the startup company and/or plurality of startup companies should receive more funding based on the progression of the startup company and/or plurality of startup companies, whether the startup company and/or the plurality of startup companies has met the plurality of goals and/or the plurality of milestones of the previous phase with an acceptable confidence score, wherein all functionality tracks of the plurality of functionality tracks of the phase provide information to and gain information from the other functionality tracks of the plurality of functionality tracks using the at least one ruleset and the at least one set of parameters, wherein during the fourth phase, under the continuous market analysis track, the at least one server platform is configured to monitor competition and prioritize the MVP, wherein under the innovation track, the at least one server platform is configured to confirm MVP readiness and to initiate full rate manufacturing and launch to market, wherein under the business operations track, the at least one server platform includes monitoring of at least one sales goal, providing at least one recommendation for creating a distribution chain, and providing employee support training documentation, and wherein under the marketing and sales track, the at least one server platform is configured to provide a plurality of recommendations for marketing and selling the MVP, wherein each functionality track of the plurality of functionality tracks are coordinated to ensure a successful transition to product delivery, wherein across all phases of the management system, the at least one server platform further includes at least one enterprise tool, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool is configured to collect input data related to the startup company's and/or plurality of startup companies' technology and activity without reformatting or receiving manually inputted data, wherein the at least one enterprise tool is configured to automatically transmit the pre-normalized input data to the logic engine, wherein the at least one server platform further includes a process and asset library, wherein the process and asset library includes all documentation, data, protocols, and tools for the management system, wherein the documentation includes templates, supplemental process, procedures and other documents needed to maintain consistency throughout the management system, wherein each protocol, method and template is configured to automatically generate quantifiable data elements, wherein the documentation further enables the management system to be used for a plurality of startup companies, wherein the logic engine includes a market engine, an innovation discovery engine, a reporting engine, and an artificial intelligence engine, wherein the logic engine includes methods to model, manage, and measure all data of the management system, wherein the logic engine is configured to assess the startup company and/or the plurality of startup companies as the startup company and/or the plurality of startup companies progresses through each phase, wherein the logic engine is designed to streamline the management system to automatically generate normalized, useful data to provide insights and alerts across the plurality of functionality tracks for the startup company and/or for the plurality of startup companies, wherein the market engine includes a collection and recording system, an augmentation engine, at least one confidence factor, and at least one algorithm, wherein the innovation discovery engine includes an idea engine, a technology introduction form, an initialization proposal, a viability assessment, and an innovation library, wherein the innovation library is configured to receive the input data via the web mining tool, wherein the idea engine is configured to use the web crawler to identify technologies via network based communication, wherein the idea engine is further configured to provide information to the innovation library via network communication, wherein the technology introduction form is configured to receive the startup data, wherein the innovation discovery engine is configured to determine if the startup data should be analyzed further based on the initialization form, wherein the startup data is transferred to the initialization proposal, wherein the initialization proposal includes questions that automatically collect pre-normalized data and scoreable data, wherein the initialization proposal data is scored by the artificial intelligence engine, and wherein the score is stored in the innovation library, wherein the artificial intelligence engine includes scoring logic, nominations, web mining, application interfaces, and data trends based on the input data, wherein the input data includes startup data from at least one different startup company, wherein the at least one server platform is configured to create on-demand and auto-generated insights, alerts, and reports, wherein the auto-generated insights include resource utilization, phase progress, market opportunities and threats, startup valuation with confidence factors, trends, forecasts and projections for at least one phase of the startup company and/or across the plurality of startup companies, wherein the alerts, insights, reports, and the at least one confidence score are displayed via the GUI, wherein the GUI is updated in real-time to provide real-time status of the startup company, wherein the GUI is configured to receive an assignment input in real-time, wherein the assignment input includes at least one new assignment for the management team and/or the startup company's and/or plurality of startup companies' employees to improve the startup company's and the plurality of startup companies' performance, wherein the artificial intelligence engine is configured to continuously receive, monitor and model all data received and outputted by the system, wherein the artificial intelligence engine is configured to use the modeled data to provide a recommendation for each functionality track of the plurality of functionality tracks and/or phase to lower the risk, cost, or time associated with the success of the startup company and the plurality of startup companies, wherein the at least one server platform is configured to characterize the risk and confidence of the startup company and/or the plurality of startup companies based on the alerts, insights and reports, and wherein the artificial intelligence engine is configured to include a plurality of trade-offs of cost, risk, and time against the key areas of management, innovation, marketing and sales, and continuous market analysis as well as across phases within the startup company and/or the plurality of startup companies.

In another embodiment, the present invention includes a commercialization method for end-to-end management and execution of starting, building, and launching a startup company or simultaneously launching a plurality of startup companies that confidently yields a more robust, more consistent, and more profitable product for investors with less investment, higher likelihood of success, and in less time than other methods, including receiving input data via at least one server platform from at least one remote device, a web crawler, a web mining tool, and/or at least one database, wherein the at least one server platform is in network communication with the at least one remote device, the web crawler, the web mining tool, and the at least one database, wherein the at least one server platform includes a logic engine, at least one enterprise tool, at least one ruleset, at least one set of parameters, an application interface, and a process and asset library, wherein the logic engine includes a market engine, an innovation discovery engine, a reporting engine, and an artificial intelligence engine, wherein the market engine includes a collection and recording system, an augmentation engine, at least one confidence factor, and at least one algorithm, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool is configured to collect input data related to the startup company's technology and activity without reformatting or receiving manually inputted data, wherein the input data includes management data, intellectual property data, market data, innovation data, financial data, future sales data, time data, consumer data, and product data, wherein the web crawler is configured to automatically generate the input data, wherein the input data is updated in real-time, wherein the at least one set of parameters and the at least one ruleset include focused and repeatable metrics for the startup company and/or the plurality of startup companies to reduce risk, cost, and time to achieve success, creating a management system via the at least one server platform, wherein the management system is designed to lower risk, improve capital resource efficiency and reduce time to launch, wherein the management system includes a first phase, a second phase, a third phase, and a fourth phase, wherein each phase include predictive and classical analysis with a plurality of entry thresholds and a plurality of exit thresholds to achieve business success, wherein the management system further includes an infrastructure, wherein the infrastructure includes a plurality of functionality tracks, wherein the plurality of functionality tracks includes a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time, wherein the plurality of goals is further design to keep the startup company and/or the plurality of startup companies on track to meet the plurality of exit thresholds, wherein the management system includes a management summary, wherein the management summary includes summary data on the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or plurality of startup companies, wherein the plurality of entry thresholds and plurality of exit thresholds must be met before moving to the next phase, wherein under the continuous market analysis track, the at least one server platform is configured to continuously sample, research, and determine market and consumer needs, create and refine a product concept, and provide a plurality of recommendations to identify and maintain a representative customer base based on the input data, and develop and maintain a customer base based on the input data, wherein under the innovation track, the at least one server platform is configured to assess the startup company's and/or plurality of startup companies' technology and develop a truly unique, "one-of-one" solution, wherein the one-of-one solution is directed to meet unfulfilled or underserviced market pain points and address a societal need, wherein under the business operations track, the at least one server platform is directed to incrementally staged project and business management functions, wherein the at least one server platform is configured to identify potential business partnerships, create a production and supply strategy, determine the cost efficiency of manufacturing, and provide a plurality of financial management recommendations and projections related to the startup company's and/or plurality of startup companies' market and technology, wherein under the marketing and sales track, the at least one server platform is configured to plan a product lifecycle and at least one early revenue generating action, wherein the at least one server platform is further configured to perform risk identification routines and generate alerts related to competition, wherein the management system is further configured to analyze the future needs based on the input data and the related needs for the startup company and/or the plurality of startup companies in the current phase, transforming the input data to pre-normalized, standard, consistent time-stamped data, wherein the at least one enterprise tool is configured to automatically transmit the pre-normalized input data to the logic engine, automatically generating quantifiable data elements via the process and asset library, wherein the process and asset library includes all documentation, data, protocols and tools for the management system, wherein the documentation includes templates, supplemental process, procedures and other documents needed to maintain consistency throughout the management system, wherein each protocol, method and template is configured to automatically generate quantifiable data elements, wherein the documentation further enables the management system to be used for a plurality of startup companies, wherein the at least one server platform is further configured to generate a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track, identifying technology data via the web crawler, providing the input data to the innovation discovery engine via network communication, wherein the innovation discovery engine includes an idea engine, a technology introduction form, an initialization proposal, a viability assessment, and an innovation library, wherein the innovation library is configured to receive the input data via the web mining tool, receiving the startup data via the technology introduction form, determining whether to further analyze the startup based on the technology introduction form, transmitting data to the initialization proposal, wherein the initialization proposal includes questions that automatically collect pre-normalized data and scoreable data automatically collecting pre-normalized data and scoreable data via the initialization proposal, scoring the initialization proposal data via an artificial intelligence engine, wherein the artificial intelligence engine includes scoring logic, nominations, web mining, and data trends based on the input data, wherein the input data includes startup data from at least one different startup company, generating a plurality of goals and a plurality of milestones for each phase, wherein the plurality of goals is designed to limit risk, prioritizing at least one functionality track of the plurality of functionality tracks based on the input data for each functionality track of the plurality of functionality tracks, tracking the amount of time spent for each functionality track of the plurality of functionality tracks, tracking the progress of each phase, generating at least one confidence score for the input data and for the progress of the startup company and/or the plurality of startup companies, wherein the at least one confidence score indicates the risk of the startup company and/or the plurality of startup companies, wherein the at least one server platform is configured to record and timestamp the input data and the at least one confidence score during and after the startup company and/or the plurality of startup companies progresses through a phase for analysis, creating a management team and performing automatic assessment of the startup and/or the plurality of startup companies, wherein the at least one server platform is configured to provide at least one recommendation for the management team, wherein the management team includes only nonemployees of the startup company, wherein the management system is configured so the members of the management team will transition to only the startup company's and/or the plurality of startup companies' employees by the end of fourth phase, assessing a market need via the at least one server platform under the continuously market analysis track, wherein the at least one server platform is further configured to assess the impact of the market need on the other functionality tracks of the plurality of functionality tracks, wherein the at least one server platform is configured to devise the one-of-one solution with associated tradeoffs to allow for coordination with the other functionality tracks of the plurality of functionality tracks, framing an execution plan under the business operations track via the at least one server platform, creating a pricing plan under the marketing and sales track via the at least one server platform, wherein the at least one server platform is configured to create a pricing plan in coordination with the other functionality tracks of the plurality of functionality tracks, wherein information is received by the at least one server platform under all functionality tracks of the plurality of functionality tracks of the phase, wherein the at least one server platform is configured to analyze the data for each functionality track of the plurality of functionality tracks based on the at least one ruleset and the at least one set of parameters, wherein each functionality track of the plurality of functionality tracks is configured to incorporate data captured during other the functionality tracks of the plurality of functionality tracks, determining if the startup should proceed to the second phase, wherein the at least one server platform is further configured to determine if the startup company and/or the plurality of startup companies should receive more funding based on the progression of the startup company and/or the plurality of startup companies, whether the startup company and/or the plurality of startup companies has met the plurality of goals and/or the plurality of milestones, and whether the at least one confidence score is acceptable, wherein the plurality of goals, plurality of milestones, and the at least one confidence score are based on the data captured during the plurality of functionality tracks in the previous phase, providing a plurality of recommendations for a minimum viable product (MVP) based on consumer needs from continuously collected input data via the at least one server platform under the continuous market analysis track, confirming the market need via the at least one server platform under the continuous market analysis track, performing patentability analysis via the at least one server platform under the continuous market analysis track, providing at least one recommendation for securing or generating new intellectual property to meet the market need under the innovation track with coordination across the other functionality tracks of the plurality of functionality tracks, establishing corporate framework and legal partnerships, infrastructure and facilities under the business operations tracks with coordination across the other functionality tracks of the plurality of functionality tracks, wherein the at least one server platform includes documentation and a plurality of recommendations for establishing the corporate framework and legal partnerships, infrastructure, and facilities, wherein establishing corporate framework includes establishing the management team, developing a marketing and sales strategy under the marketing and sales track, wherein the at least one server platform is configured to develop a marketing and sales strategy and perform an appropriate level of cost/price modeling with the other functionality tracks of the plurality of functionality tracks, wherein all functionality tracks of the plurality of functionality tracks of the phase provide information to and gain information from the other functionality tracks of the plurality of functionality tracks, determining if the startup company and/or the plurality of startup companies should continue to the third phase and if the startup company and/or the plurality of startup companies should receive more funding based on the progression of the startup company and/or the plurality of startup companies, whether the startup company has met the plurality of goals and/or the plurality of milestones, and whether the at least one confidence score is acceptable, wherein the plurality of goals, the plurality of milestones, and the at least one confidence score are based on the plurality of functionality tracks in the previous phase, comparing the MVP to the consumer data via the at least one server platform under the continuous market analysis track, providing at least one detailed design and at least one working prototype of the MVP under the innovation track via the at least one server platform, identifying at least one investor and/or at least one distribution partner based on the input data and in coordination with the other functionality tracks of the plurality of functionality tracks, defining the execution plan via the at least one server platform under the marketing and sales track, wherein the execution plan is configured to define every function necessary to plan the marketing and sales activities in the next phase supporting the plurality of exit thresholds, wherein all functionality tracks of the phase provide information to and gain information from the other functionality tracks using the at least one ruleset and/or the at least one set of parameters, determining if the startup company and/or the plurality of startup companies should continue to the fourth phase and if the startup company should receive more funding via the at least one server platform based on the progression of the startup company and/or the plurality of startup companies, and whether the startup company and/or the plurality of startup companies has met the plurality of goals and/or the plurality of milestones of the previous phase with an acceptable at least one confidence score, monitoring competition and prioritizing the MVP via the at least one server platform under the continuous market analysis track, determining if the MVP is ready for full rate manufacturing and launch to market via the at least one server platform under the innovation track, monitoring of at least one sales goal, providing at least one recommendation for creating a distribution chain and providing employee support training documentation via the at least one server platform under the business operations track, providing a plurality of recommendation for marketing and selling the MVP via the server platform under the marketing and sales track, wherein the plurality of functionality tracks are coordinated to ensure a successful transition to product delivery, monitoring competition, prioritizing the MVP, finalizing the MVP for launch to market, executing and monitoring sales goals, creating a distribution chain, providing employee training and selling the MVP during the fourth phase, creating on-demand and auto-generated insights, alerts and reports for each phase and functionality track of the plurality of functionality tracks, wherein the auto-generated insights include resource utilization, phase progress, market opportunities and threats, startup valuation with confidence factors, trends, forecasts and projections for at least one phase of the startup company and/or across the plurality of startup companies, displaying the alerts, the insights, the reports, and the at least one confidence score via the GUI, wherein the GUI is updated in real-time to provide real-time status of the startup company and/or the plurality of startup companies, wherein the GUI is configured to receive an assignment input in real-time, wherein the assignment input includes at least one new assignment for the management team, the startup company's employees and/or the plurality of startup companies' employees to improve the startup company's and/or the plurality of startup companies' performance, monitoring and modeling all data received and outputted by the at least one server platform via the artificial intelligence engine, wherein the artificial intelligence engine is configured to include a plurality of trade-offs of cost, risk, and time against the key areas of management, innovation, marketing and sales, and continuous market analysis as well as across phases within the startup company and the plurality of startup companies, providing a recommendation via the artificial intelligence engine based on the modeled data for each functionality track of the plurality of functionality tracks and/or phase to improve the management system to lower the risk, cost, and time associated with the success of the startup company, and characterizing the risk and confidence of the startup and/or plurality of startup companies based on the alerts, insights and reports.

In yet another embodiment, the present invention includes a system for providing an end to end, systematic, and repeatable approach for starting, building, and launching a single startup company or simultaneously launching a plurality of startup companies including at least one server platform including a logic engine, and at least one remote device including a graphical user interface (GUI), wherein the at least one server platform includes at least one set of parameters and at least one ruleset, wherein the at least one set of parameters and the at least one ruleset include focused and repeatable metrics for the single startup company and/or the plurality of startup companies to reduce risk, cost, and time to achieve success, wherein the at least one server platform includes a web crawler, a web mining tool, an application interface, and at least one database accessible via network communication, wherein the at least one server platform is configured to receive input data from the at least one remote device, the web crawler, the web mining tool and/or the at least one database via network communication, wherein the input data includes management data, intellectual property data, market data, innovation data, financial data, future sales data, time data, consumer data, and product data, wherein the web crawler is configured to automatically generate the input data, wherein the input data is updated in real-time or near real-time, wherein the at least one server platform is configured to transform the input data to pre-normalized, standard, consistent, time-stamped input data, wherein the at least one server platform includes a management system, wherein the management system includes a first phase, a second phase, a third phase, and a fourth phase, wherein each phase includes continuous, predictive, and classical analysis with a plurality of entry thresholds and a plurality of exit thresholds to achieve business success, wherein the plurality of entry thresholds and plurality of exit thresholds must be met before moving to the next phase, wherein the management system further includes an infrastructure, wherein the infrastructure is separated into a plurality of functionality tracks, wherein the plurality of functionality tracks include a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time and is designed to keep the startup company and/or the plurality of startup companies on track to meet the plurality of exit thresholds, wherein the at least one server platform includes a management summary, wherein the management summary includes summary data corresponding to each functionality track of the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or the plurality of startup companies, wherein the management system is configured for analysis of future needs based on the input data and the related needs of the startup company and/or the plurality of startup companies in its current phase, wherein under the continuous market analysis track, the at least one server platform is configured to continuously sample, research, and determine market and consumer needs, create and refine a product concept, and provide a plurality of recommendations to identify and maintain a representative customer base based on the input data, wherein under the innovation track, the at least one server platform is configured to assess the startup company's technology and develop a truly unique, "one-of-one" solution, wherein the "one-of-one solution" is directed to meet unfulfilled or underserviced market pain points and address a societal need, wherein under the business operations track, the at least one server platform is directed to incrementally staged project and business management functions, wherein the at least one server platform is configured to identify potential business partnerships, create a production and supply strategy, determine the cost efficiency of manufacturing, and provide a plurality of financial management recommendations and projections related to the startup company's and/or the plurality of startup companies' market and technology, wherein under the marketing and sales track, the at least one server platform is configured to plan a product lifecycle and at least one early revenue generating action, wherein the at least one server platform is further configured to perform risk identification routines, and generate alerts related to competition, wherein the at least one server platform is configured to generate a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track of the plurality of functionality tracks, wherein the management system is configured to prioritize at least one functionality track based on the input data for each functionality track of the plurality of functionality tracks, wherein the at least one server platform is configured to track the progress of each phase, wherein the progress of each phase is displayed via the GUI, wherein the at least one server platform is further configured to track the amount of time spent for each functionality track of the plurality of functionality tracks, wherein the at least one server platform is configured to generate at least one confidence score for the input data and for the progress of the startup company and/or the plurality of startup companies, wherein the at least one confidence score indicates the risk of the startup company and/or the plurality of startup companies, wherein the at least one server platform is configured to record and timestamp the input data and the at least one confidence score during and after the startup company and/or the plurality of startup companies progresses through a phase for analysis, wherein the first phase includes creating a management team and performing automatic assessment of the startup company and/or the plurality of startup companies, wherein the at least one server platform is configured to provide at least one recommendation for the management team, wherein the management team initially includes employees predominantly external to the startup company and employs a specialized mentored management strategy that transitions executive management roles to the startup company by the end of the fourth phase, wherein under the continuous market analysis track, the at least one server platform is configured to assess at least one market need and at least one impact to the other functionality tracks based on the at least one market need, wherein under the innovation track, the at least one server platform is configured to devise the one-of-one solution with associated tradeoffs to allow for coordination with the other functionality tracks of the plurality of functionality tracks, wherein under the business operations track, the at least one server platform is configured to frame an execution plan with manufacturing and design considerations in coordination with the other functionality tracks of the plurality of functionality tracks, and wherein under the marketing and sales track, the at least one server platform is configured to create a pricing plan in coordination with the other functionality tracks of the plurality of functionality tracks, wherein all functionality tracks of the plurality of functionality tracks of the phase provide information to the at least one server platform, wherein the at least one server platform is configured to analyze the data for each functionality track of the plurality of functionality tracks based on the at least one ruleset and the at least one set of parameters, wherein each functionality track of the plurality of functionality tracks is configured to incorporate data captured during other functionality tracks of the plurality of functionality tracks, wherein the at least one server platform is further configured to determine if the startup company and/or the plurality of startup companies should proceed to the second phase, wherein the at least one server platform is further configured to determine if the startup company and/or plurality of startup companies should receive more funding based on the progression of the startup company and/or the plurality of startup companies, whether the startup company and/or the plurality of startup companies has met the plurality of goals and/or the plurality of milestones, and whether the at least one confidence score are acceptable, wherein the plurality of goals, the plurality of milestones, and the at least one confidence score is based on data captured during the plurality of functionality tracks in the previous phase, wherein during the second phase, under the continuous market analysis track, the at least one server platform is configured to continuously collect data and provide a plurality of recommendations for a minimum viable product (MVP) based on consumer needs, wherein the at least one server platform is further configured to confirm the market need, and perform a patentability analysis, wherein under the innovation track, the at least one server platform is configured to provide at least one recommendation for securing or generating new intellectual property to meet the market need with coordination across the other functionality tracks of the plurality of functionality tracks, wherein under the business operations track, the at least one server platform includes documentation and recommendations for establishing corporate framework and legal partnerships, infrastructure, and facilities with coordination across the other functionality tracks, wherein establishing corporate framework includes establishing the management team, and wherein under the marketing and sales track, the at least one server platform is configured to develop a marketing and sales strategy and perform an appropriate level of cost/price modeling in coordination with the other functionality tracks of the plurality of functionality tracks, wherein each functionality track of the plurality of functionality tracks of the phase provide information to and gain information from the other functionality tracks of the plurality of functionality tracks using the at least one ruleset and the at least one set of parameters, wherein the at least one server platform is configured to determine if the startup company and/or the plurality of startup companies should continue to the third phase and if the startup company and/or the plurality of startup companies should receive more funding based on the progression of the startup company and/or the plurality of startup companies, whether the startup company and/or the plurality of startup companies has met the plurality of goals and/or the plurality of milestones, and if at least one confidence score is of sufficient value across the plurality of functionality tracks, wherein all functionality tracks of the plurality of functionality tracks of the phase provide information to and gain information from the other tracks using the at least one ruleset and the at least one set of parameters, wherein during the third phase, under the continuous market analysis track, the at least one server platform is configured to continuously compare the MVP to the consumer data, wherein under the innovation track, the at least one server platform is configured to provide at least one detailed design and at least one working prototype of the MVP, wherein under the business operations track, the at least one server platform is configured to identify an investor and/or at least one distribution partner based on the input data and in coordination with the other functionality tracks of the plurality of functionality tracks, wherein under the marketing and sales track, the at least one server platform is configured to provide marketing and sales input data for the execution plan, wherein the execution plan is configured to define every function necessary to plan the marketing and sales activities in the next phase supporting the plurality of exit thresholds, wherein all functionality tracks of the phase provide information to and gain information from the other functionality tracks of the plurality of functionality tracks using the at least one ruleset and the at least one set of parameters, wherein the at least one server platform is configured to determine if the startup company and/or the plurality of startup companies should continue to the fourth phase and if the startup company and/or plurality of startup companies should receive more funding based on the progression of the startup company and/or plurality of startup companies, whether the startup company and/or the plurality of startup companies has met the plurality of goals and/or the plurality of milestones of the previous phase with an acceptable confidence score, wherein all functionality tracks of the plurality of functionality tracks of the phase provide information to and gain information from the other functionality tracks of the plurality of functionality tracks using the at least one ruleset and the at least one set of parameters, wherein during the fourth phase, under the continuous market analysis track, the at least one server platform is configured to monitor competition and prioritize the MVP, wherein under the innovation track, the at least one server platform is configured to confirm MVP readiness and to initiate full rate manufacturing and launch to market, wherein under the business operations track, the at least one server platform includes monitoring of at least one sales goal, providing at least one recommendation for creating a distribution chain, and providing employee support training documentation, and wherein under the marketing and sales track, the at least one server platform is configured to provide a plurality of recommendations for marketing and selling the MVP, wherein each functionality track of the plurality of functionality tracks are coordinated to ensure a successful transition to product delivery, wherein across all phases of the management system, the at least one server platform further includes at least one enterprise tool, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool is configured to collect input data related to the startup company's and/or plurality of startup companies' technology and activity without reformatting or receiving manually inputted data, wherein the at least one enterprise tool is configured to automatically transmit the pre-normalized input data to the logic engine, wherein the at least one server platform further includes a process and asset library, wherein the process and asset library includes all documentation, data, protocols, and tools for the management system, wherein the documentation includes templates, supplemental process, procedures and other documents needed to maintain consistency throughout the management system, wherein each protocol, method and template is configured to automatically generate quantifiable data elements, wherein the documentation further enables the management system to be used for a plurality of startup companies, wherein the logic engine includes a market engine, an innovation discovery engine, a reporting engine, and an artificial intelligence engine, wherein the logic engine includes methods to model, manage, and measure all data of the management system, wherein the logic engine is configured to assess the startup company and/or the plurality of startup companies as the startup company and/or the plurality of startup companies progresses through each phase, wherein the logic engine is designed to streamline the management system to automatically generate normalized, useful data to provide insights and alerts across the plurality of functionality tracks for the startup company and/or for the plurality of startup companies, wherein the market engine includes a collection and recording system, an augmentation engine, at least one confidence factor, and at least one algorithm, wherein the innovation discovery engine includes an idea engine, a technology introduction form, an initialization proposal, a viability assessment, and an innovation library, wherein the innovation library is configured to receive the input data via the web mining tool, wherein the idea engine is configured to use the web crawler to identify technologies via network based communication, wherein the idea engine is further configured to provide information to the innovation library via network communication, wherein the technology introduction form is configured to receive the startup data, wherein the innovation discovery engine is configured to determine if the startup data should be analyzed further based on the initialization form, wherein the startup data is transferred to the initialization proposal, wherein the initialization proposal includes questions that automatically collect pre-normalized data and scoreable data, wherein the initialization proposal data is scored by the artificial intelligence engine, and wherein the score is stored in the innovation library, wherein the artificial intelligence engine includes scoring logic, nominations, web mining, application interfaces, and data trends based on the input data, wherein the input data includes startup data from at least one different startup company, wherein the at least one server platform is configured to create on-demand and auto-generated insights, alerts, and reports, wherein the auto-generated insights include resource utilization, phase progress, market opportunities and threats, startup valuation with confidence factors, trends, forecasts and projections for at least one phase of the startup company and/or across the plurality of startup companies, wherein the auto-generated insights include resource utilization, phase progress, market opportunities and threats, startup valuation with confidence factors, trends, forecasts and projections for at least one phase of the startup company and/or across the plurality of startup companies, wherein the alerts, insights, reports, and the at least one confidence score are displayed via the GUI, wherein the GUI is updated in real-time to provide real-time status of the startup company, wherein the GUI includes a plurality of dashboards, wherein the plurality of dashboards include a dashboard for each startup of the plurality of startup companies, wherein the plurality of dashboards further includes a dashboard for each phase and a CEO dashboard, wherein each phase dashboard includes data related to the plurality of goals, the plurality of milestones, the plurality of entry thresholds, the plurality of exit thresholds, early risk identification alerts, an algorithmic interpretation of a real-time management system status that is automatically generated in the management system as a byproduct of each phase and the plurality of functionality tracks, and cross management system integrated data analysis, wherein the CEO dashboard includes key pieces of data for the startup company and/or the plurality of startup companies, wherein the key pieces of data for the startup company and/or the plurality of startup companies include a rollup of all startup company risk and phase status, cross startup company personnel resourcing, capital financing status, and innovation status, wherein the rollup of all startup company risk and phase status includes data for all positions at the startup company and/or the plurality of startup companies to enable the management team to consider impacts across the entire startup company and/or the plurality of startup companies, wherein the dashboard for the startup company and/or the plurality of startup companies includes the current phase of the startup company and/or the plurality of startup companies, the amount of funds allocated to the startup company and/or the plurality of startup companies, the amount of funds expended by the startup company and/or the plurality of startup companies, alerts, spending by each functionality track of the plurality of functionality tracks for the startup company and/or the plurality of startup companies, the progression of the startup company and/or the plurality of startup companies towards the plurality of goals and the plurality of milestones, and the pricing model for the startup company and/or the plurality of startup companies, wherein the GUI is configured to receive an assignment input in real-time, wherein the assignment input includes at least one new assignment for the management team and/or the startup company's and/or plurality of startup companies' employees to improve the startup company's and the plurality of startup companies' performance, wherein the GUI is further configured to display all data defined by the at least one ruleset and the at least one set of parameters, wherein the GUI is further configured to display data based on a user's position in the startup company, the plurality of the startup companies, and/or the management team, wherein the GUI enables the management team to make and distribute decisions for the startup and/or the plurality of startup companies, wherein the GUI is further configured to allow the management team to analyze a startup company and the plurality of startup companies for each functionality track of the plurality of functionality tracks, each phase, and all activities occurring in each functionality track of the plurality of functionality tracks and each phase, wherein the GUI is driven by the at least one ruleset, the at least one set of parameters, and the logic engine to create a real-time dynamic feedback loop to enable the management team to consider all aspects of the entire startup company and/or the plurality of startup companies before providing at least one recommendation for the startup company and/or the plurality of the startup companies, wherein the artificial intelligence engine is configured to continuously receive, monitor and model all data received and outputted by the system, wherein the artificial intelligence engine is configured to use the modeled data to provide a recommendation for each functionality track of the plurality of functionality tracks, phase and the GUI to lower the risk, cost, or time associated with the success of the startup company and the plurality of startup companies, wherein the at least one server platform is configured to characterize the risk and confidence of the startup company and/or the plurality of startup companies based on the alerts, insights and reports, and wherein the artificial intelligence engine is configured to include a plurality of trade-offs of cost, risk, and time against the key areas of management, innovation, marketing and sales, and continuous market analysis as well as across phases within the startup company and/or the plurality of startup companies.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 illustrates a RACI matrix according to one embodiment of the present invention.

FIG. 9A illustrates an evaluation scorecard according to one embodiment of the present invention.

FIG. 9C illustrates an evaluation scorecard according to one embodiment of the present invention.

FIG. 16 illustrates marketing and sales tasks according to one embodiment of the present invention.

FIG. 19 illustrates a graphical user interface according to one embodiment of the present invention.

FIG. 28 illustrates a scorecard according to one embodiment of the present invention.

FIG. 33 illustrates review types according to one embodiment of the present invention.

FIG. 37 illustrates an innovation viability assessment according to one embodiment of the present invention.

FIG. 38 illustrates a resource request tool according to one embodiment of the present invention.

DETAILED DESCRIPTION

Figure 1:
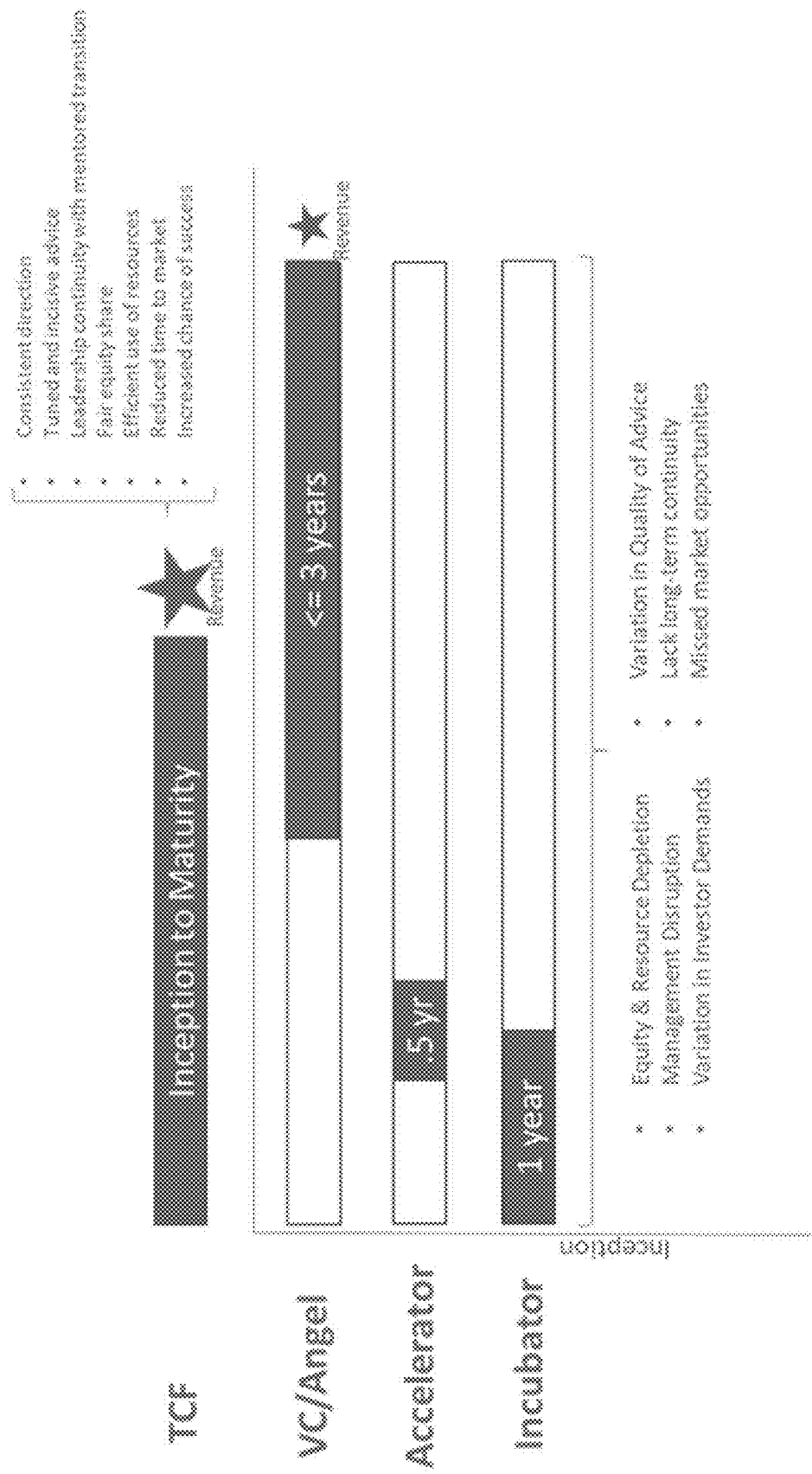
FIG. 1 illustrates a graphical representation of engagement windows for startups according to one embodiment of the present invention.

In the following description, like reference characters designate like or corresponding parts throughout the several views. Also, in the following description, it is to be understood that such terms as "forward," "rearward," "front," "back," "right," "left," "upwardly," "downwardly," and the like are words of convenience and are not to be construed as limiting terms.

The present invention is directed to automated work systems and methods for analyzing technology, intellectual property, markets, corporate management, and structure for commercialization for improved impact and return on investment. The present invention includes a system for automated analysis and assessment of technology content related to intellectual property and innovation for applications for new business ventures.

In one embodiment, the present invention includes a system for providing an end to end, systematic, and repeatable approach for starting, building, and launching a single startup company or simultaneously launching a plurality of startup companies including at least one server platform including a logic engine, and at least one remote device including a graphical user interface (GUI), wherein the at least one server platform includes at least one set of parameters and at least one ruleset, wherein the at least one set of parameters and the at least one ruleset include focused and repeatable metrics for the single startup company and/or the plurality of startup companies to reduce risk, cost, and time to achieve success, wherein the at least one server platform includes a web crawler, a web mining tool, an application interface, and at least one database accessible via network communication, wherein the at least one server platform is configured to receive input data from the at least one remote device, the web crawler, the web mining tool and/or the at least one database via network communication, wherein the input data includes management data, intellectual property data, market data, innovation data, financial data, future sales data, time data, consumer data, and product data, wherein the web crawler is configured to automatically generate the input data, wherein the input data is updated in real-time or near real-time, wherein the at least one server platform is configured to transform the input data to pre-normalized, standard, consistent, time-stamped input data, wherein the at least one server platform includes a management system, wherein the management system includes a first phase, a second phase, a third phase, and a fourth phase, wherein each phase includes continuous, predictive, and classical analysis with a plurality of entry thresholds and a plurality of exit thresholds to achieve business success, wherein the plurality of entry thresholds and plurality of exit thresholds must be met before moving to the next phase, wherein the management system further includes an infrastructure, wherein the infrastructure is separated into a plurality of functionality tracks, wherein the plurality of functionality tracks include a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time and is designed to keep the startup company and/or the plurality of startup companies on track to meet the plurality of exit thresholds, wherein the at least one server platform includes a management summary, wherein the management summary includes summary data corresponding to each functionality track of the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or the plurality of startup companies, wherein the management system is configured for analysis of future needs based on the input data and the related needs of the startup company and/or the plurality of startup companies in its current phase, wherein under the continuous market analysis track, the at least one server platform is configured to continuously sample, research, and determine market and consumer needs, create and refine a product concept, and provide a plurality of recommendations to identify and maintain a representative customer base based on the input data, wherein under the innovation track, the at least one server platform is configured to assess the startup company's technology and develop a truly unique, "one-of-one" solution, wherein the "one-of-one solution" is directed to meet unfulfilled or underserviced market pain points and address a societal need, wherein under the business operations track, the at least one server platform is directed to incrementally staged project and business management functions, wherein the at least one server platform is configured to identify potential business partnerships, create a production and supply strategy, determine the cost efficiency of manufacturing, and provide a plurality of financial management recommendations and projections related to the startup company's and/or the plurality of startup companies' market and technology, wherein under the marketing and sales track, the at least one server platform is configured to plan a product lifecycle and at least one early revenue generating action, wherein the at least one server platform is further configured to perform risk identification routines, and generate alerts related to competition, wherein the at least one server platform is configured to generate a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track of the plurality of functionality tracks, wherein the management system is configured to prioritize at least one functionality track based on the input data for each functionality track of the plurality of functionality tracks, wherein the at least one server platform is configured to track the progress of each phase, wherein the progress of each phase is displayed via the GUI, wherein the at least one server platform is further configured to track the amount of time spent for each functionality track of the plurality of functionality tracks, wherein the at least one server platform is configured to generate at least one confidence score for the input data and for the progress of the startup company and/or the plurality of startup companies, wherein the at least one confidence score indicates the risk of the startup company and/or the plurality of startup companies, wherein the at least one server platform is configured to record and timestamp the input data and the at least one confidence score during and after the startup company and/or the plurality of startup companies progresses through a phase for analysis, wherein the first phase includes creating a management team and performing automatic assessment of the startup company and/or the plurality of startup companies, wherein the at least one server platform is configured to provide at least one recommendation for the management team, wherein the management team initially includes employees predominantly external to the startup company and employs a specialized mentored management strategy that transitions executive management roles to the startup company by the end of the fourth phase, wherein under the continuous market analysis track, the at least one server platform is configured to assess at least one market need and at least one impact to the other functionality tracks based on the at least one market need, wherein under the innovation track, the at least one server platform is configured to devise the one-of-one solution with associated tradeoffs to allow for coordination with the other functionality tracks of the plurality of functionality tracks, wherein under the business operations track, the at least one server platform is configured to frame an execution plan with manufacturing and design considerations in coordination with the other functionality tracks of the plurality of functionality tracks, and wherein under the marketing and sales track, the at least one server platform is configured to create a pricing plan in coordination with the other functionality tracks of the plurality of functionality tracks, wherein all functionality tracks of the plurality of functionality tracks of the phase provide information to the at least one server platform, wherein the at least one server platform is configured to analyze the data for each functionality track of the plurality of functionality tracks based on the at least one ruleset and the at least one set of parameters, wherein each functionality track of the plurality of functionality tracks is configured to incorporate data captured during other functionality tracks of the plurality of functionality tracks, wherein the at least one server platform is further configured to determine if the startup company and/or the plurality of startup companies should proceed to the second phase, wherein the at least one server platform is further configured to determine if the startup company and/or plurality of startup companies should receive more funding based on the progression of the startup company and/or the plurality of startup companies, whether the startup company and/or the plurality of startup companies has met the plurality of goals and/or the plurality of milestones, and whether the at least one confidence score are acceptable, wherein the plurality of goals, the plurality of milestones, and the at least one confidence score is based on data captured during the plurality of functionality tracks in the previous phase, wherein during the second phase, under the continuous market analysis track, the at least one server platform is configured to continuously collect data and provide a plurality of recommendations for a minimum viable product (MVP) based on consumer needs, wherein the at least one server platform is further configured to confirm the market need, and perform a patentability analysis, wherein under the innovation track, the at least one server platform is configured to provide at least one recommendation for securing or generating new intellectual property to meet the market need with coordination across the other functionality tracks of the plurality of functionality tracks, wherein under the business operations track, the at least one server platform includes documentation and recommendations for establishing corporate framework and legal partnerships, infrastructure, and facilities with coordination across the other functionality tracks, wherein establishing corporate framework includes establishing the management team, and wherein under the marketing and sales track, the at least one server platform is configured to develop a marketing and sales strategy and perform an appropriate level of cost/price modeling in coordination with the other functionality tracks of the plurality of functionality tracks, wherein each functionality track of the plurality of functionality tracks of the phase provide information to and gain information from the other functionality tracks of the plurality of functionality tracks using the at least one ruleset and the at least one set of parameters, wherein the at least one server platform is configured to determine if the startup company and/or the plurality of startup companies should continue to the third phase and if the startup company and/or the plurality of startup companies should receive more funding based on the progression of the startup company and/or the plurality of startup companies, whether the startup company and/or the plurality of startup companies has met the plurality of goals and/or the plurality of milestones, and if at least one confidence score is of sufficient value across the plurality of functionality tracks, wherein all functionality tracks of the plurality of functionality tracks of the phase provide information to and gain information from the other tracks using the at least one ruleset and the at least one set of parameters, wherein during the third phase, under the continuous market analysis track, the at least one server platform is configured to continuously compare the MVP to the consumer data, wherein under the innovation track, the at least one server platform is configured to provide at least one detailed design and at least one working prototype of the MVP, wherein under the business operations track, the at least one server platform is configured to identify an investor and/or at least one distribution partner based on the input data and in coordination with the other functionality tracks of the plurality of functionality tracks, wherein under the marketing and sales track, the at least one server platform is configured to provide marketing and sales input data for the execution plan, wherein the execution plan is configured to define every function necessary to plan the marketing and sales activities in the next phase supporting the plurality of exit thresholds, wherein all functionality tracks of the phase provide information to and gain information from the other functionality tracks of the plurality of functionality tracks using the at least one ruleset and the at least one set of parameters, wherein the at least one server platform is configured to determine if the startup company and/or the plurality of startup companies should continue to the fourth phase and if the startup company and/or plurality of startup companies should receive more funding based on the progression of the startup company and/or plurality of startup companies, whether the startup company and/or the plurality of startup companies has met the plurality of goals and/or the plurality of milestones of the previous phase with an acceptable confidence score, wherein all functionality tracks of the plurality of functionality tracks of the phase provide information to and gain information from the other functionality tracks of the plurality of functionality tracks using the at least one ruleset and the at least one set of parameters, wherein during the fourth phase, under the continuous market analysis track, the at least one server platform is configured to monitor competition and prioritize the MVP, wherein under the innovation track, the at least one server platform is configured to confirm MVP readiness and to initiate full rate manufacturing and launch to market, wherein under the business operations track, the at least one server platform includes monitoring of at least one sales goal, providing at least one recommendation for creating a distribution chain, and providing employee support training documentation, and wherein under the marketing and sales track, the at least one server platform is configured to provide a plurality of recommendations for marketing and selling the MVP, wherein each functionality track of the plurality of functionality tracks are coordinated to ensure a successful transition to product delivery, wherein across all phases of the management system, the at least one server platform further includes at least one enterprise tool, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool is configured to collect input data related to the startup company's and/or plurality of startup companies' technology and activity without reformatting or receiving manually inputted data, wherein the at least one enterprise tool is configured to automatically transmit the pre-normalized input data to the logic engine, wherein the at least one server platform further includes a process and asset library, wherein the process and asset library includes all documentation, data, protocols, and tools for the management system, wherein the documentation includes templates, supplemental process, procedures and other documents needed to maintain consistency throughout the management system, wherein each protocol, method and template is configured to automatically generate quantifiable data elements, wherein the documentation further enables the management system to be used for a plurality of startup companies, wherein the logic engine includes a market engine, an innovation discovery engine, a reporting engine, and an artificial intelligence engine, wherein the logic engine includes methods to model, manage, and measure all data of the management system, wherein the logic engine is configured to assess the startup company and/or the plurality of startup companies as the startup company and/or the plurality of startup companies progresses through each phase, wherein the logic engine is designed to streamline the management system to automatically generate normalized, useful data to provide insights and alerts across the plurality of functionality tracks for the startup company and/or for the plurality of startup companies, wherein the market engine includes a collection and recording system, an augmentation engine, at least one confidence factor, and at least one algorithm, wherein the innovation discovery engine includes an idea engine, a technology introduction form, an initialization proposal, a viability assessment, and an innovation library, wherein the innovation library is configured to receive the input data via the web mining tool, wherein the idea engine is configured to use the web crawler to identify technologies via network based communication, wherein the idea engine is further configured to provide information to the innovation library via network communication, wherein the technology introduction form is configured to receive the startup data, wherein the innovation discovery engine is configured to determine if the startup data should be analyzed further based on the initialization form, wherein the startup data is transferred to the initialization proposal, wherein the initialization proposal includes questions that automatically collect pre-normalized data and scoreable data, wherein the initialization proposal data is scored by the artificial intelligence engine, and wherein the score is stored in the innovation library, wherein the artificial intelligence engine includes scoring logic, nominations, web mining, application interfaces, and data trends based on the input data, wherein the input data includes startup data from at least one different startup company, wherein the at least one server platform is configured to create on-demand and auto-generated insights, alerts, and reports, wherein the auto-generated insights include resource utilization, phase progress, market opportunities and threats, startup valuation with confidence factors, trends, forecasts and projections for at least one phase of the startup company and/or across the plurality of startup companies, wherein the alerts, insights, reports, and the at least one confidence score are displayed via the GUI, wherein the GUI is updated in real-time to provide real-time status of the startup company, wherein the GUI is configured to receive an assignment input in real-time, wherein the assignment input includes at least one new assignment for the management team and/or the startup company's and/or plurality of startup companies' employees to improve the startup company's and the plurality of startup companies' performance, wherein the artificial intelligence engine is configured to continuously receive, monitor and model all data received and outputted by the system, wherein the artificial intelligence engine is configured to use the modeled data to provide a recommendation for each functionality track of the plurality of functionality tracks and/or phase to lower the risk, cost, or time associated with the success of the startup company and the plurality of startup companies, wherein the at least one server platform is configured to characterize the risk and confidence of the startup company and/or the plurality of startup companies based on the alerts, insights and reports, and wherein the artificial intelligence engine is configured to include a plurality of trade-offs of cost, risk, and time against the key areas of management, innovation, marketing and sales, and continuous market analysis as well as across phases within the startup company and/or the plurality of startup companies.

The present invention further including wherein the system is further configured to reduce the risk of the most common points of failure for the startup company and/or the plurality of startup companies with a particular emphasis on the pitfalls routinely encountered by startup companies, wherein the startup company and/or the plurality of startup companies include early stage companies, spinoff companies, newly merged companies, a new division of a company and/or a company directed to creating and bringing a breakthrough, innovative technology to market. The system further providing for a risk mitigating, repeatable, stage-gated process regulated by governance. The system is further configured to automatically produce and harvest inherently normalized data, wherein the at least one server platform is configured to use the normalized data for a plurality of startup companies. The system further including a plurality of backend data enhancement and management decision aids. The system further including automated machine learning and artificial intelligence methods, wherein the automated machine learning and artificial intelligence methods are trained to enhance and improve the management system. The system is further configured for automatic quantitative assessment of opportunities and risks based on a plurality of confidence factors.

In another embodiment, the present invention includes a commercialization method for end-to-end management and execution of starting, building, and launching a startup company or simultaneously launching a plurality of startup companies that confidently yields a more robust, more consistent, and more profitable product for investors with less investment, higher likelihood of success, and in less time than other methods, including receiving input data via at least one server platform from at least one remote device, a web crawler, a web mining tool, and/or at least one database, wherein the at least one server platform is in network communication with the at least one remote device, the web crawler, the web mining tool, and the at least one database, wherein the at least one server platform includes a logic engine, at least one enterprise tool, at least one ruleset, at least one set of parameters, an application interface, and a process and asset library, wherein the logic engine includes a market engine, an innovation discovery engine, a reporting engine, and an artificial intelligence engine, wherein the market engine includes a collection and recording system, an augmentation engine, at least one confidence factor, and at least one algorithm, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool is configured to collect input data related to the startup company's technology and activity without reformatting or receiving manually inputted data, wherein the input data includes management data, intellectual property data, market data, innovation data, financial data, future sales data, time data, consumer data, and product data, wherein the web crawler is configured to automatically generate the input data, wherein the input data is updated in real-time, wherein the at least one set of parameters and the at least one ruleset include focused and repeatable metrics for the startup company and/or the plurality of startup companies to reduce risk, cost, and time to achieve success, creating a management system via the at least one server platform, wherein the management system is designed to lower risk, improve capital resource efficiency and reduce time to launch, wherein the management system includes a first phase, a second phase, a third phase, and a fourth phase, wherein each phase include predictive and classical analysis with a plurality of entry thresholds and a plurality of exit thresholds to achieve business success, wherein the management system further includes an infrastructure, wherein the infrastructure includes a plurality of functionality tracks, wherein the plurality of functionality tracks includes a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time, wherein the plurality of goals is further design to keep the startup company and/or the plurality of startup companies on track to meet the plurality of exit thresholds, wherein the management system includes a management summary, wherein the management summary includes summary data on the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or plurality of startup companies, wherein the plurality of entry thresholds and plurality of exit thresholds must be met before moving to the next phase, wherein under the continuous market analysis track, the at least one server platform is configured to continuously sample, research, and determine market and consumer needs, create and refine a product concept, and provide a plurality of recommendations to identify and maintain a representative customer base based on the input data, and develop and maintain a customer base based on the input data, wherein under the innovation track, the at least one server platform is configured to assess the startup company's and/or plurality of startup companies' technology and develop a truly unique, "one-of-one" solution, wherein the one-of-one solution is directed to meet unfulfilled or underserviced market pain points and address a societal need, wherein under the business operations track, the at least one server platform is directed to incrementally staged project and business management functions, wherein the at least one server platform is configured to identify potential business partnerships, create a production and supply strategy, determine the cost efficiency of manufacturing, and provide a plurality of financial management recommendations and projections related to the startup company's and/or plurality of startup companies' market and technology, wherein under the marketing and sales track, the at least one server platform is configured to plan a product lifecycle and at least one early revenue generating action, wherein the at least one server platform is further configured to perform risk identification routines and generate alerts related to competition, wherein the management system is further configured to analyze the future needs based on the input data and the related needs for the startup company and/or the plurality of startup companies in the current phase, transforming the input data to pre-normalized, standard, consistent time-stamped data, wherein the at least one enterprise tool is configured to automatically transmit the pre-normalized input data to the logic engine, automatically generating quantifiable data elements via the process and asset library, wherein the process and asset library includes all documentation, data, protocols and tools for the management system, wherein the documentation includes templates, supplemental process, procedures and other documents needed to maintain consistency throughout the management system, wherein each protocol, method and template is configured to automatically generate quantifiable data elements, wherein the documentation further enables the management system to be used for a plurality of startup companies, wherein the at least one server platform is further configured to generate a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track, identifying technology data via the web crawler, providing the input data to the innovation discovery engine via network communication, wherein the innovation discovery engine includes an idea engine, a technology introduction form, an initialization proposal, a viability assessment, and an innovation library, wherein the innovation library is configured to receive the input data via the web mining tool, receiving the startup data via the technology introduction form, determining whether to further analyze the startup based on the technology introduction form, transmitting data to the initialization proposal, wherein the initialization proposal includes questions that automatically collect pre-normalized data and scoreable data automatically collecting pre-normalized data and scoreable data via the initialization proposal, scoring the initialization proposal data via an artificial intelligence engine, wherein the artificial intelligence engine includes scoring logic, nominations, web mining, and data trends based on the input data, wherein the input data includes startup data from at least one different startup company, generating a plurality of goals and a plurality of milestones for each phase, wherein the plurality of goals is designed to limit risk, prioritizing at least one functionality track of the plurality of functionality tracks based on the input data for each functionality track of the plurality of functionality tracks, tracking the amount of time spent for each functionality track of the plurality of functionality tracks, tracking the progress of each phase, generating at least one confidence score for the input data and for the progress of the startup company and/or the plurality of startup companies, wherein the at least one confidence score indicates the risk of the startup company and/or the plurality of startup companies, wherein the at least one server platform is configured to record and timestamp the input data and the at least one confidence score during and after the startup company and/or the plurality of startup companies progresses through a phase for analysis, creating a management team and performing automatic assessment of the startup and/or the plurality of startup companies, wherein the at least one server platform is configured to provide at least one recommendation for the management team, wherein the management team includes only nonemployees of the startup company, wherein the management system is configured so the members of the management team will transition to only the startup company's and/or the plurality of startup companies' employees by the end of fourth phase, assessing a market need via the at least one server platform under the continuously market analysis track, wherein the at least one server platform is further configured to assess the impact of the market need on the other functionality tracks of the plurality of functionality tracks, wherein the at least one server platform is configured to devise the one-of-one solution with associated tradeoffs to allow for coordination with the other functionality tracks of the plurality of functionality tracks, framing an execution plan under the business operations track via the at least one server platform, creating a pricing plan under the marketing and sales track via the at least one server platform, wherein the at least one server platform is configured to create a pricing plan in coordination with the other functionality tracks of the plurality of functionality tracks, wherein information is received by the at least one server platform under all functionality tracks of the plurality of functionality tracks of the phase, wherein the at least one server platform is configured to analyze the data for each functionality track of the plurality of functionality tracks based on the at least one ruleset and the at least one set of parameters, wherein each functionality track of the plurality of functionality tracks is configured to incorporate data captured during other the functionality tracks of the plurality of functionality tracks, determining if the startup should proceed to the second phase, wherein the at least one server platform is further configured to determine if the startup company and/or the plurality of startup companies should receive more funding based on the progression of the startup company and/or the plurality of startup companies, whether the startup company and/or the plurality of startup companies has met the plurality of goals and/or the plurality of milestones, and whether the at least one confidence score is acceptable, wherein the plurality of goals, plurality of milestones, and the at least one confidence score are based on the data captured during the plurality of functionality tracks in the previous phase, providing a plurality of recommendations for a minimum viable product (MVP) based on consumer needs from continuously collected input data via the at least one server platform under the continuous market analysis track, confirming the market need via the at least one server platform under the continuous market analysis track, performing patentability analysis via the at least one server platform under the continuous market analysis track, providing at least one recommendation for securing or generating new intellectual property to meet the market need under the innovation track with coordination across the other functionality tracks of the plurality of functionality tracks, establishing corporate framework and legal partnerships, infrastructure and facilities under the business operations tracks with coordination across the other functionality tracks of the plurality of functionality tracks, wherein the at least one server platform includes documentation and a plurality of recommendations for establishing the corporate framework and legal partnerships, infrastructure, and facilities, wherein establishing corporate framework includes establishing the management team, developing a marketing and sales strategy under the marketing and sales track, wherein the at least one server platform is configured to develop a marketing and sales strategy and perform an appropriate level of cost/price modeling with the other functionality tracks of the plurality of functionality tracks, wherein all functionality tracks of the plurality of functionality tracks of the phase provide information to and gain information from the other functionality tracks of the plurality of functionality tracks, determining if the startup company and/or the plurality of startup companies should continue to the third phase and if the startup company and/or the plurality of startup companies should receive more funding based on the progression of the startup company and/or the plurality of startup companies, whether the startup company has met the plurality of goals and/or the plurality of milestones, and whether the at least one confidence score is acceptable, wherein the plurality of goals, the plurality of milestones, and the at least one confidence score are based on the plurality of functionality tracks in the previous phase, comparing the MVP to the consumer data via the at least one server platform under the continuous market analysis track, providing at least one detailed design and at least one working prototype of the MVP under the innovation track via the at least one server platform, identifying at least one investor and/or at least one distribution partner based on the input data and in coordination with the other functionality tracks of the plurality of functionality tracks, defining the execution plan via the at least one server platform under the marketing and sales track, wherein the execution plan is configured to define every function necessary to plan the marketing and sales activities in the next phase supporting the plurality of exit thresholds, wherein all functionality tracks of the phase provide information to and gain information from the other functionality tracks using the at least one ruleset and/or the at least one set of parameters, determining if the startup company and/or the plurality of startup companies should continue to the fourth phase and if the startup company should receive more funding via the at least one server platform based on the progression of the startup company and/or the plurality of startup companies, and whether the startup company and/or the plurality of startup companies has met the plurality of goals and/or the plurality of milestones of the previous phase with an acceptable at least one confidence score, monitoring competition and prioritizing the MVP via the at least one server platform under the continuous market analysis track, determining if the MVP is ready for full rate manufacturing and launch to market via the at least one server platform under the innovation track, monitoring of at least one sales goal, providing at least one recommendation for creating a distribution chain and providing employee support training documentation via the at least one server platform under the business operations track, providing a plurality of recommendation for marketing and selling the MVP via the server platform under the marketing and sales track, wherein the plurality of functionality tracks are coordinated to ensure a successful transition to product delivery, monitoring competition, prioritizing the MVP, finalizing the MVP for launch to market, executing and monitoring sales goals, creating a distribution chain, providing employee training and selling the MVP during the fourth phase, creating on-demand and auto-generated insights, alerts and reports for each phase and functionality track of the plurality of functionality tracks, wherein the auto-generated insights include resource utilization, phase progress, market opportunities and threats, startup valuation with confidence factors, trends, forecasts and projections for at least one phase of the startup company and/or across the plurality of startup companies, displaying the alerts, the insights, the reports, and the at least one confidence score via the GUI, wherein the GUI is updated in real-time to provide real-time status of the startup company and/or the plurality of startup companies, wherein the GUI is configured to receive an assignment input in real-time, wherein the assignment input includes at least one new assignment for the management team, the startup company's employees and/or the plurality of startup companies' employees to improve the startup company's and/or the plurality of startup companies' performance, monitoring and modeling all data received and outputted by the at least one server platform via the artificial intelligence engine, wherein the artificial intelligence engine is configured to include a plurality of trade-offs of cost, risk, and time against the key areas of management, innovation, marketing and sales, and continuous market analysis as well as across phases within the startup company and the plurality of startup companies, providing a recommendation via the artificial intelligence engine based on the modeled data for each functionality track of the plurality of functionality tracks and/or phase to improve the management system to lower the risk, cost, and time associated with the success of the startup company, and characterizing the risk and confidence of the startup and/or plurality of startup companies based on the alerts, insights and reports.

The commercialization method further including reducing risk of the most common points of failure for the startup company and/or the plurality of startup companies, wherein the startup company and/or the plurality of startup companies include early stage companies, spinoff companies, newly merged companies, a new division of a company and/or a company directed to creating and bringing a breakthrough, innovative technology to market. The method further including providing a risk mitigating, repeatable, stage-gated process regulated by governance. The method further including automatically producing and harvesting inherently normalized data, wherein the at least one server platform is configured to use the normalized data for a plurality of startup companies. The method further including wherein the management system further includes a plurality of backend data enhancement and management decision aids. The method further including automated machine learning and artificial intelligence methods, wherein the automated machine learning and artificial intelligence methods are trained to enhance and improve the management system. The method further including wherein the management system is configured for automatic quantitative assessment of opportunities and risks based on a plurality of confidence factors.

In yet another embodiment, the present invention includes a system for providing an end to end, systematic, and repeatable approach for starting, building, and launching a single startup company or simultaneously launching a plurality of startup companies including at least one server platform including a logic engine, and at least one remote device including a graphical user interface (GUI), wherein the at least one server platform includes at least one set of parameters and at least one ruleset, wherein the at least one set of parameters and the at least one ruleset include focused and repeatable metrics for the single startup company and/or the plurality of startup companies to reduce risk, cost, and time to achieve success, wherein the at least one server platform includes a web crawler, a web mining tool, an application interface, and at least one database accessible via network communication, wherein the at least one server platform is configured to receive input data from the at least one remote device, the web crawler, the web mining tool and/or the at least one database via network communication, wherein the input data includes management data, intellectual property data, market data, innovation data, financial data, future sales data, time data, consumer data, and product data, wherein the web crawler is configured to automatically generate the input data, wherein the input data is updated in real-time or near real-time, wherein the at least one server platform is configured to transform the input data to pre-normalized, standard, consistent, time-stamped input data, wherein the at least one server platform includes a management system, wherein the management system includes a first phase, a second phase, a third phase, and a fourth phase, wherein each phase includes continuous, predictive, and classical analysis with a plurality of entry thresholds and a plurality of exit thresholds to achieve business success, wherein the plurality of entry thresholds and plurality of exit thresholds must be met before moving to the next phase, wherein the management system further includes an infrastructure, wherein the infrastructure is separated into a plurality of functionality tracks, wherein the plurality of functionality tracks include a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time and is designed to keep the startup company and/or the plurality of startup companies on track to meet the plurality of exit thresholds, wherein the at least one server platform includes a management summary, wherein the management summary includes summary data corresponding to each functionality track of the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or the plurality of startup companies, wherein the management system is configured for analysis of future needs based on the input data and the related needs of the startup company and/or the plurality of startup companies in its current phase, wherein under the continuous market analysis track, the at least one server platform is configured to continuously sample, research, and determine market and consumer needs, create and refine a product concept, and provide a plurality of recommendations to identify and maintain a representative customer base based on the input data, wherein under the innovation track, the at least one server platform is configured to assess the startup company's technology and develop a truly unique, "one-of-one" solution, wherein the "one-of-one solution" is directed to meet unfulfilled or underserviced market pain points and address a societal need, wherein under the business operations track, the at least one server platform is directed to incrementally staged project and business management functions, wherein the at least one server platform is configured to identify potential business partnerships, create a production and supply strategy, determine the cost efficiency of manufacturing, and provide a plurality of financial management recommendations and projections related to the startup company's and/or the plurality of startup companies' market and technology, wherein under the marketing and sales track, the at least one server platform is configured to plan a product lifecycle and at least one early revenue generating action, wherein the at least one server platform is further configured to perform risk identification routines, and generate alerts related to competition, wherein the at least one server platform is configured to generate a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track of the plurality of functionality tracks, wherein the management system is configured to prioritize at least one functionality track based on the input data for each functionality track of the plurality of functionality tracks, wherein the at least one server platform is configured to track the progress of each phase, wherein the progress of each phase is displayed via the GUI, wherein the at least one server platform is further configured to track the amount of time spent for each functionality track of the plurality of functionality tracks, wherein the at least one server platform is configured to generate at least one confidence score for the input data and for the progress of the startup company and/or the plurality of startup companies, wherein the at least one confidence score indicates the risk of the startup company and/or the plurality of startup companies, wherein the at least one server platform is configured to record and timestamp the input data and the at least one confidence score during and after the startup company and/or the plurality of startup companies progresses through a phase for analysis, wherein the first phase includes creating a management team and performing automatic assessment of the startup company and/or the plurality of startup companies, wherein the at least one server platform is configured to provide at least one recommendation for the management team, wherein the management team initially includes employees predominantly external to the startup company and employs a specialized mentored management strategy that transitions executive management roles to the startup company by the end of the fourth phase, wherein under the continuous market analysis track, the at least one server platform is configured to assess at least one market need and at least one impact to the other functionality tracks based on the at least one market need, wherein under the innovation track, the at least one server platform is configured to devise the one-of-one solution with associated tradeoffs to allow for coordination with the other functionality tracks of the plurality of functionality tracks, wherein under the business operations track, the at least one server platform is configured to frame an execution plan with manufacturing and design considerations in coordination with the other functionality tracks of the plurality of functionality tracks, and wherein under the marketing and sales track, the at least one server platform is configured to create a pricing plan in coordination with the other functionality tracks of the plurality of functionality tracks, wherein all functionality tracks of the plurality of functionality tracks of the phase provide information to the at least one server platform, wherein the at least one server platform is configured to analyze the data for each functionality track of the plurality of functionality tracks based on the at least one ruleset and the at least one set of parameters, wherein each functionality track of the plurality of functionality tracks is configured to incorporate data captured during other functionality tracks of the plurality of functionality tracks, wherein the at least one server platform is further configured to determine if the startup company and/or the plurality of startup companies should proceed to the second phase, wherein the at least one server platform is further configured to determine if the startup company and/or plurality of startup companies should receive more funding based on the progression of the startup company and/or the plurality of startup companies, whether the startup company and/or the plurality of startup companies has met the plurality of goals and/or the plurality of milestones, and whether the at least one confidence score are acceptable, wherein the plurality of goals, the plurality of milestones, and the at least one confidence score is based on data captured during the plurality of functionality tracks in the previous phase, wherein during the second phase, under the continuous market analysis track, the at least one server platform is configured to continuously collect data and provide a plurality of recommendations for a minimum viable product (MVP) based on consumer needs, wherein the at least one server platform is further configured to confirm the market need, and perform a patentability analysis, wherein under the innovation track, the at least one server platform is configured to provide at least one recommendation for securing or generating new intellectual property to meet the market need with coordination across the other functionality tracks of the plurality of functionality tracks, wherein under the business operations track, the at least one server platform includes documentation and recommendations for establishing corporate framework and legal partnerships, infrastructure, and facilities with coordination across the other functionality tracks, wherein establishing corporate framework includes establishing the management team, and wherein under the marketing and sales track, the at least one server platform is configured to develop a marketing and sales strategy and perform an appropriate level of cost/price modeling in coordination with the other functionality tracks of the plurality of functionality tracks, wherein each functionality track of the plurality of functionality tracks of the phase provide information to and gain information from the other functionality tracks of the plurality of functionality tracks using the at least one ruleset and the at least one set of parameters, wherein the at least one server platform is configured to determine if the startup company and/or the plurality of startup companies should continue to the third phase and if the startup company and/or the plurality of startup companies should receive more funding based on the progression of the startup company and/or the plurality of startup companies, whether the startup company and/or the plurality of startup companies has met the plurality of goals and/or the plurality of milestones, and if at least one confidence score is of sufficient value across the plurality of functionality tracks, wherein all functionality tracks of the plurality of functionality tracks of the phase provide information to and gain information from the other tracks using the at least one ruleset and the at least one set of parameters, wherein during the third phase, under the continuous market analysis track, the at least one server platform is configured to continuously compare the MVP to the consumer data, wherein under the innovation track, the at least one server platform is configured to provide at least one detailed design and at least one working prototype of the MVP, wherein under the business operations track, the at least one server platform is configured to identify an investor and/or at least one distribution partner based on the input data and in coordination with the other functionality tracks of the plurality of functionality tracks, wherein under the marketing and sales track, the at least one server platform is configured to provide marketing and sales input data for the execution plan, wherein the execution plan is configured to define every function necessary to plan the marketing and sales activities in the next phase supporting the plurality of exit thresholds, wherein all functionality tracks of the phase provide information to and gain information from the other functionality tracks of the plurality of functionality tracks using the at least one ruleset and the at least one set of parameters, wherein the at least one server platform is configured to determine if the startup company and/or the plurality of startup companies should continue to the fourth phase and if the startup company and/or plurality of startup companies should receive more funding based on the progression of the startup company and/or plurality of startup companies, whether the startup company and/or the plurality of startup companies has met the plurality of goals and/or the plurality of milestones of the previous phase with an acceptable confidence score, wherein all functionality tracks of the plurality of functionality tracks of the phase provide information to and gain information from the other functionality tracks of the plurality of functionality tracks using the at least one ruleset and the at least one set of parameters, wherein during the fourth phase, under the continuous market analysis track, the at least one server platform is configured to monitor competition and prioritize the MVP, wherein under the innovation track, the at least one server platform is configured to confirm MVP readiness and to initiate full rate manufacturing and launch to market, wherein under the business operations track, the at least one server platform includes monitoring of at least one sales goal, providing at least one recommendation for creating a distribution chain, and providing employee support training documentation, and wherein under the marketing and sales track, the at least one server platform is configured to provide a plurality of recommendations for marketing and selling the MVP, wherein each functionality track of the plurality of functionality tracks are coordinated to ensure a successful transition to product delivery, wherein across all phases of the management system, the at least one server platform further includes at least one enterprise tool, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool is configured to collect input data related to the startup company's and/or plurality of startup companies' technology and activity without reformatting or receiving manually inputted data, wherein the at least one enterprise tool is configured to automatically transmit the pre-normalized input data to the logic engine, wherein the at least one server platform further includes a process and asset library, wherein the process and asset library includes all documentation, data, protocols, and tools for the management system, wherein the documentation includes templates, supplemental process, procedures and other documents needed to maintain consistency throughout the management system, wherein each protocol, method and template is configured to automatically generate quantifiable data elements, wherein the documentation further enables the management system to be used for a plurality of startup companies, wherein the logic engine includes a market engine, an innovation discovery engine, a reporting engine, and an artificial intelligence engine, wherein the logic engine includes methods to model, manage, and measure all data of the management system, wherein the logic engine is configured to assess the startup company and/or the plurality of startup companies as the startup company and/or the plurality of startup companies progresses through each phase, wherein the logic engine is designed to streamline the management system to automatically generate normalized, useful data to provide insights and alerts across the plurality of functionality tracks for the startup company and/or for the plurality of startup companies, wherein the market engine includes a collection and recording system, an augmentation engine, at least one confidence factor, and at least one algorithm, wherein the innovation discovery engine includes an idea engine, a technology introduction form, an initialization proposal, a viability assessment, and an innovation library, wherein the innovation library is configured to receive the input data via the web mining tool, wherein the idea engine is configured to use the web crawler to identify technologies via network based communication, wherein the idea engine is further configured to provide information to the innovation library via network communication, wherein the technology introduction form is configured to receive the startup data, wherein the innovation discovery engine is configured to determine if the startup data should be analyzed further based on the initialization form, wherein the startup data is transferred to the initialization proposal, wherein the initialization proposal includes questions that automatically collect pre-normalized data and scoreable data, wherein the initialization proposal data is scored by the artificial intelligence engine, and wherein the score is stored in the innovation library, wherein the artificial intelligence engine includes scoring logic, nominations, web mining, application interfaces, and data trends based on the input data, wherein the input data includes startup data from at least one different startup company, wherein the at least one server platform is configured to create on-demand and auto-generated insights, alerts, and reports, wherein the auto-generated insights include resource utilization, phase progress, market opportunities and threats, startup valuation with confidence factors, trends, forecasts and projections for at least one phase of the startup company and/or across the plurality of startup companies, wherein the auto-generated insights include resource utilization, phase progress, market opportunities and threats, startup valuation with confidence factors, trends, forecasts and projections for at least one phase of the startup company and/or across the plurality of startup companies, wherein the alerts, insights, reports, and the at least one confidence score are displayed via the GUI, wherein the GUI is updated in real-time to provide real-time status of the startup company, wherein the GUI includes a plurality of dashboards, wherein the plurality of dashboards include a dashboard for each startup of the plurality of startup companies, wherein the plurality of dashboards further includes a dashboard for each phase and a CEO dashboard, wherein each phase dashboard includes data related to the plurality of goals, the plurality of milestones, the plurality of entry thresholds, the plurality of exit thresholds, early risk identification alerts, an algorithmic interpretation of a real-time management system status that is automatically generated in the management system as a byproduct of each phase and the plurality of functionality tracks, and cross management system integrated data analysis, wherein the CEO dashboard includes key pieces of data for the startup company and/or the plurality of startup companies, wherein the key pieces of data for the startup company and/or the plurality of startup companies include a rollup of all startup company risk and phase status, cross startup company personnel resourcing, capital financing status, and innovation status, wherein the rollup of all startup company risk and phase status includes data for all positions at the startup company and/or the plurality of startup companies to enable the management team to consider impacts across the entire startup company and/or the plurality of startup companies, wherein the dashboard for the startup company and/or the plurality of startup companies includes the current phase of the startup company and/or the plurality of startup companies, the amount of funds allocated to the startup company and/or the plurality of startup companies, the amount of funds expended by the startup company and/or the plurality of startup companies, alerts, spending by each functionality track of the plurality of functionality tracks for the startup company and/or the plurality of startup companies, the progression of the startup company and/or the plurality of startup companies towards the plurality of goals and the plurality of milestones, and the pricing model for the startup company and/or the plurality of startup companies, wherein the GUI is configured to receive an assignment input in real-time, wherein the assignment input includes at least one new assignment for the management team and/or the startup company's and/or plurality of startup companies' employees to improve the startup company's and the plurality of startup companies' performance, wherein the GUI is further configured to display all data defined by the at least one ruleset and the at least one set of parameters, wherein the GUI is further configured to display data based on a user's position in the startup company, the plurality of the startup companies, and/or the management team, wherein the GUI enables the management team to make and distribute decisions for the startup and/or the plurality of startup companies, wherein the GUI is further configured to allow the management team to analyze a startup company and the plurality of startup companies for each functionality track of the plurality of functionality tracks, each phase, and all activities occurring in each functionality track of the plurality of functionality tracks and each phase, wherein the GUI is driven by the at least one ruleset, the at least one set of parameters, and the logic engine to create a real-time dynamic feedback loop to enable the management team to consider all aspects of the entire startup company and/or the plurality of startup companies before providing at least one recommendation for the startup company and/or the plurality of the startup companies, wherein the artificial intelligence engine is configured to continuously receive, monitor and model all data received and outputted by the system, wherein the artificial intelligence engine is configured to use the modeled data to provide a recommendation for each functionality track of the plurality of functionality tracks, phase and the GUI to lower the risk, cost, or time associated with the success of the startup company and the plurality of startup companies, wherein the at least one server platform is configured to characterize the risk and confidence of the startup company and/or the plurality of startup companies based on the alerts, insights and reports, and wherein the artificial intelligence engine is configured to include a plurality of trade-offs of cost, risk, and time against the key areas of management, innovation, marketing and sales, and continuous market analysis as well as across phases within the startup company and/or the plurality of startup companies.

The present invention further includes wherein the system is further configured to reduce the risk of the most common points of failure for the startup company and/or the plurality of startup companies with a particular emphasis on the pitfalls routinely encountered by startup companies, wherein the startup company and/or the plurality of startup companies include early stage companies, spinoff companies, newly merged companies, a new division of a company and/or a company directed to creating and bringing a breakthrough, innovative technology to market and for a risk mitigating, repeatable, stage-gated process regulated by governance. The system is further configured to automatically produce and harvest inherently normalized data, wherein the at least one server platform is configured to use the normalized data for a plurality of startup companies. The system further including a plurality of backend data enhancement and management decision aids. The system further including automated machine learning and artificial intelligence methods, wherein the automated machine learning and artificial intelligence methods are trained to enhance and improve the management system. The system is further configured for automatic quantitative assessment of opportunities and risks based on a plurality of confidence factors. The present invention is directed to automated work systems and methods for analyzing technology, intellectual property, markets, corporate management, and structure for commercialization for improved impact and return on investment. The present invention includes a system for automated analysis and assessment of technology content related to intellectual property and innovation for applications for new business ventures.

New concepts and businesses fuel the economy. However, less than 0.1% of all new ideas presented are funded by venture capitalists and get to market. This creates a stagnant innovation ecosystem, limits the opportunity to infuse ground-breaking capabilities into addressable markets and reduces the community benefits associated with an increase of small business. In the new product and technical arenas, most businesses fail because they do not have a proven process that drives success. Dysfunctional corporate management and the inability to manage entrepreneurial complexities such as illuminating market needs, homing in on a unique product-market fit, raising the right amount of capital at the right time for essential expenditures contribute to the failure of many of the 90% of new business ventures that fail. In fact, most new ideas are fueled with good concepts and passion that are not translated into essential commercialization issues like manufacturing, connecting to buyers and markets, management by staff that understands new organizations, and therefore are unable to raise the necessary funds to launch a new venture. Also, many technology inventors dream of starting a successful business, but the inventors lack process, controls, and experience required to go from an inventor with a good idea to the new entrepreneur with a successful business. Similarly, many company executives dream of launching disruptive innovation, but lack the process, controls, and experience required for this innovation. The transition to go from idea owner to successful entrepreneur requires expertise and processes that are often not considered and that have not been automated or presented in a Software as a Service (SaaS) model or cloud network-based platform. Additionally, current stage-gating systems and lean startup models have not sufficiently addressed strategically critical decisions, the quantum of risk, and associated changing environmental complexities.

There is a longstanding and unmet need in the relevant art to provide for full-scope, integrated, end-to-end systems and methods for commercializing technology in a repeatable, quantifiable, measurable, risk-reducing manner. Furthermore, there is a long-standing and unmet need to provide a commercialization method that generates and leverages the combinatoric data from automated analysis and assessment of technology content related to intellectual property and innovation for applications for early stage business ventures; automated analysis and assessment of the marketability of the technology or intellectual property; automated analysis and assessment of management and business systems; and automated analysis and assessment of marketing and sales systems, to increase commercial impact success rates, preferably including an automated rating or ranking system for providing a quantitative assessment from qualitative information and from data sources having unstructured data and/or various types of structured data that are not readily reviewable, assessable, or otherwise analyzable in a distributed, automated manner. Finally, there is a long-standing and unmet need to provide a repeatable system and method of mitigating the risks common to early-stage companies that tend to dissuade investors from infusing investment dollars into technology commercialization opportunities.

Also, for intellectual property assessment, the number of patent applications is increasing yearly. From 1963 through 1983, approximately 100,000 patent applications per year were filed at the United States Patent & Trademark Office (USPTO), whereas in 2015 alone, 629,647 patent applications were filed. Technology innovation, which needs patent protection to attract capital for development and commercialization, is driving this trend. Interestingly, technology is also facilitating the trend: word processing, remote electronic database searching, and similar technologies are facilitating the patent application process, both for high-technology and low-technology inventions. This large increase in patent applications, and patents in general, means that the ability to understand and evaluate patent documents and competitive position with respect to a large field of other patent property is a difficult task, and is only becoming more difficult with time. This further accentuates the need for a holistic, repeatable process for commercialization that accommodates the rise in technology and the small pool of investment funds for early-stage companies.

Other prior art relevant to the present invention includes problem-solving techniques that have been outlined in process flow in prior art examples, such as Kepner-Tregoe techniques, and include thinking models and capability development for businesses and consulting solutions.

However, these methodologies and techniques are neither sufficient nor automated for application of technology commercialization or business establishment in new markets. Furthermore, prior art fails to provide a systemic and repeatable approach to evaluate and bring technologies to market, or to reduce the risk to early-stage company investors.

Thus, a need exists for automated systems and methods to provide an end-to-end, full-scope, systematic and repeatable approach to bring new technologies to market and to provide quantifiable, standards-based evaluation criteria to investors to increase investor confidence and interest in early stage company investment. Also, a need exists for automated systems and methods to provide for dynamic visualization of patent documents that provide for interactive graphic user interface (GUI) visuals relating to issued patents and/or patent applications.

By way of example and not limitation, the present invention systems and methods (hereinafter referred to as the Transformative Corporate Formation (TCF) Process) include an automated process for commercialization success of a technology or technological solution, application, or implementation. The TCF Process combines systems engineering discipline and techniques with domain-specific engineering knowledge, experienced management, and entrepreneurial business operations leadership and methods to form, manage, mentor and launch Transformative Organizations (TOs), a TCF categorization to differentiate early-stage companies which succeed over about 80% of the time from traditional startups.

The systems and methods of the present invention, including the automated platform for TCF, provide a repeatable, automated solution to transform an idea or a concept into a profitable venture having commercial success, wherein success is determined at least by factors including revenue, revenue growth, profit, market share, product or service adoption rates, and combinations thereof. TCF is used to automatically evaluate, organize, identify required funding for new product delivery in new or existing organizations with at least 80% chance of market-based successful operations. TCF includes automated step-based actions for a project that provides for the product or service embodying a new technology or technological solution, application, or implementation to be transformed from start or input of an idea or concept to commercial success within a timeline of as few as 20 to 30 months at a cost of as little as $15-25M. This TCF solution addresses a longstanding, unmet need that typical exhibits a requirement of at least a 60-72 month period and a corresponding cost or investment of $40-50M. By contrast to prior art, the systems and methods of the present invention, including the TCF platform, save years of time and tens of millions of dollars of investment, thereby increasing return to the entrepreneur and investor. The TCF platform includes a clear, repeatable, automated process that defines and evaluates the metrics and outlines the steps required to realize commercialization success for introducing a new product or service embodying a new technology or technological solution, application, or implementation.

The present invention also includes methods for aiding timely, informed, and strategically critical decisions which dramatically improve the probability of success of a new company. TCF includes systems and methods which implement principles of quantum uncertainty, Kepner-Tregoe (K-T) decision analysis, and Statistical Process Control (SPC). TCF is advantageously implementable for any type of new business venture with any type of new product or service.

The present invention further stands apart from prior art as it includes a capital infusion ladder that provides a TO financial resources sufficient to accomplish the phased goals of a TO.

The funding ladder affords a TO the opportunity to increase sales and profitability by providing the precisely sized funding increments needed to shorten new product Time-To Market (TTM). By putting only the amount of money needed for essential expenditures on the line, fewer investor dollars are placed at risk and focus is maintained on critical tasks. The present invention calculates the expected growth of the TO and the intended market in order to determine the necessary funding. The present invention leverages the TCF timelines, products, governance, metrics and trends generated by the framework and the machine learning (ML)/artificial intelligence (AI) algorithms to characterize the level of risk and the confidence in the approach for a TO at any given time in the TCF process. No other prior art offers an integrated capital funding source with an end-to-end systems engineering based automated model of creating, managing, producing and launching an early stage company.

The present invention provides access to public and private funding to the user via the GUI and cloud-based network. A TO is able to present its market solution and communicate with investors via network communications through the GUI. The GUI enables a TO to see an investor's requirements and/or interests. This allows the TO to find the investor that is the best fit.

In one embodiment, TCF includes a TCF Commercialization Fund. The TCF Commercialization Fund includes multiple investment opportunities for investors. A remote device communicates via the cloud-based network with the TCF Commercialization Fund to receive access to funding. The TCF platform is configured to allow the TO to present to the TCF Commercialization Fund towards the end of Phase 2 and to be considered for Series A Round funding. The TCF platform is configured to display the TO's data via the GUI to investors. The TCF platform is operable to receive queries from investors when collecting and analyzing a TO's data. Advantageously, the TCF platform provides direct communication between the TO and investors while providing reliable consistent data on the TO, thereby improving the speed that TO's receive funding and lowering the investors' risk.

Transformative Corporate Formation

TCF is a systems-engineering based commercialization method for end-to-end management and execution of starting, building, and launching early-stage companies that confidently yields a more robust, more consistent, and more profitable product for investors with less investment, higher likelihood of success, and in less time than other methods, fueled by: 1: A method of management that overcomes the most common points of failure for startups; 2: Risk mitigating, repeatable, stage-gated processes regulated by governance; 3: Instrumented work systems that automatically produce and harvest inherently normalized, quantifiable data that feed TILLER; 4: Backend data enhancement and management decision aids and 5: Automated Machine Learning (ML) and Artificial Intelligence (AI) methods trained on TCF enhancement and process improvement. The goal of TCF is to dramatically improve capital efficiency and reduce the time to bring commercialized technology to market. Early-stage companies include startup companies, merged companies, new divisions of a company, spinoff companies, and other companies that are directed to creating and bringing a breakthrough, innovative technology to market.

The present invention provides for calculating business outcome effectiveness, which heavily weights market barriers to entry (e.g., "one of one" product) and includes automated analysis and assessment of technology content related to intellectual property and innovation for applications for TOs and investment. This analysis and assessment increase commercial impact success rates and include an automated rating or ranking system for providing a quantitative assessment from qualitative information and from data sources having unstructured data and/or various types of structured data that are not readily reviewable, assessable, or otherwise analyzable in a distributed, automated manner. The TCF platform of the present invention identifies significant risks of failure and detailed mitigations for avoiding failure points or unwanted side effects at any stage or phase that might negatively impact commercialization within the predetermined timeline or timebox.

By contrast to prior art, TCF provides for holistic, integrated and rapid assessment of a technology product concept, of market pull and the pairing thereof to ensure successful commercialization within as few as 24 months from start of the input to the system, thereby providing a systematic, engineered transformation of an idea into a commercialized implementation or application of a technology represented by the idea.

1: A Method of Management that Overcomes the Most Common Points of Failure for Startups 1a. Harmonized C-Suite with Entrepreneurial Management Expertise and Planned Corporate Officer Mentorship to Transition Plan One of the most prevalent, documented factors for the failure of startups is dysfunctional management. For many startups, building an executive team from scratch adds management uncertainty, significant committed expense for fully loaded executive level salaries plus benefits, and delay to overall effort. All three of these areas are red flag indicators of high-risk to investors.

In the present invention, TCF provides a harmonized C-suite with entrepreneurial management expertise and a planned corporate officer mentorship transition plan. One of the fundamental differentiators of TCF is the built-in premier entrepreneurial management team. The TCF Management Team (TMT) is a harmonized, pre-meshed and established C-suite comprised of highly functioning subject matter experts across multiple segments of the economy who are proven in commercializing capabilities.

In one embodiment, the TCF process includes a method for custom-selecting members for TMT that fit the precise needs of each TO and at value pricing. The method ensures that the combined experience in the market sector and technology sector is sufficient to realize the revenue goal and timing, as well as ensuring high confidence in TCF proficiency and entrepreneurial business acumen. A critical and objective assessment is conducted of the TMT experience and knowledge base in a target market before any commitment is made to a TO. Preferably, the TMT is selected based on pre-established norms and proven abilities to perform at a high level in similar C-suite roles with one another on previous new business launches. Factors of evaluation, quantifiable to the greatest extent possible, include but are not limited to: management team acumen across all TO functions, level of understanding of the TCF Process, prior track record of success, depth of subject matter expertise in the technical aspects of the TO, depth of business management and finance executives in standard and entrepreneurial endeavors, availability for the duration of the TO engagement, and presence of any disfunction with legacy founders, TMT members or partners. By selecting a TMT that has prior experience working with each other, the TCF process mitigates the major failure risk of having a dysfunctional management team.

In another embodiment, a foundational element of the TCF management method is that the TMT takes full ownership of all aspects of corporate formation and project management, applying its unparalleled experience to the atypical business management environment that is unique to startup companies, and ensures that the interests of investors are fully addressed. This alleviates the IP-producer from having to halt the advancement of their unique technologies to learn how to most effectively raise capital, manage investor relationships, startup a corporation that facilitates long-term goals as well as near term revenue, produce properly scoped patent submissions, develop one-of-one CONOPS by rounding out the technology for the best chance of market success, negotiate partnerships, identify distribution channels and so forth. Furthermore, the TCF management method encompasses all other non-product focused activities (HR, payroll, benefits, office space, et al), offering further consistency, savings in scale and immediate availability on day one. By providing these efficiently honed sets of just-in-time, pre-configured services, the TCF management method mitigates time and money losses for infrastructure standup of a company. The infrastructure standup of a company includes obtaining office space, buying office furniture and equipment, setting up utilities, setting up an accounting system, setting up a payroll system, and other business necessities for the operations of a TO. Together, the TCF management and service-provision methods provide immediate mitigation of common disorganization, lack of awareness, reactive and expensive approaches to startups.

Figure 2:
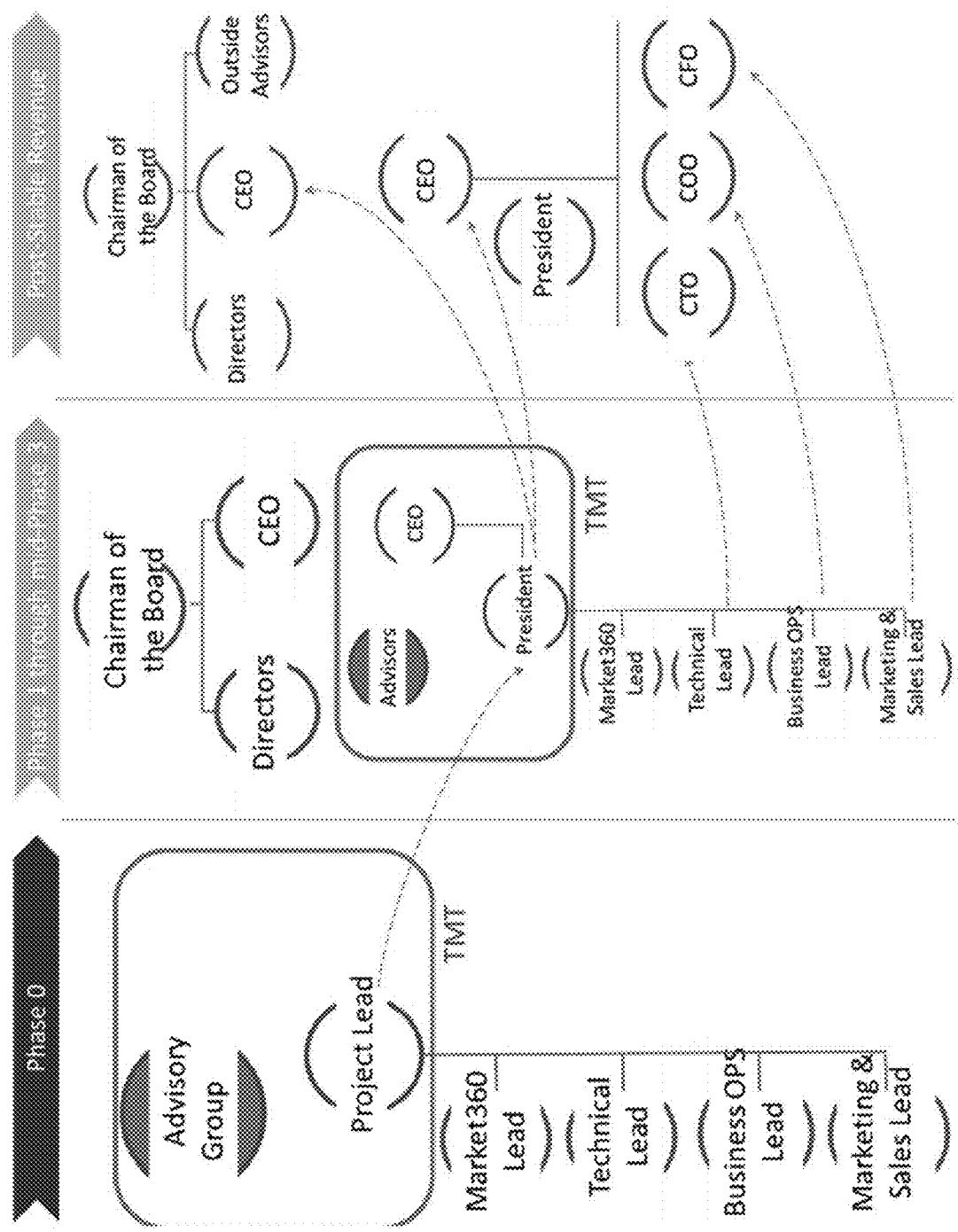
FIG. 2 illustrates an organizational structure according to one embodiment of the present invention.

Another embodiment of the TCF process is the method of entrepreneur management mentorship and transition plan. Many examples of prior art offer mentorship opportunities to startups but lack a consistent presence throughout all phases of the startup's development. As illustrated in FIG. 1 and FIG. 2, The TMT remains dedicated to the TO through new product revenues in the Market Launch phase. FIG. 1 illustrates how TCF is an improvement over prior art because prior art are partial solutions that yield failure whereas the TCF method provides consistency from a TO's outset to a liquidity event. TCF ensures that a company has been well-formed and prepared to function on its own and is in a position to realize its full revenue potential. TCF executes the full spectrum of business operations at the elemental level from idea inception until after revenue. A succession plan is also formulated in Phase 0 and includes selecting team members as proteges to execute the mechanics of TCF through each phase, under the mentorship of the TMT. These proteges are evaluated based on a set of desired entrepreneurial aptitudes, trust traits and business domain alignments. Throughout the TCF process, the proteges are groomed by the TMT to become the end-state executive team and to facilitate confident transition to an independently run TO as soon after revenue as possible. TCF plans for TO longevity from the outset, thus mitigating the risk frequently incurred by startups who hire the wrong talent at the wrong time. The specific timing of transition is supported by evaluation metrics collected throughout the TCF process that provide performance quality indicators for each team member, which are used to quantify team member readiness.

A TO managed by TCF achieves market success with less time and money invested. Each TCF phase is built to limit dollars at risk while determining whether the technology is a one-of-one solution with significant market pull. Every element of TCF operates within a right-sized level of effort for the phase goal tasks. FIG. 2 shows how management resources in TCF are allocated in a minimum staffing model in Phase 0 and grow appropriately as Phases and associated levels of effort progress. FIG. 2 also highlights the planned TCF management mentorship progression that ensures continuity throughout the TCF process and ensures for a solid management transition.

Figure 3:
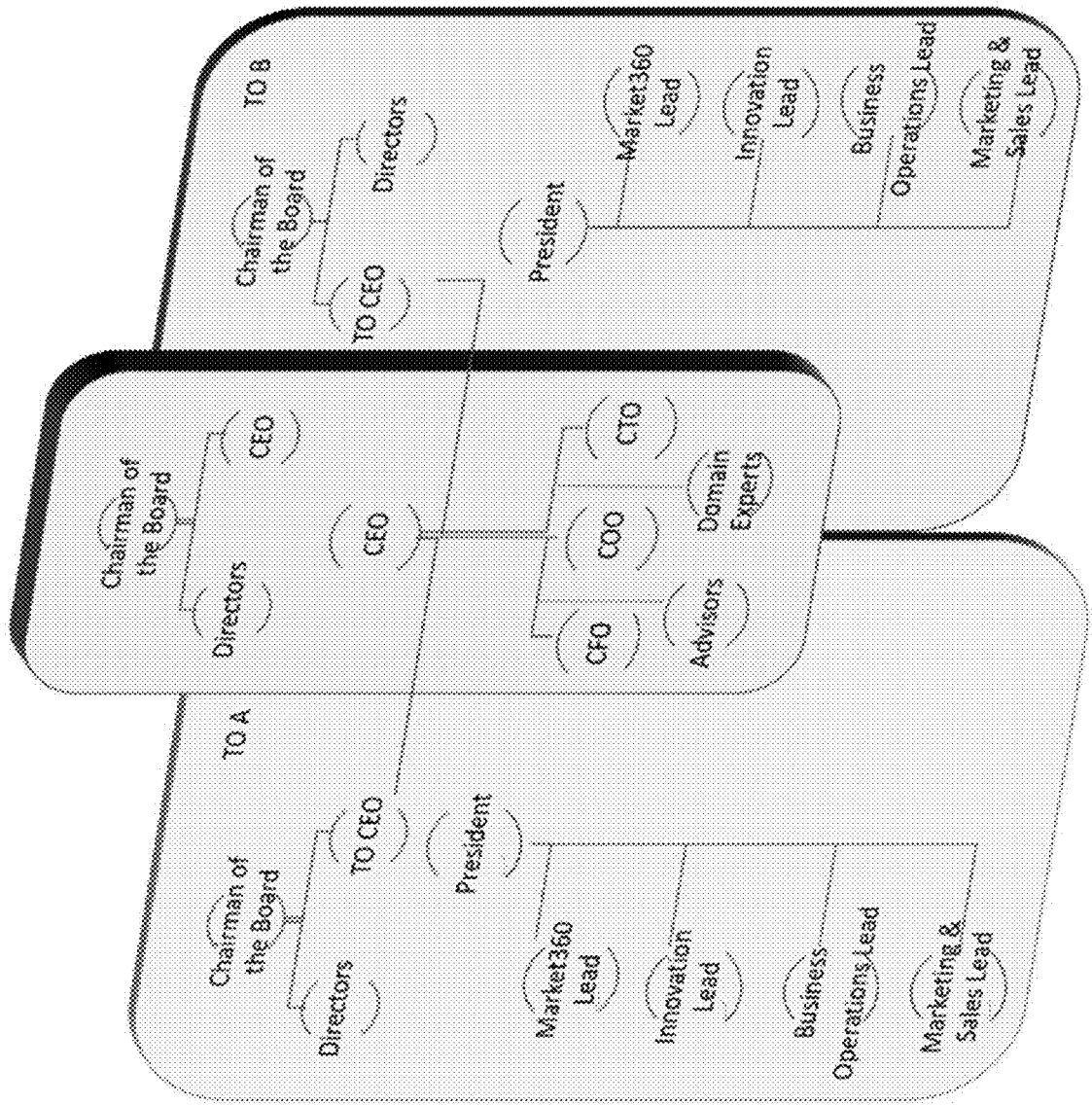
FIG. 3 illustrates an organizational structure according to one embodiment of the present invention.

As a differentiator to prior art, TCF offers a TO top-tier management and services for value pricing. Value pricing and its natural by-product of cost reduction are a critical risk reduction method and are key attractors for early-stage investors. To achieve this outcome, FIG. 3 represents an example of the multi-TO management structure aligned with the TCF process, methods and system. The shared, pre-harmonized C-Suite alleviates a TO from unnecessary expenditures for full time executives and high risk typically incurred by dysfunctional C-Suite teams. Because of the systems engineering rigor demanded by the TCF Process, TCF facilitates hyper-efficient TMT management, mentorship, and engagement for each TO. In contrast to prior art, the TCF shared resource management methods for the TMT, governance and BoD tiers allow each TO to benefit from best-in-class entrepreneurial-focused leadership and execution at value pricing. These efficiencies are supported in part by process standardization, system modeling, human-machine feedback loops, back-end cloud computing-based AI/ML, and the end-to-end system integration across functional areas. This method further mitigates common risks of startup dysfunctional management, wasted resources and time lags.

FIG. 4 illustrates an associated Responsible, Accountable, Coordinated, Informed (RACI) matrix. TCF functional roles and responsibilities in a shared C-Suite, multi-tier, multi-TO environment are clearly defined in the TCF RACI. Every element of the RACI is aligned to the TCF Phases, TCF Tracks, TCF Governance and TCF Fund, offering clarity and clear boundaries. Furthermore, the RACI is tied directly to scope of effort covered by standard TCF services and features.

There are many stakeholders involved in the successful outcome of TCF. Not all stakeholders are within the control of the TO, but still influence its success indirectly. The Quantum Execution Plan (QEP) addresses each of these external factors as a variable or a risk, for traceability as well as mitigation, and assigns a responsible party to monitor each. Additionally, the QEP defines every function necessary to produce a quality answer to the end-of-phase question and assigns an individual to perform each task. Each person that holds a position noted in the TCF RACI chart is evaluated for competence to perform the role, as well as the capacity to commit to its execution. The TCF Management Team (TMT) is responsible for ensuring the latter by routinely and proactively monitoring assignments, and for ensuring that the right mix of talent is available to the TO. QEP sets forth the details of how to get everything done, governance makes sure it is done properly, in scope and on time. Templates for the QEP, succession plan, organization structure, and the RACI are maintained in a cloud-based datastore or a datastore stored on a remote server computer, and are accessible via a network such as the internet or an intranet using the GUI of the present invention. The TCF QEP approach to roles and responsibilities mitigates a common risk incurred by startups who lack foundational, integrated experience and pre-established frameworks for management.

1b. Standardized, Focused, Purposeful Infrastructure at Value Cost

In another aspect of the present invention, TCF provides standardized, focused purposeful infrastructure to a TO at value cost. TCF de-risks a TO by providing just-in-time systems, tools, methods and services for all functions necessary to a TO. TCF pre-packages services for a TO that cover all aspects of execution of the process which are offered at a cost lower than could be found elsewhere for the same class of service. Services include but are not limited to physical services (office space, furniture, printers, networks, computers, lab space, etc.), TMT C-suite personnel (CEO, CFO, CTO, CMO, COO, etc.), enterprise licenses for toolsets pre-configured for TCF execution and reporting (MS Office, MS Project, MS SharePoint, Salesforce, Confluence, GitHub, Jira, AWS, MS Azure, MS Exchange, etc.), access to administrative and legal staff that operate in accord with the TCF process (legal filings, articles of incorporation, Memorandums of Agreement, Non-Disclosure Agreements, etc.), TCF-specific tools, processes and methods, and pre-negotiated partnerships and rates for external resources (brand guidelines, logos, booth equipment, marketing materials, website design, etc.). The TCF service provision methodology reduces TO risk by mitigating common capital resource inefficiencies and time-to-market delays typically experienced by startups. All services within the infrastructure are mapped and aligned to the TCF RACI and to the TCF process to allow for metric collection on actual vs planned usage, and deviations are used by AI/ML to automatically nominate improvements to the process standards.

1c. Investor-Focused Metric Generation

TCF investors include all entities that contribute finances or a financial equivalent (like-kind exchange of services) toward a TO with the expectation of an increased return on the investment. Since returns are directly proportional to a TO reaching its full potential, investors seek indicators of progress and of anticipated success or failure throughout the TCF process. Desired indicators of interest most frequently fall into categories related to the strength of the market, the strength of the innovation, the quality of the leadership team, and the strength of the marketing and sales approaches. In each of these categories and across all of them in aggregate, lies the area of most interest and concern to an investor: risk. Investors have typically looked to traditional business or financial metrics to trace risk across each of these areas, but these have proven in many cases to be insufficient. Per Stewart Myers of the MIT Sloan School of Management, "Practical conflicts between finance and strategy are part of what lies behind the recent criticism of US firms for allegedly concentrating on quick payoffs at the expense of value. US executives, especially MBAs, are said to rely too much on purely financial analysis, and too little on building technology, products, markets and production efficiency." Therefore, the present invention overcomes prior art by doing more than providing financial analysis. The present invention analyzes all aspects of a TO and provides a confidence score and a timestamp for the TO data. This lower an investor's risk because they are provided a real-time, holistic analysis of TO and a TO's chance of success.

The present invention, in contrast to prior art, employs a holistic approach for seamlessly gathering intelligence into the most current and most thorough indicators of success on a rolling basis across all sectors of interest to an investor. Everything in TCF works backwards from these indicators of success and every major step is instrumented with as many quantitative methods possible without impeding the progress of the TO. TCF's four tracks of effort deliberately mirror the key sectors of investor interest and the TCF phases bound the investment at risk at any given time. The TCF system is built to answer multi-tier (execution, CEO, investor) questions in a recurring, uniform, quantitative manner.

1d. Bias-Reducing Methods for Standardized Data Collection Across TOs for Cross-TO Management, Insight and Alerting TCF tools and management methods are built to accommodate cross-team interaction and cross-team dependencies to ensure for automatic checks and balances within the company. All data flows upwards and is acted upon at multiple levels to enhance and share the data. Data is then aggregated and acted upon by algorithms and artificial intelligence to produce alerts for each tier of the company and also cross-tiers. It further reduces risk by offering cross-TO standardization where TOs are able to leverage opportunities of information or alerts generated by other TOs that would not be available without the shared infrastructure framework.

The present invention also includes management methods for aiding timely, informed, and strategically critical decisions which dramatically improve the probability of success of a new company. TCF includes but is not limited to systems and methods which implement principles of quantum uncertainty, Kepner-Tregoe (K-T) decision analysis, and Statistical Process Control (SPC). The regulation of TCF disallows dynamic process re-engineering or re-ordering on the fly and avoids the pitfalls that occur as byproducts of both. The governance of a TO, with the integration of TILLER normalized metrics, overcomes inherent human biases that frequently introduce flawed assumptions or overly optimistic perspectives. The impartial and methodical framework of evaluation criteria, careful review and monitoring of the QEP, and the evolving algorithmic approach to TCF assessments reduce the impact of cognitive biases. TCF is advantageously implementable for any type of new business venture with any type of new product or service.

2: Risk Mitigating, Repeatable, Stage-Gated Processes Regulated by Governance

In the present invention, TO risk is mitigated and TO time to launch is reduced by the integration of TCF templated functions, TMT management expertise, TMT mentorship, and investor-focused metric generation. Every single TCF system is instrumented and templated, and are further enhanced by interweaving them with solid, templated, benchmarked project management. All systems used for management, product development, code repositories, requirements development, value creation engagements, production costs, revenue, proformas and so forth are standardized and have instrumented templates that automatically populate the TO Database.

TCF Phases and Tracks

When forming a company from inception, there are many factors that influence its success. The single most influential factor is whether the business provides a product that has value to a consumer. Accordingly, any effort in business must be first and foremost attuned with the intended customer base. There is a long-standing and unmet need in the market for a market-pull based commercialization system that operates end-to-end while limiting investment dollars at risk.

In the one embodiment, TCF is executed in a series of four distinct phases, Phases 0-3. In this series of four phases, the TCF process methodically, comprehensively and iteratively achieves solution viability by ensuring the solution is sound, facilitating earlier engagement with the market, providing confidence to investors who support the advancement of the concept, and mitigating any competitive risks that arise. Each phase is rooted in understanding the full scope of the market, potential customers' interest, well-vetted technology and proper pricing. Keeping a vigilant view of the market and the market pull, TCF also addresses the myriad variables unique to startups and leverages a special set of techniques, automations, structured data flows and standards to manage them. Every single element of the TCF process is of integral importance to achieve a time-to-market as short as 24-30-months with such a reduced investment.

The present invention limits dollars-at-risk at any time by breaking the process into these four discrete phases with clear boundaries, continuous assessment and with mandatory thresholds of entry and exit criteria performance prior to moving to the next phase. The achievable and value generating phase goals are executed by standardized methods scoped to limit risk. Phases cyclically employ integrated techniques to develop the product, the concept, the pricing and the marketing approaches aligned with the needs and budgets of the users. A continuous cycle of de-risking fostered by constantly monitoring the market opportunity for the product.

Figure 5:
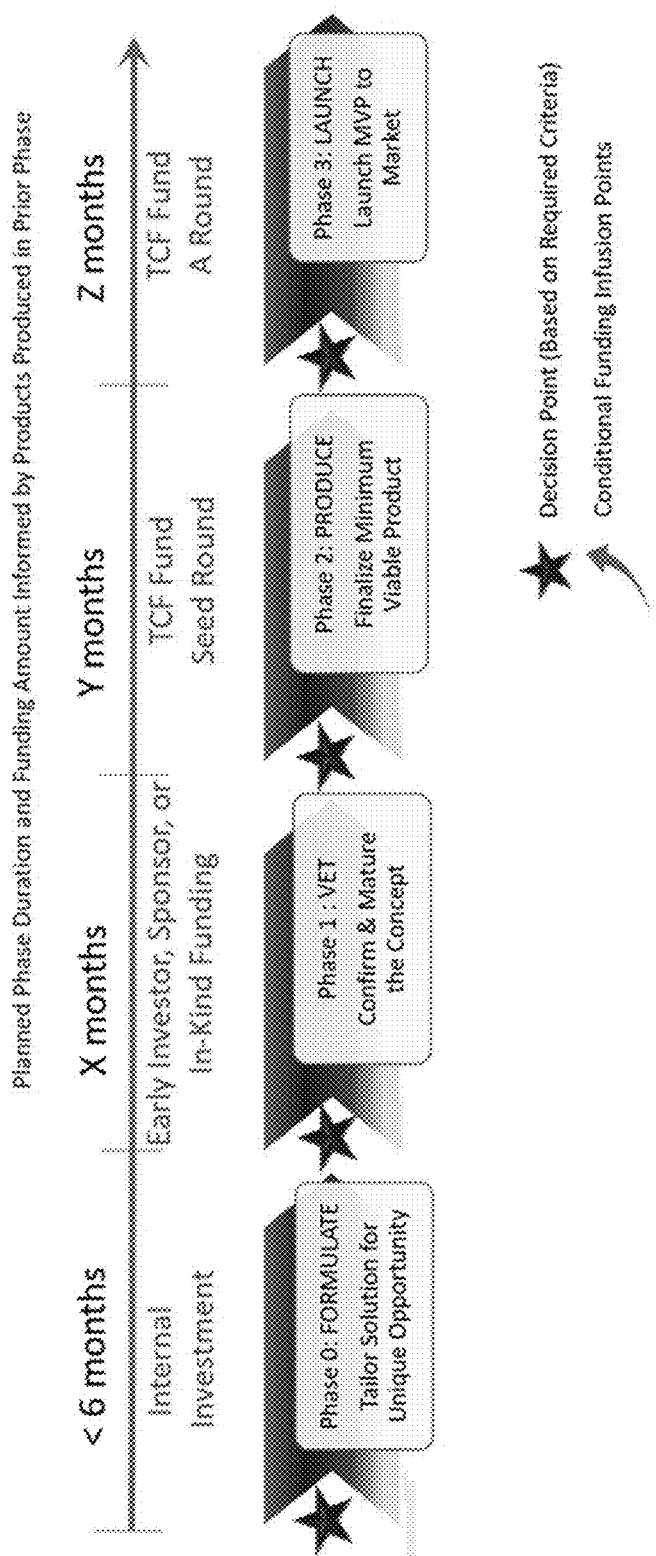
FIG. 5 illustrates a timeline according to one embodiment of the present invention.

In one embodiment, the phases and their associated phase goals include (1) Phase 0: FORMULATE: Tailor a solution for unique opportunity, (2) Phase 1: VET: Confirm and mature the solution concept, (3) Phase 2: PRODUCE: Finalize Minimum Viable Product (MVP), and (4) Phase 3: Launch MVP to Market. Each TCF phase is executed in sequence and is governed by a stage-gate and decision point at its conclusion, as shown in FIG. 5. Each phase is conducted with a clear goal that aligns to both an investor area of interest as well as a key question that vets the likelihood of success for a TO. The phases allow for early identification of insurmountable risk, changes in competitive landscape, regulatory requirements and other factors that could cause the need for an early pivot or the need to end a project entirely. The carefully planned scope of each phase significant limits dollars at risk and also helps focus all efforts toward a particular goal, both being critical for early stage companies to succeed. The CEO will evaluate whether the effort has market value and is properly scoped to address that market. The decision point is supported by TILLER products generated in each discrete phase that answer phase-appropriate customer (and inherently investor)-centric questions. TCF supports these decision points by quantifying and normalizing the phase outputs and gauging the most accurate state of phase completion and progression readiness. If the CEO concurs that the phase objectives have all been met and there is still market value, an infusion of funds appropriate for the next phase will be allocated and the next phase will begin. TCF includes entry and exit criteria for each phase. The prior phase exit criteria and the new phase entry criteria must be met before the TO will advance to the next phase. FIG. 5 illustrates the phase progression and the associated mandatory decision points that are engaged prior to any phase start and prior to any phase funding infusion.

TCF begins before Phase 0, noted as Pre-Phase 0, with the identification and characterization of a unique opportunity. After a successful assessment of TCF candidacy, a TO is formed and stepped through four phases. The present invention is designed to mature the concept and offer right sized funding at key assessment intervals carefully regulated by the governance process. The present invention facilitates final research, development and testing to mature the technology readiness level (TRL) of the opportunity as well as the manufacturing and distribution planning to ensure the product can be produced economically and repeatably with consistent results. The present invention covers all financial planning aspects for capital raising as well as long-range and strategic equity management. TCF identifies data needed for both short-term and long-term insights and collects implicit data and augment with explicit data.

The Phase 0 "FORMULATE" phase includes testing for market opportunity, the uniqueness of a solution, and the concept of operations of a potential venture. This phase also includes an automated assessment on whether a TO is attainable with the current TMT or if supplemental support is required. Phase 0 includes assessing market needs, devising One-of-One Solution, framing a business plan and devising a pricing plan. Status of this phase is recorded on a dashboard on the GUI. The GUI is configured to display to results on at least one remote device. The present invention is configured to create a framework for the upcoming phase and potential funding if the requirements for phase "FORMULATE" are met. Phase 0 activities provide a litmus test for market opportunity, solution uniqueness, and the end-to-end concept of operations of a potential product: the constituent components required to evaluate the viability of an idea. Phase 0 also offers an unbiased assessment of capabilities of the team in residence as applied to the product concept. If successful, the QEP will be updated to scope Phase 1 and TCF Ladder 1 funding will be provided.

In yet another embodiment, Phase 1 "VET: Confirm and mature the solution concept" includes defining the minimum viable product (MVP), determining market fit and patentability, creating a corporate structure, and developing the initial TO value proposition. The present invention determines patentability by running a search for patent and patent applications via network-based communication. The system is configured to use various elements of a TO's idea to search patent databases. The system provides updated visualization of a technology field and is continuously updated to account for new patents and patent applications. The present invention further is configured to send the results to the GUI dashboard, which is accessible on at least one remote device. The GUI is configured to enable users of the at least one remote device to interact with various patents and patent applications. The GUI is customizable and sortable. For example, the GUI is configured to allow a user to sort the displayed patent documents by assignee, inventors, publication date, etc. The present invention is further configured to provide a confidence score for the patentability and describe any similarities between a patent or patent application and the TO's idea. The present invention generates the confidence score by analyzing the patent document and performing statistical analysis to determine similarities between the patent documents and the TO's idea or solution. The patentability and market data are stored on the cloud-based system. The present invention enables a user to collect the data from the cloud-based system and display the data via the GUI on a remote device.

In one embodiment, Phase 2 "PRODUCE: Finalize Minimum Viable Product" activities revolve around the MVP, from both the development and prototyping perspective as well as vetting its merit with the Value Creation Forum. With these two key ingredients, a go-to-market strategy is produced and preparations are made for the A-round capital raise. This is the most intense TCF Phase, where all four tracks have equally high levels of effort simultaneously. At its end, the CEO will determine if the TO is ready to launch and will infuse TCF Level 3 funds. Phase 2 activities further include determining a market strategy and preparing to raise capital. The system is configured to capture market trends as well as use patentability data to determine the appropriate market strategy. The present invention monitors congressional direction for spending, university research trends, US Department of Labor data, trade magazines, market sector conferences, major technology releases/launches from major companies, the changes in stock prices, trends on social media, executive changes of big market players, changes in market size, and the addition of new competitors to determine the optimal market strategy. The TCF platform determines the total market size, competitive landscapes, potential distribution partners, and major players. For example, and not limitation, the present invention is configured to evaluate and divide a market into separate sectors. The present invention collects the patent data from the cloud-based network and/or a patent database and analyzes the patent data to determine who has filed the most patent documents and which market sector the patent documents cover in order to determine the growth and interest of a particular sector. The system is also configured to determine which sector has expired/expiring patents, which indicates an opening of market space. The TCF platform alerts the TO and the TMT to the potential market space and provides recommendations using artificial intelligence (ex. machine learning) algorithms on how to model and change the MVP to better suit the market needs.

In one embodiment of the present invention, the key elements or components of MVP are further sub-divided into at least two layers of definition and solutions; these at least two layers include identification of options that are scored automatically based upon rating or ranking of outcomes and based upon the original inputs and original goals identified at the start of the project. Alternatively, the outcomes are further evaluated using Kepner-Tregoe (K-T) techniques or other methods for systematic review and consideration, but are preferably addressed using an automated analysis tool having outputs that are automatically received and tagged within the TCF platform. The present invention preferably includes at least one output including a comprehensive scoring method having an automated ranking or rating of outcomes for each phase of the project. Additionally, the TCF platform includes identification of failure points and detailed analysis for avoiding failure points or unwanted side effects at any stage or phase that might negatively impact commercialization within the predetermined timeline or timebox as described hereinabove.

The final phase "Launch MVP to Market" focuses on TO launch, final product revisions, testing and packaging, distribution chains, and next stage product enhancements. The present invention is configured to allocate funding to support sales by evaluating the confidence score of the TO during Phase 3 and determine how much funding is needed to improve the TO's success. The present invention is configured to identify when a confidence score is too low to further pursue a TO. For example, and not limitation, if a TO has a confidence score of 5/100 during Phase 3, then the TCF platform is configured to alert the TMT to prevent distribution of funds to the TO.

Tracks

The present invention further de-risks the TO by codifying four parallel tracks of effort that traverse each phase of the TCF process, accomplishing only what is necessary in that phase to achieve the end-of-phase goal. The efforts undertaken in each track are monitored, guided and supported by the TMT, who govern each phase and enforce its guardrails. The tracks of effort align to natural functional areas of effort but are not silos, as each of the four tracks of effort is interdependent and is executed in a coordinated manner to achieve the exit criteria of the phase on time. All data and products generated to support post-phase decision points are created to be consistent and comparable throughout the process. The scope of each track of effort differs between phases but is intended to build to a crescendo through the progressing phases that lead to product launch. Each track leverages pre-established TCF protocols, methods and templates to achieve the track's contribution to the end of phase goal. Each protocol, method and template are built to explicitly automatically generate quantifiable data elements that feed the TCF back-end systems for process governance, TO alerting of misalignments and cross-TO opportunities. To this end, the four parallel tracks of effort yield constantly refined data to feed these decisions, all in line with the TILLER criteria for assessment. This offers continuity, scales in momentum and focused refinement through each phase. Close coordination of the four tracks allows quick identification of changes in demand, product production issues, investment delays, regulatory issues, marketing & sales strategies, or other factors, and an agile, coordinated response to any threat to the effort.

Figure 6:
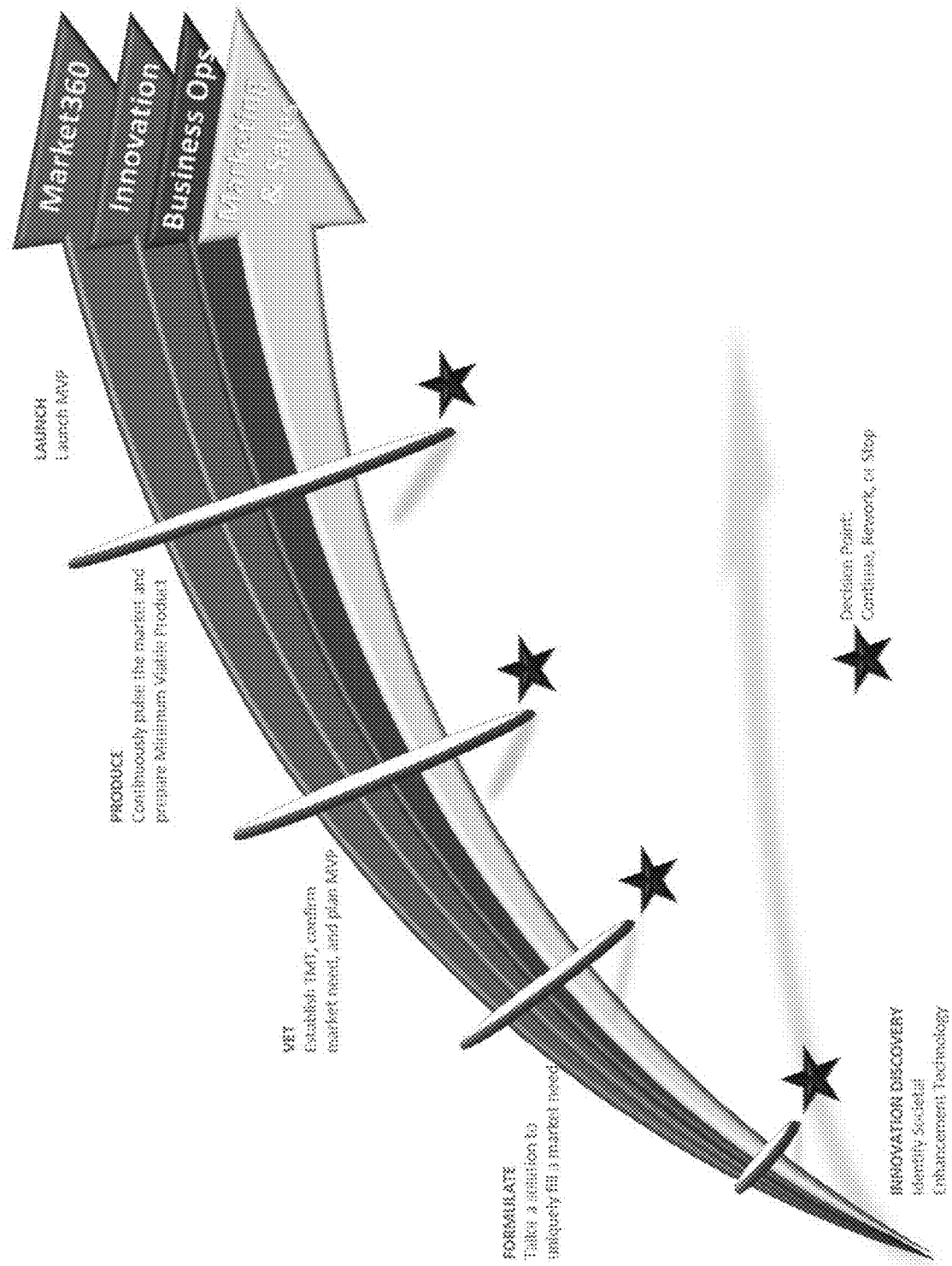
FIG. 6 illustrates a flow diagram according to one embodiment of the present invention.
Figure 7:
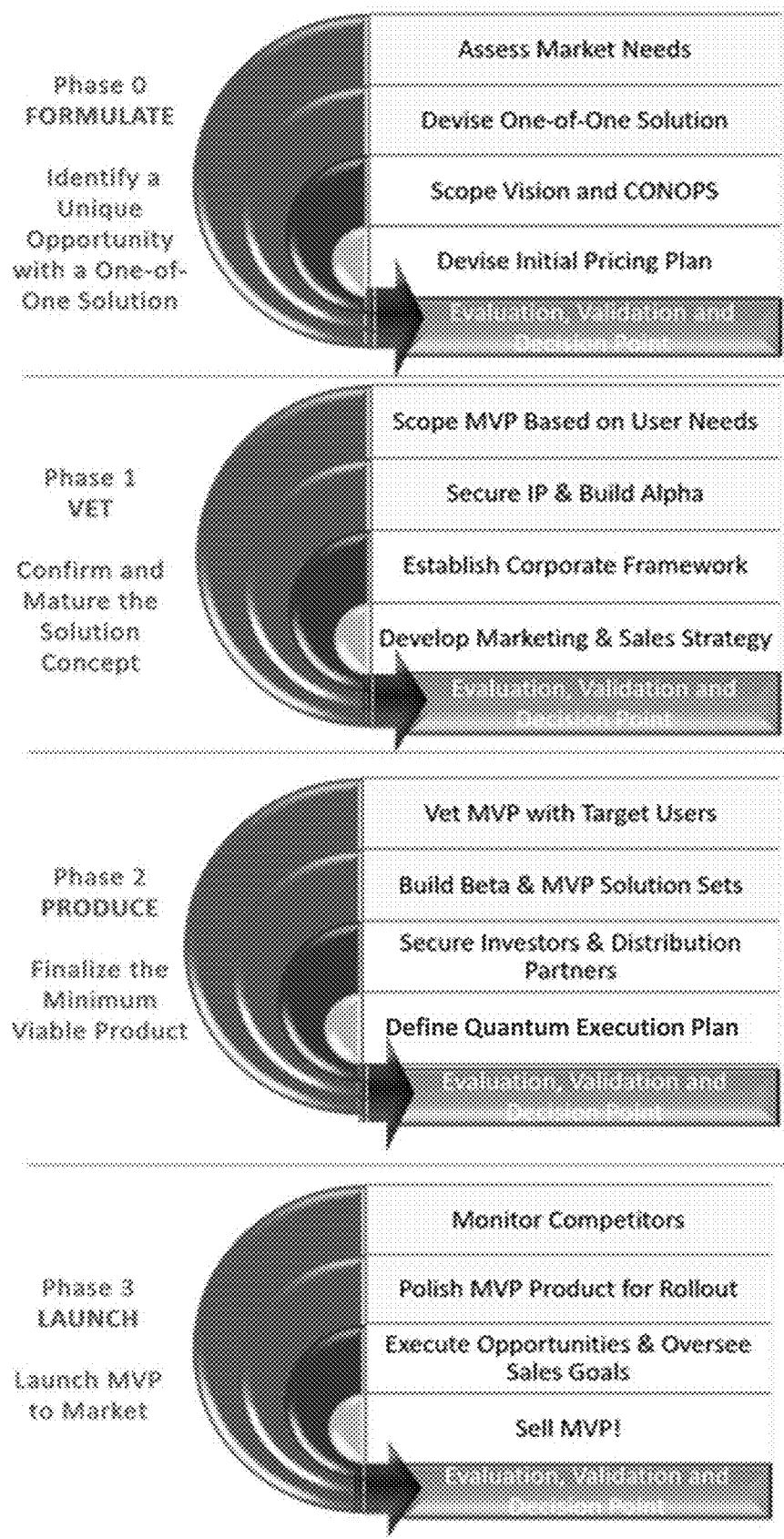
FIG. 7 illustrates a graphical representation of the phases according to one embodiment of the present invention.

FIG. 6 illustrates the separate tracks and phases according to one embodiment of the present invention. The present invention further reduces risk to an early stage company by segmenting functional areas of work such that the efforts performed within each phase are done with the following phases in mind. All work completed within and across each functional track in a TCF phase, is leveraged by the following phase. This scope of work is designed deliberately from inception, and each functional track interweaves to answer the TCF Phase goal. FIG. 6 shows the elegant transfer of each functional track throughout the phases. Track 1: Market 360 is the holistic discipline used by TCF to define and refine the market. In Track 1, market needs are assessed, candidate solutions are harvested, key market influencers and buyers are identified and engaged to confirm the market need and to vet product concepts, and vetting pricing models to confirm solution marketability. Track 2: Innovation is focused on developing unique solutions to address market pain points. In Track 2, the system is directed to devising and producing a one-of-solution, analyzing and securing intellectual property, finalizing an MVP and polishing the product. Track 3: Business Operations is focused on incrementally staged project and business management functions. TCF frames a QEP, establishes corporate framework, secures investors, establishes distribution chains, develops ProFormas, manages finances, and monitors business operations. Track 4: Marketing and Sales is directed to the TCF lifecycle engagement and planning for early revenue generating actions. Track 4 includes devising a pricing plan, planning for sales operations, finalizing a "go to market" plan and then selling products in accordance with the plan provided under TCF. In one embodiment, during TCF, the tracks are running parallel so that the TO is progressing the various aspects of its business at the same time. FIG. 7 and FIGS. 8A-8D illustrate the track-based goals that contribute to the end-of-phase goals which further reduce TO risk by constraining the scope and focus of work by each functional area. The functional tracks of TCF are further decomposed within each phase to characterize a track-based goal for each phase. These serve as guardrails for effort and are overseen by the TCF Management Team (TMT), ensuring that only the work necessary to achieve the sub-goal is scoped, funded and executed. For example, spending effort on a go-to-market strategy in Phase 0 would be disallowed under TCF, as resources spent on that activity may never need to occur if there is not a unique opportunity for the technology. TCF phases and tracks ensure for focused, orderly, efficient and informed levels of effort.

Market360 (TAM, User Needs, User Priorities, Market Research, League of Users (LoU), Value Creation Forum (VCF), MVP Eval, Design Feedback, Relationships)

Market360 is the TCF track that frames the market for a TO, devises and vets a product concept, and develops and maintains a strong customer base. Market360 creates and maintains a customer base. The Market360 also monitors the market opportunity for a product. For example, and not limitation, the Market360 is configured to monitor the changes in market indexes, stock prices, IPOs, capital funding, employment growth and mergers and acquisitions. The TCF platform sends alerts to a remote device and displays the alerts via the interactive GUI in response to any market opportunity changes. This enables the TMT and TO to adapt in real-time and prevent the spending of unnecessary funds. The present invention is configured to evaluate the market changes and provide analysis on how the changes will affect a TO. Market360 is directed to optimizing a TO's business for the intended market. The TCF platform adapts a TO's business plan in response to changes in the market and risk levels. The TCF platform suggests where a TO should focus its efforts and how to improve the development of its products and/or services.

Market360 includes a market research collection and record system, a market data augmentation engine, algorithms and a user engagement forum toolkit. The market research collection and record system is configured to collect and store market research and scores. The market data augmentation engine is configured to auto harvest market data to augment manual market research. The user engagement forum toolkit includes tools to harvest normalized quality targeted data from user forums.

Market360 is configured to employ a market pull versus a technology push approach. Market360 is configured to identify and set up unique opportunities to bring a product to market. In one embodiment, Market360 includes elements to identify a disruptive solution to fill a gap in the market, to comprehensively characterize the quality of the candidate solution, and to characterize the market in order to retain competitive advantage. In one exemplary embodiment, Market360 subsystems, (1) Market 360 Assessments, (2) Innovation Discovery, (3) Pricing, and (4) Value Validation and Minimum Viable Product, work interactively to automatically produce quantitative confidence in their respective and combinatoric fields to employ ML/AI to increase the confidence in each result.

In one embodiment, Market360 uses a market pull-based model for the Market360 Assessment. Market360 is configured to use M360 assessments to develop a comprehensive view of a market sector. When performing a M360 assessment, the system analyzes the market from different vantage points. For example, a macro market assessment looks at the market as a complete system to determine how it works and to identify areas that seem to cause issues to those operating in that space. The macro market assessment produces data that includes dominant products, players, and buyers in the market; the current total market value; investments in research and infrastructure today and planned for the future; regulations that affect the market sector; supply chain mechanics and primary distributors; industry leaders; associations and governing groups in that sector; and other markets with cross-over interests. The market data is collected from user research and from a multiplicity of databases via network connection. Furthermore, all data produced by M360 is tagged with both a timestamp as well as a confidence score. Both are used to characterize the quality of the data. With this data, the system is configured to update the TO business plan and evaluate the potential value of a TO's business. The results are displayed on the GUI on a remote device. The market data is stored on the cloud-based server. The TCF platform continuously updates the data in real-time to provide a consistent market analysis. Back-end ML/AI routines act upon this data both for the TO as well as for other managed TOs within related fields to look for anomalies in data and auto-nominations of candidate opportunities or risks.

In another embodiment, a micro market assessment is performed. During a micro market assessment, TCF determines a particular aspect of a market aligned with an identified area of need. A micro market assessment is conducted in areas exposed as particularly promising: areas of noted unmet needs, areas with significant research dollars allocated, and areas of implied need. The micro assessments include determining competition and monitoring the competitive landscape. For example, in one embodiment, the present invention captures market data relating to how long businesses have been operating in a market sector and whether there has been an increase in the number of businesses and their period of operations. Then the present invention determines whether there is market saturation or what is the expected date for market saturation. The present invention sends alerts to identify potential or real market saturation and updates the business plan to optimize a TO's track to market.

Figure 13:
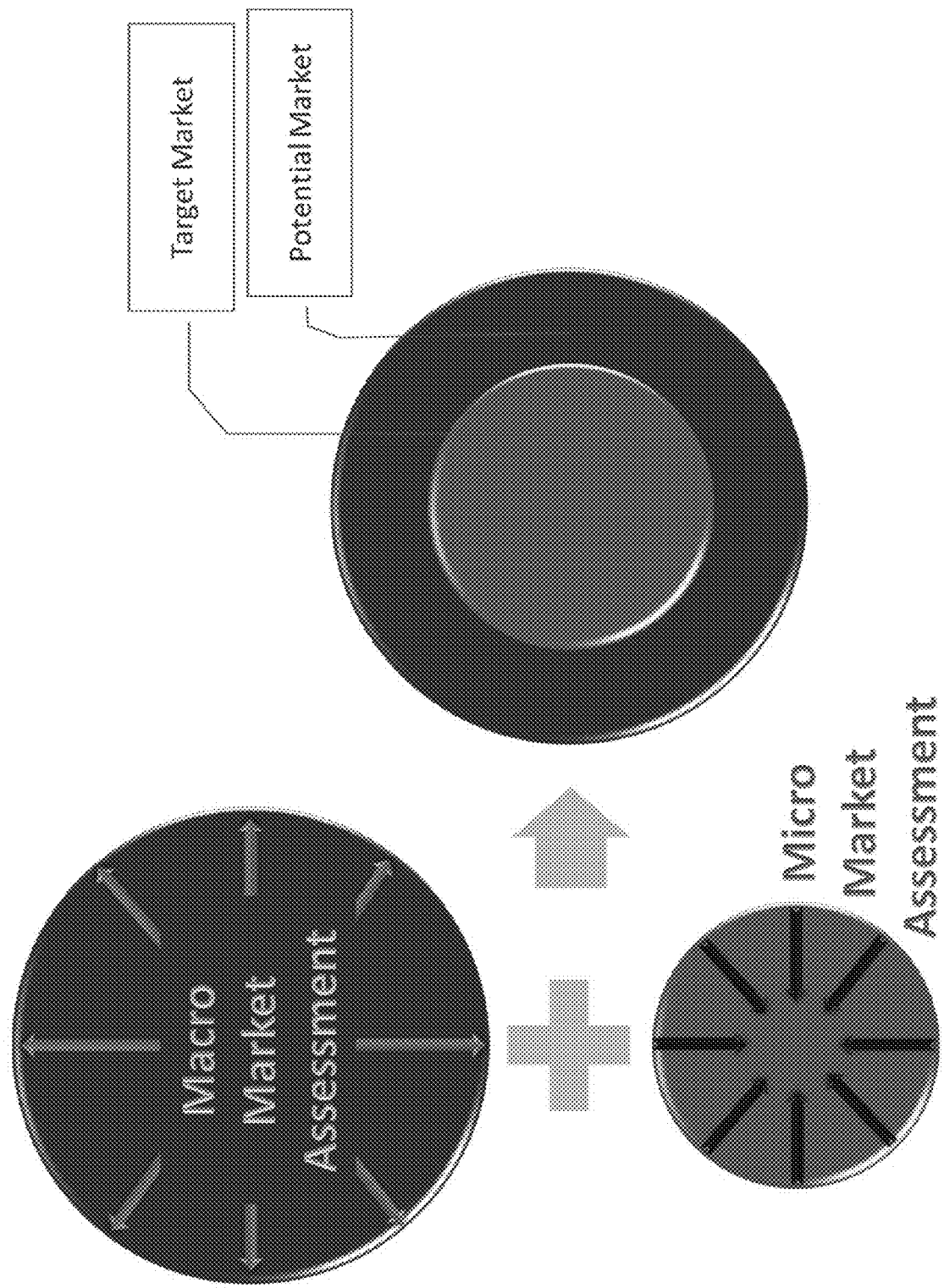
FIG. 13 illustrates a schematic diagram of a market assessment according to one embodiment of the present invention.
Figure 14:
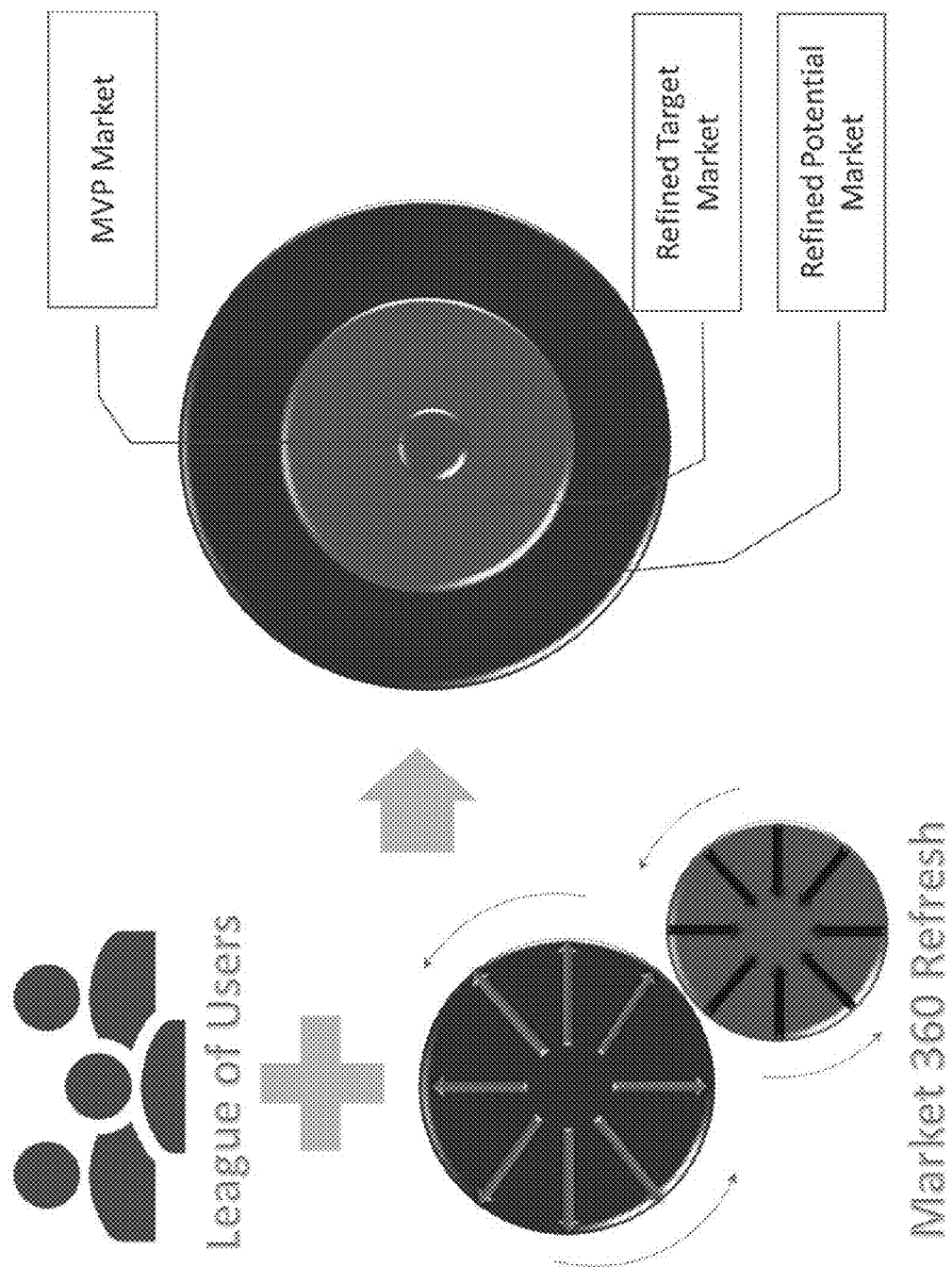
FIG. 14 illustrates a schematic diagram of a market assessment according to one embodiment of the present invention.

Advantageously, as shown in FIG. 13, the Market360 is configured to perform both a macro and micro market assessment. TCF differentiates itself from prior art in with a critical difference in how market research and competitive analysis is executed. Within the Market360 lives the method that hones in on market needs and their associated market pull and all associated supporting data. The differentiation is that TCF executes Market360 continuously throughout the entire TCF process and it is executed across TOs to further enhance data elements that may be generated for one TO that may influence or help another TO. Market360 leverages ML/AI techniques to key in on major industry indicators that influence market opportunity and automatically generates target market data. Market360 is configured to identify market needs and pain points, possible buyers, and complementary elements to generate market pull. The Market360 is further configured to identify potential opportunities to aggregate or apply technology to the market. As illustrated in FIG. 14, Market360 is also employed to identify individuals in a target market who can vet the solution viability in the marketplace and its capacity to meet the need. Market360 model further differentiates itself with the automation of Market360 to provide robust nominations of individuals with significant knowledge of the industry sector and of the identified area of need. These users are engaged in various forums with the intent of vetting initial product concepts for utility, price points and degree of need. They are also leveraged to provide insights into potential partnerships, regulations relevant to the industry, marketing messaging and so forth. ML/AI routines help target the most suitable candidates for this type of engagement, and such tools are also employed to ingest and act on the information received in the forums. All engagements with users are driven by consistent questions that are instrumented to fuel insights and to provide additional auto-nominations to the Market360 research engine. AI/ML is leveraged to automatically screen publications, conference notes, social sites such as LinkedIn, patents, blogs, university publications, government research outlets, and other internet accessible outlets to nominate candidates to the TO leadership for evaluation. Furthermore, output streams from the four Market360 subsystems are integrated to auto-nominate topics during the in-person Leagues of Users and Value Creation Forums, as well as to capture outputs from each forum into standard electronic-based systems for further action by other TCF process components.

Market360 differs drastically from prior art, as it includes a continuous cycle of market research refinement, early and maintained contact with market influencers, and constant ML and AI assisted routines for competition and trend analysis.

Disruptive Innovation

In one exemplary embodiment, the second parallel TCF track is configured to focus on disruptive technology in an area of the market identified by Market360. Disruptive technology includes technology that displaces a well-established technology and reshapes that industry or introduces a ground-breaking product that creates a completely new industry. Focusing on disruptive technology enables a TO to have more control over its product and potential market. The present invention is configured to automatically analyze and determine disruptive technology for a market. For example, the present system uses consumer feedback data to determine what consumers want for a particular industry. The system analyzes the consumer feedback data with the market data and the patentability data to estimate potential market space, to provide risk analysis, and to identify a potential solution. In the present invention, the disruptive innovation track works in concert with the other tracks to determine and execute the product development necessary to bring the identified technology to the market such that it meets the identified need.

When evaluating a technology, TCF is configured to determine assumptions and constraints relevant to the technology's initial development. TCF considers (1) rationale for the research and/or development, (2) assumptions of the solution and the approach, (3) advantages of this approach over others, (4) challenges experienced and success indicators of mitigations employed, (5) component manufacturers and cost to make, (6) level of access to/availability of key components from suppliers and number of supplier alternatives, (7) testing completed and Technology Readiness Level (TRL) achieved to date, (8) intellectual property (IP) protections and ownership/licensing model, and (9) any sales restrictions (ex.: ITAR restrictions to sales outside of the United States). Using these factors, the present invention outputs expected challenges for bringing a product to market and provides suggestions on where a TO should focus its efforts to improve the product and to lower the risk of investment. The TCF platform includes documentation for each of the rationale for innovation discovery. For example, when evaluating IP protections and licensing model, the TCF Platform includes patent documents that appear relevant to a TO's business, thereby allowing the TO and the TMT to evaluate whether a licensing agreement is needed or if a TO should adapt its business model to avoid violating any intellectual property.

In an exemplary embodiment, TCF includes evaluating the viability of an idea/product. The TCF platform considers the estimated maturity of the technology, the source of the technology, and encumbrances associated with it. During TCF, the idea is further analyzed to determine whether further additions or changes would render the idea more robust, more mature, less expensive or more marketable to a broader base of consumers. TCF incorporates market data, intellectual property data, and the Market360 data to evaluate the viability of an idea/product. The intellectual property data includes a patent library that is configured to support the other tracks, process, and system of the TCF process. TCF determines any challenges relating to the production or sales of the product. For example, if the only supplier of a critical component cannot produce more than one unit per year, then it is not likely a viable solution unless a workaround or redesign can alleviate the supply constraint. TCF evaluates the cost of insurance, the location or geographic factors of a product, the economics of sale, the cost of research and development, whether competitors engage in predatory pricing, and whether a loyalty scheme is required.

In another embodiment, the Innovation track works symbiotically with the other three tracks. TCF is configured to use the Market360's League of Users and Value Creation Forum (VCF) to vet the assumptions harvested in the Market 360 analysis and to validate the uniqueness and value of a proposed solution. In one embodiment, the Market360 League of Users and Value Creation Forums include prospective end users, purchasers, local municipality civil servants, members of relevant associations, industry giants, community members, and industry experts. The League of Users is presented the results from the initial Market 360 analysis to provide input and feedback to: (1) validate assumptions related to the target and potential markets, (2) confirm that issues uncovered represented a significant problem, (3) understand more clearly why the problem is so significant, (4) ensure that there are not more pressing issues in their market sector, (5) identify the most impacted users, (6) identify previous attempts to solve the problem and how those solutions fared, (7) propose a conceptual solution and acquire feedback, and (8) identify product delivery methods of choice. All four TCF tracks of effort interact to determine an MVP that meets the validated need (Market360), is technically achievable (Innovation), affordable (Business Operations), and able to be brought to market and produce revenue quickly (Marketing and Sales). The TCF platform is configured to allow interactivity via the cloud-based system between the League of Users and the TMT and TO. The League of Users data is captured and stored on the cloud-based system and is displayable to the TMT and TO via the GUI on a remote device. In one embodiment, the present invention records the extra features, based on market data (ex. unmet need or increasing market space), that are not needed for the MVP but will be added as the TO progresses. The product features are ranked by feasibility and desirability based on the market data and the League of Users data. The present invention is configured to use the ranking to schedule the allocation of funds for future expenditures to add the desired features.

After a proposed MVP has been created, the four tracks of TCF are leveraged to host a Value Creation Forum (VCF). The VCF targets users who represent the utility of the solution and buyers who accurately represent what they would pay for a solution. The VCF is designed to elicit actionable data and specific feedback on the product trajectory, so significant preparation is completed by the TO. Pre-VCF activities focus on the development of: (1) scenario-based vignettes to reinforce proper problem characterization from the user perspective, (2) key performance indicators that gauge the level of success of the solution, (3) mock-up of the solution, applied to the vignettes, that drive home how the solution impacts the user, (4) indirect benefits to the user: cost or time savings, increased safety, improved quality or throughput, pricing model, to include incentives for early adopters as well as product delivery models, and targeted question construct to elicit specific feedback that will validate or drive changes to MVP. VCF output is automatically collected in the TILLER and used to influence insights and decisions about the one-of-one solution trajectory.

Business Operations

In the present invention, the third parallel TCF track is business operations. This track focuses on all functions related to management and execution of the TO per the QEP, including but not limited to: the legal aspects of the TO, business partnerships, production and supply strategy, cost efficiency of manufacturing, financial management, investor briefs and so forth. The Business Operations track sets and manages all TO activities via TCF standards. The data inherently collected, along with TILLER algorithms, from this track are of pre-eminent importance to evaluating the effectivity of the TMT, the projections of success based on EBITA, and pricing models (in concert with Marketing and Sales). Risk identification routines and alerts related to competition or other anomalies are auto-reported by TILLER for action traceability and execution delegation to the Business Operations track.

One embodiment of the present invention is the business operations track, with inputs collected from the other three tracks, automatically creates a pricing model for a TO's idea. The pricing model is based on factors that include: (1) costs to recapitalize initial product development, (2) long range sales support, (3) product improvement, (4) development required to integrate aggregate elements into a single product, (5) development to bridge gaps in product maturity, (5) testing to assess readiness, (6) regulatory compliance and/or certifications required, (7) manufacturing, (8) supply chain, (9) business operations, (10) documentation and training, and (11) staffing to support the capability roll-out and maintenance. The present invention is further configured to enable a user to interact via the GUI to change the various factors to analyze how the pricing model would change. The Market 360 analysis forecasts production and development cost. The Market 360 analysis also determines a target buyer's profile, the target buyer's budgets and whether there are any premiums a buyer would pay to advance delivery of a solution. Market360 estimates the optimal price point to maximize profit. Furthermore, Market360 determines whether outright purchase or licensing is appropriate, whether discounts for early adopters would be effective and whether feature-based add-ons would be alternatives to discounts. When determining whether an outright purchase or licensing is appropriate, Market360 considers the cost and exclusivity of licensing, the activity of major players in the market space, and the cost to bring the product/idea market. After the TCF platform has perform its analysis, the TCF platform alerts the TO and TMT via a remote device about the current status of the TO's intended market.

Marketing and Sales (M &S)

In the present invention, the fourth parallel TCF track is Marketing & Sales (M&S). This track focuses on all functions that produce meaningful engagements with end-customers with the intent to inspire purchase as well as the meticulous planning and execution steps required to capture revenue for the TO. The M&S track is marketing driven, where the sales approach follows the go-to-market plan established by the marketing team and business operations team.

Figure 15:
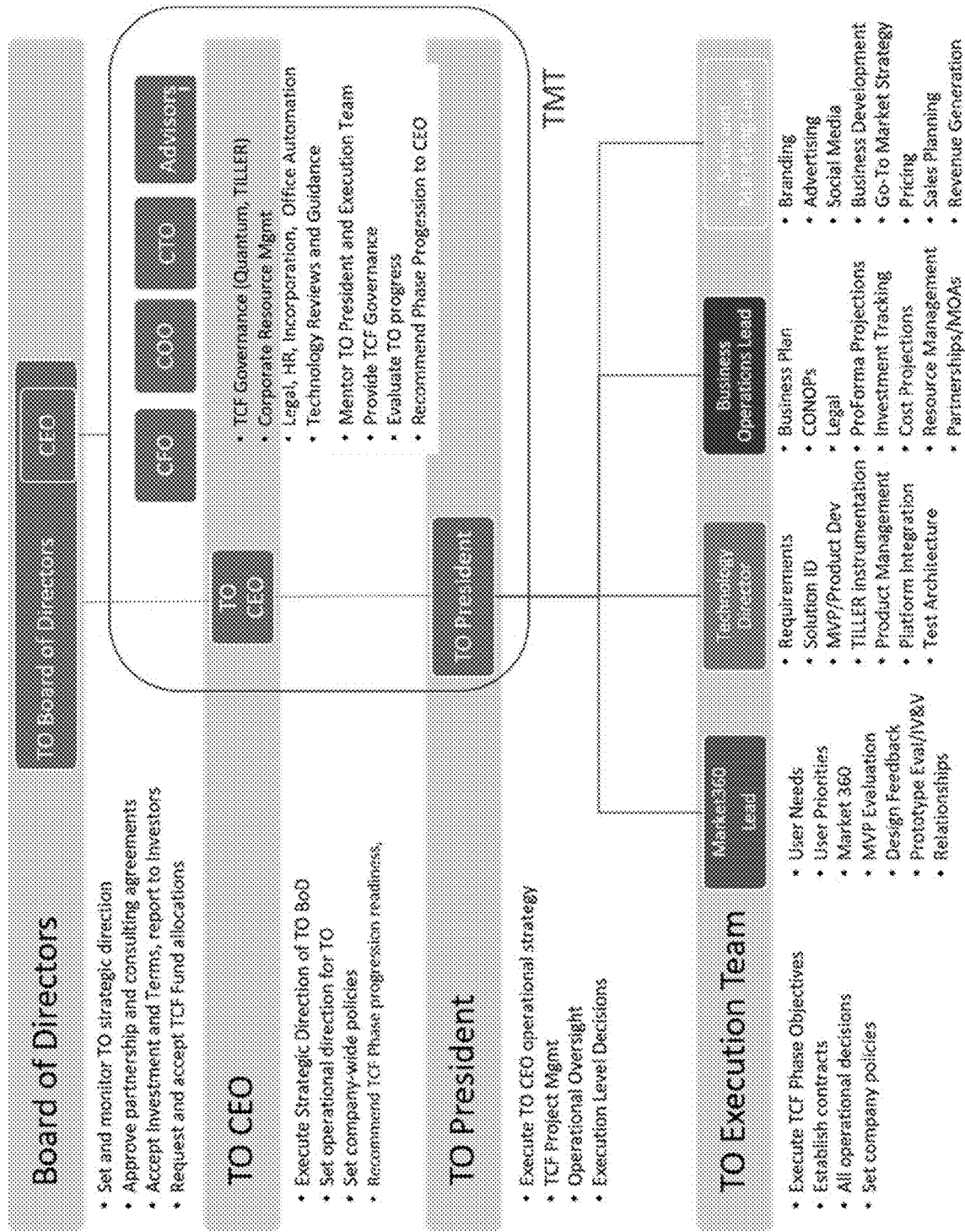
FIG. 15 illustrates an organizational structure according to one embodiment of the present invention.

TCF offers specific time-phased products relative to marketing and sales for each TO. Marketing-driven sales architectures are established in Phase 0, where many prior art or contemporary methods wait until much later in the product development cycle. This TCF approach ensures that TOs embed customer-facing relatability into the product and to align TO timing with primary customer buying cycles, thus avoiding potential miscues in product concept development based on known M&S tactics or campaigns that have succeeded or failed in the past. FIG. 15 characterizes the M&S track functional responsibilities and typical key products and highlights the focus of the marketing and sales efforts. The TO Execution team is responsible for branding, advertising, social media, business development, go-to market strategy, pricing, sales planning, and revenue generation. The TCF Marketing and Sales track is exemplary of TCF methods and systems that drive qualitative, otherwise non-uniform data into quantifiable metrics. Marketing typically embodies a set of largely creative activities that are rarely if ever quantified. While sales data is quantifiable, in other prior art it is not normalized across companies for consistent metrics of meaning that can help gauge the over effectivity of an entire system. Due to the heavy tie of the TCF model to market pull, in the TCF method, sales approaches are driven by the marketing approach (which is heavily influenced by the Business Ops, Market360 and Innovation tracks).

Marketing products or draft concepts are generated only as appropriate in the dollars-at-risk limitation scheme of TCF, as depicted in FIG. 16. FIG. 16 illustrates the tasks for marketing and sales products according to each phase. The TCF M&S track delivers answers to phase-end goals while limiting dollars at risk. Aligned with the phase-based track priorities, M&S activities are conducted at phase-appropriate levels, as is the case with every TCF functional track.

Figure 17:
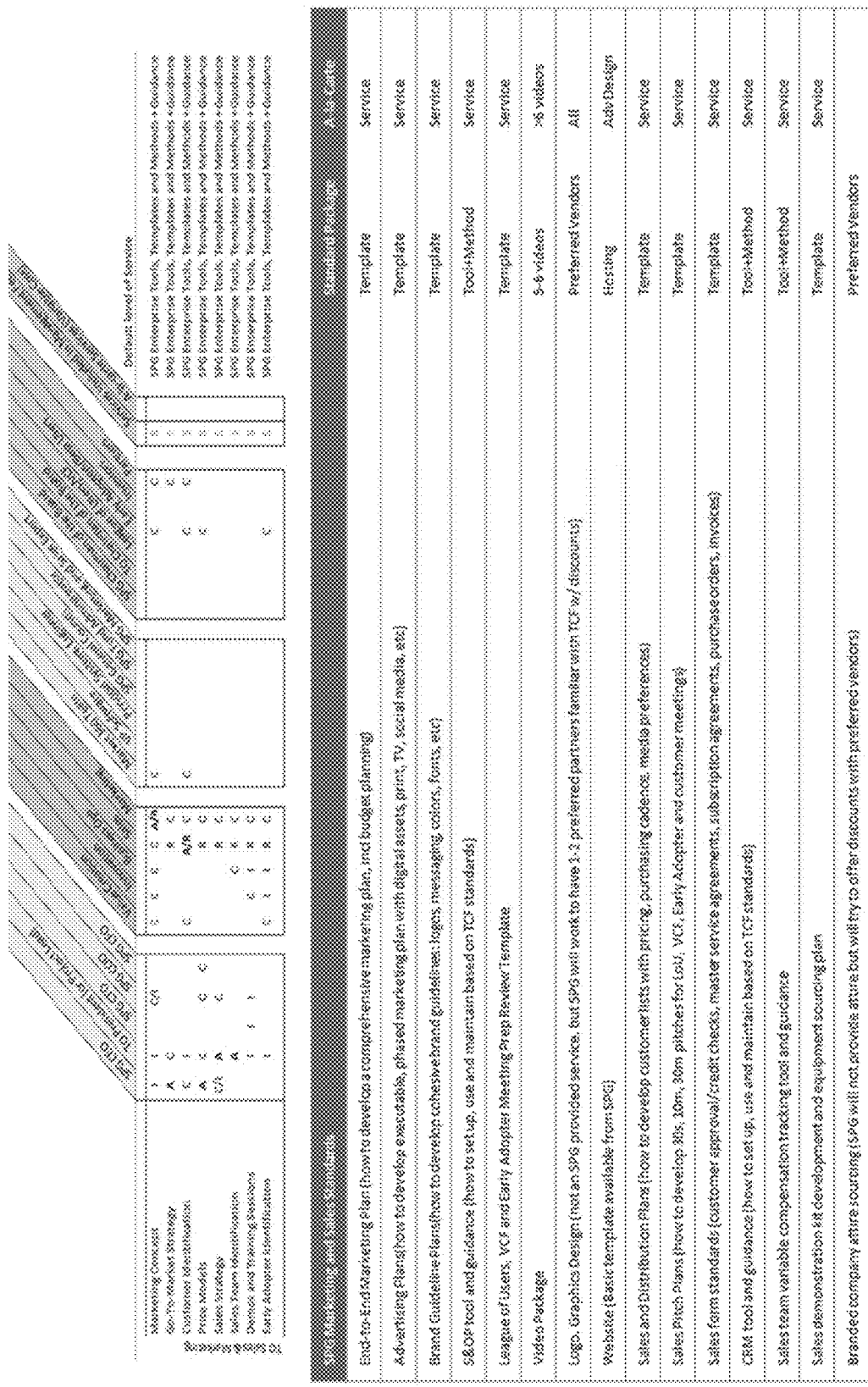
FIG. 17 illustrates a dashboard and RACI according to one embodiment of the present invention.
Figure 38:
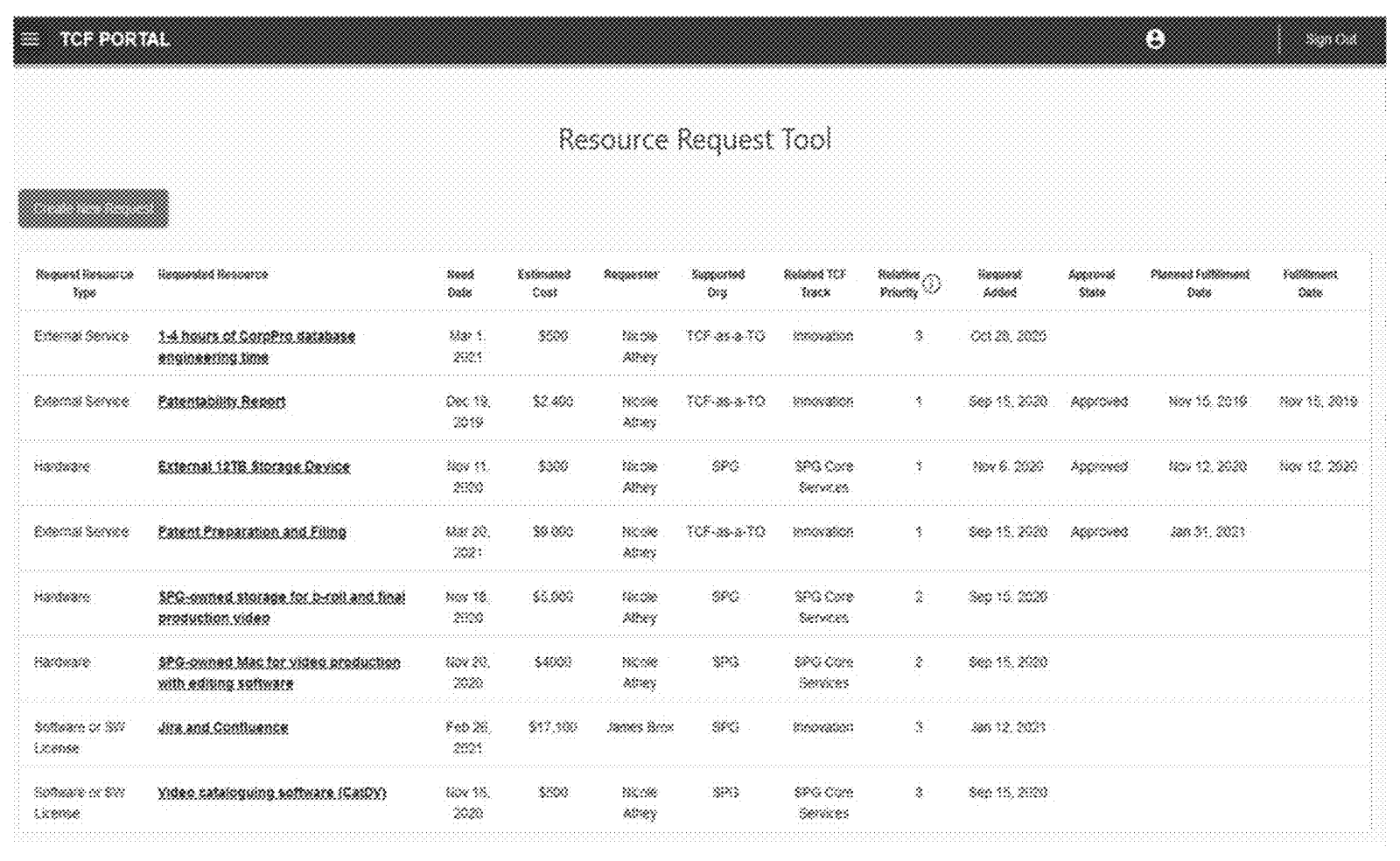

Instrumented enterprise tools, templates, methods and guidance are provided for each of these products, which include but are not limited to those shown in FIG. 17: target audience template, marketing messaging template, brand guideline template, S&OP template and tool, Go-To-Market Template, advertising template, PR guidelines, New Customer setup forms, drip campaign guidance, purchase order template, invoice template, sales demo kit guidance, subscription agreement templates, etc. TCF offer drill-downs for every functional track, each married to the RACI, and clearly articulates the scope of effort provided by the TMT and TCF management services. This offers a TO an upfront understanding of the level of effort supported by the TMT. Advantageously, the present invention further includes a resource request tool as illustrated in FIG. 38 and a video service request tool. The resource request tool and the video service request tool are able to receive user input via the GUI. Advantageously, the resource request tool and the video service request tool enables the TO and the TMT to manage resources and generate an alert when a resource is needed.

Figure 18:
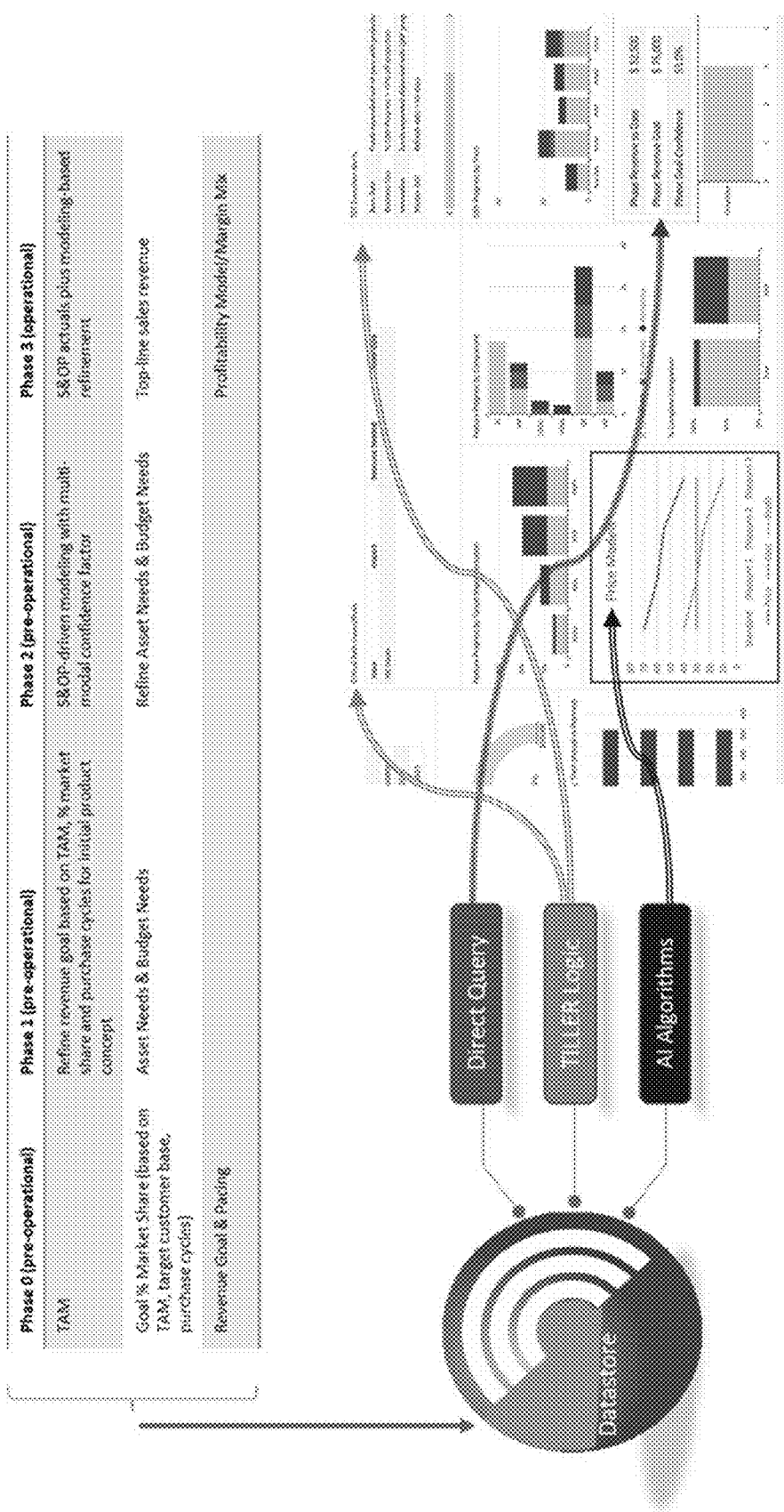
FIG. 18 illustrates a flow diagram according to one embodiment of the present invention.

Key elements from each template are automatically ingested into the TCF analytical platform and are leveraged to automatically generate key insights to the TO, the TMT, and the CEO as shown in FIG. 18 that include but are not limited to: validated Total Available Market (TAM), target customer base, goal % TAM, revenue pacing, purchase cycles, top line sales, profitability model, margin mix, opportunities for specialty pricing, and so forth. FIG. 18 illustrates an example of how standard TCF-provided tools and methods and expected products, generated as a matter of course during helper function execution using standard work systems, are ingested into the TCF TILLER framework for further back-end processing, ML/AI and insight generation. FIG. 18 further illustrates data flow from the phase-relevant metrics to the data repository with the outputted data being displayed on a dashboard.

Insights are viewable on a cloud-based, web-accessible GUI with drill downs for time-phased progress. The cloud-based web-accessible GUI also includes automatically generated alerts based on thresholds defined for slice-in-time as well as time-phased trends. Backend analysis engines also offer ML/AI that act upon M&S data collected (customer data, industry data, supplemental marketing target personas, etc.) and automatically trigger backend ML engines to initiate a Market360 refinement or a web-based crawler to auto-harvest additional information. The M&S track relies heavily upon inputs automatically generated based on the other three functional TCF tracks. In one embodiment, Market360 data generated for the target market, the major players, competitors and so forth that are used to devise the messaging content. In another embodiment, data from the business operations Proforma are used to automatically generate periodic sales timelines that are married to buying schedules of potential customers.

In the present invention, the phases and the tracks are further differentiated from prior art by their inter-relationships, their guardrails and the suite of methods and tools that automate a normalized data collection and algorithmic execution enhancement suite of key data elements.

The present invention further assists early stage TOs, as illustrated in FIGS. 8A-8D, by clearly scoping helper functions for each TCF track to ensure that the TO is progressing appropriately in each TCF Phase. FIGS. 8A-D show a next-level decomposition of functional track sub-goals for each phase, where specific activities are defined to help a new company focus on exactly what actions need to occur at a given time, who needs to do them and how to produce quality products. The helper functions produce phase-end deliverables, each with a reportable confidence factor, that contribute to the phase goal. The confidence factors are normalized quality scores obtained by TILLER and applied to the governance score card.

Figure 9A:
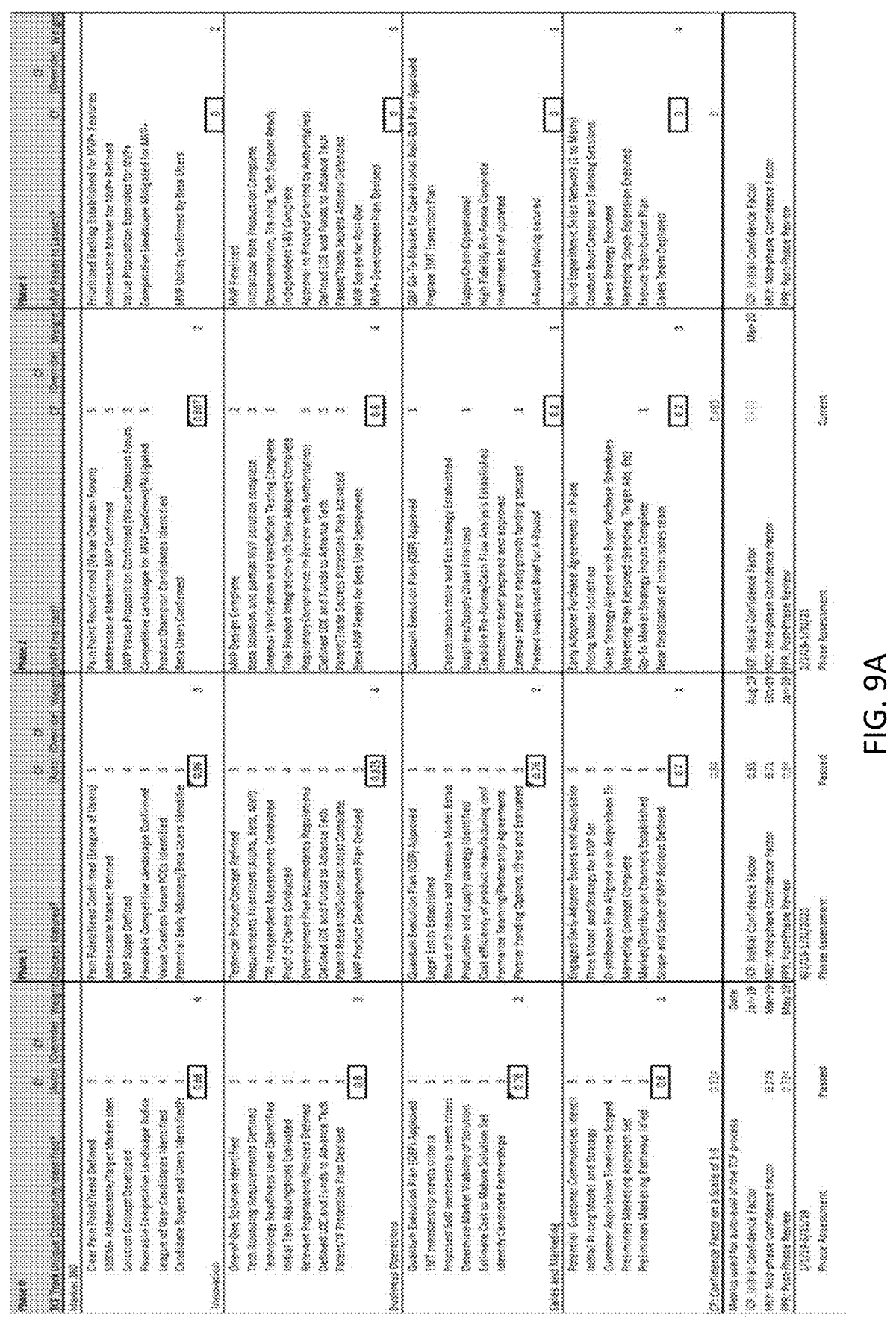
Figure 9B:
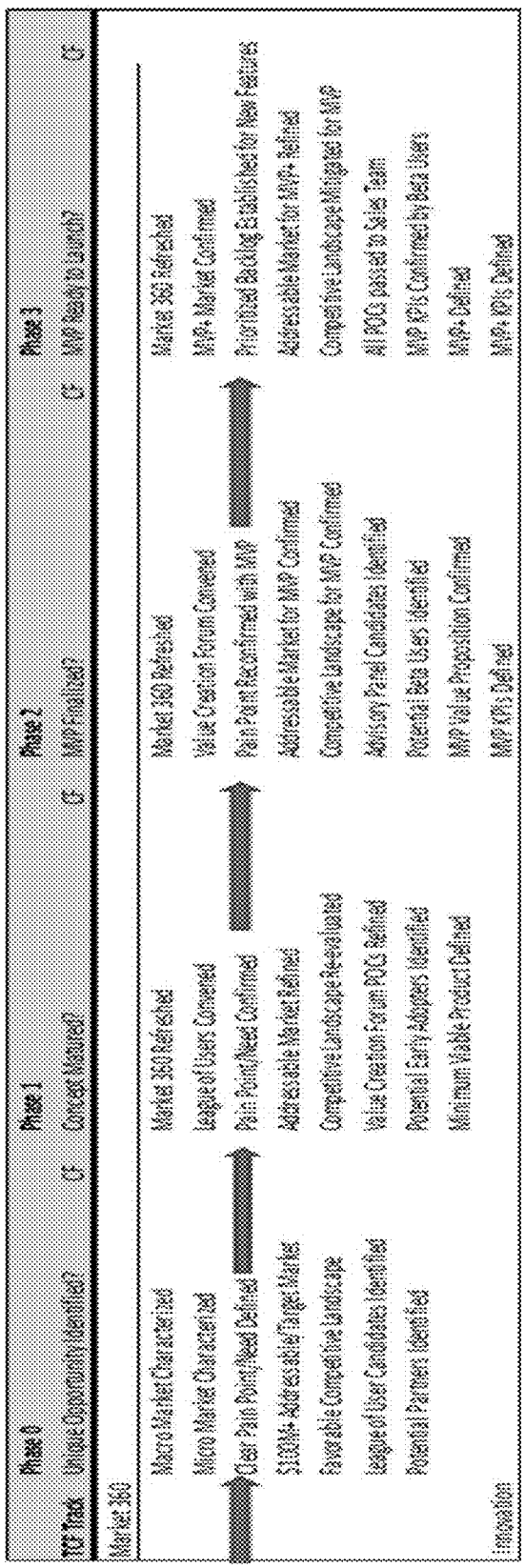
FIG. 9B illustrates an evaluation scorecard according to one embodiment of the present invention.

FIGS. 9A-9C illustrate an evaluation scorecard according to one embodiment of the present invention. TCF consistently maintains a combined scoresheet that maps directly to bottom-line questions and interest areas of investors, which mirror indicator areas for success or failure. The TCF scorecard aligns perfectly to all TCF functional activities and therefore, when instrumented by the automated methods and systems underpinning TCF, the output of all TCF activities can quantifiably feed the scoresheet. The scoresheet represents a significant depth of insight well beyond a standard checkbox of yes/no or completed/not completed. For every element of the TCF scoresheet, there is quantifiable trail of combined feeder elements that lead to a calculated, consistent and normalized confidence factor. That is, for any action completed within TCF, there is also a measurable confidence in the quality of the answer. The TCF standards, instrumentation, and TILLER methods and algorithms align perfectly to produce metrics that are consistent and comparable within phases, across phases and across TOs. Based on a relative importance, each accumulated confidence factor within a Phase contributes to a phase-based score that helps the governance team, the CEO and investors understand the progression of the TO according to the metrics that best indicate success or failure. These scores are maintained throughout each phase and are tied to alerting mechanisms if known or ML thresholds of progress are not met, allowing early engagement to mitigate or overcome sources of challenge to the system or TO. It is expected that the confidence factors obtained in Phase 0 will increase for all areas through each phase since several of the sub-tasks repeat through the phases. The full-scope governance score card includes confidence factors. The score card is operable for display on the dashboard for the TO, TMT, and C-suite. The scores can be overridden by the TMT and the TILLER machine learning will incorporate the new scores to improve automated scoring routines.

In one embodiment of the present invention, a Quantum Execution Plan is generated for every TO and serves as the authoritative TO roadmap through TCF Process. The QEP accounts for the quantum-level idiosyncrasies of startups that do not occur for more established businesses. Within the QEP, elemental aspects of the TO are defined in a system model and TILLER metrics are instrumented for collection and evaluation throughout the Phase(s). Initial TILLER confidence factors are assigned in accordance with established category definitions and serve as a quantified baseline for comparison, evaluation and assessment with updated metrics collected as the phase progresses.

Figure 10:
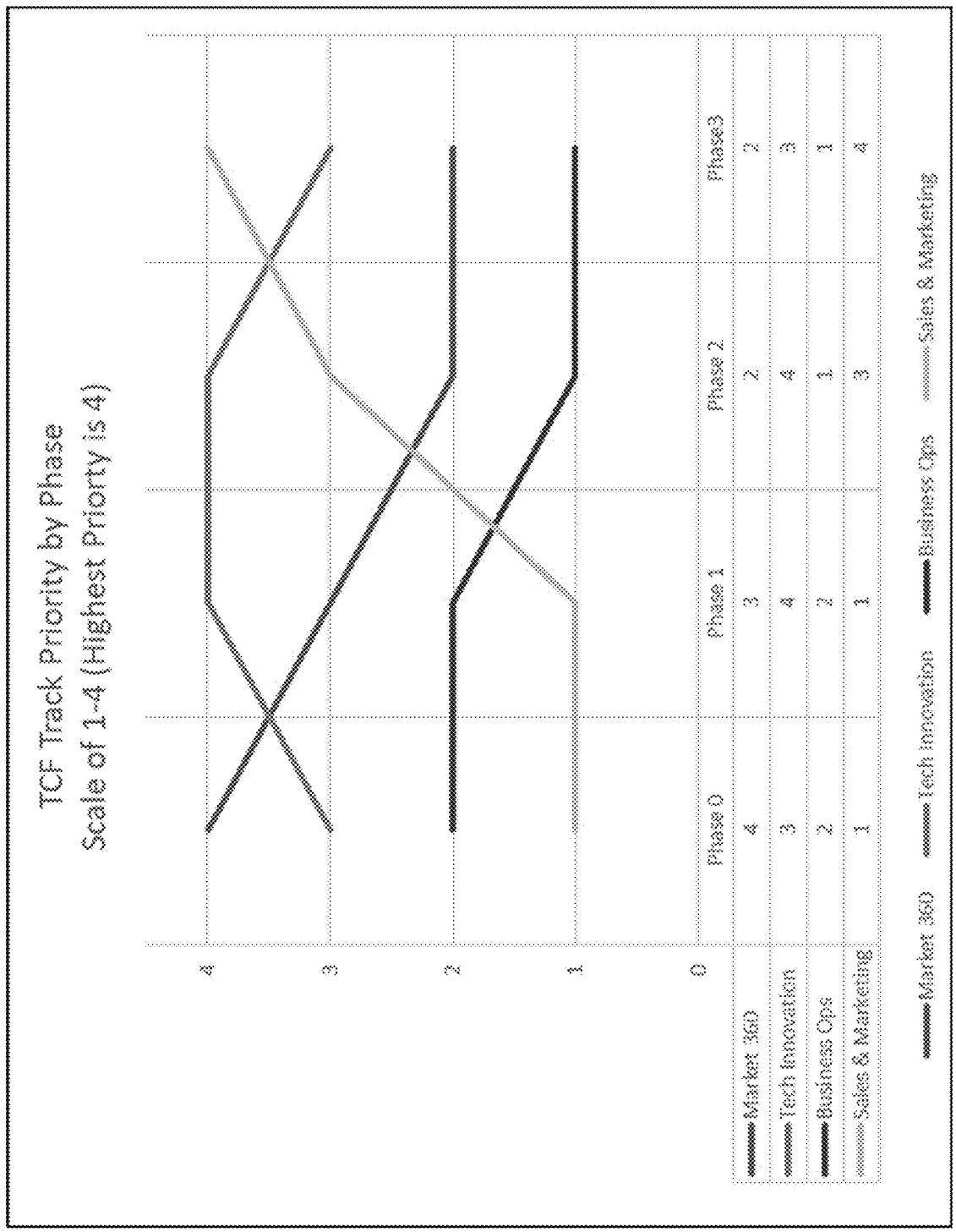
FIG. 10 illustrates a graphical representation of Track Priority according to one embodiment of the present invention.

In one embodiment, the QEP establishes a phase-based functional track priority scheme relevant to achieving the phase goals for a TO, shown in FIG. 10. The QEP template allows the TO develop a highly refined business plan specific to early stage companies that identifies and mitigates risks based on data collected in the Innovation Discovery process and married with Market360 data, before the TO Phase 0 is even initiated. FIG. 10 illustrates a graphical representation of the changes in Track Priority by Phase. The priority of the TCF process is shifted from phase to phase as established in the QEP. The QEP establishes phase goals that are specifically designed to limit risk and dollars at risk so funds are not wasted or expended before confirming the likelihood of success. The QEP creates the necessary infrastructure working back from the end goals of the TCF Process. The TCF infrastructure reduces the typical problems for startups by constructing a plan that limits actions to only those necessary to achieve each phase goal. Separating the functional tracks of effort into multiple phases creates a structured process for the TO and improves the chance of success. Furthermore, the QEP is under a continuous cycle of market research refinement as it receives information from market influencers and AI/ML algorithms for competition and trend analysis.

TCF offers levels of efficiency not provided by any other prior art, due to both the level of integrated automation, standardization and systems engineering in the design of the entire system. Accordingly, resources for a TCF managed TO are artfully allocated based on the functional priority of each phase. Resources are allocated by functional track and each TO will have a roadmap defined by a Quantum Execution Plan that outlines the relative priority of each track for each phase. These priorities are monitored by the built-in work systems and their auto-collected metrics that feed the TMT governance team, and these priorities are also reflected in the weighting of confidence factors throughout the system.

Figure 11:
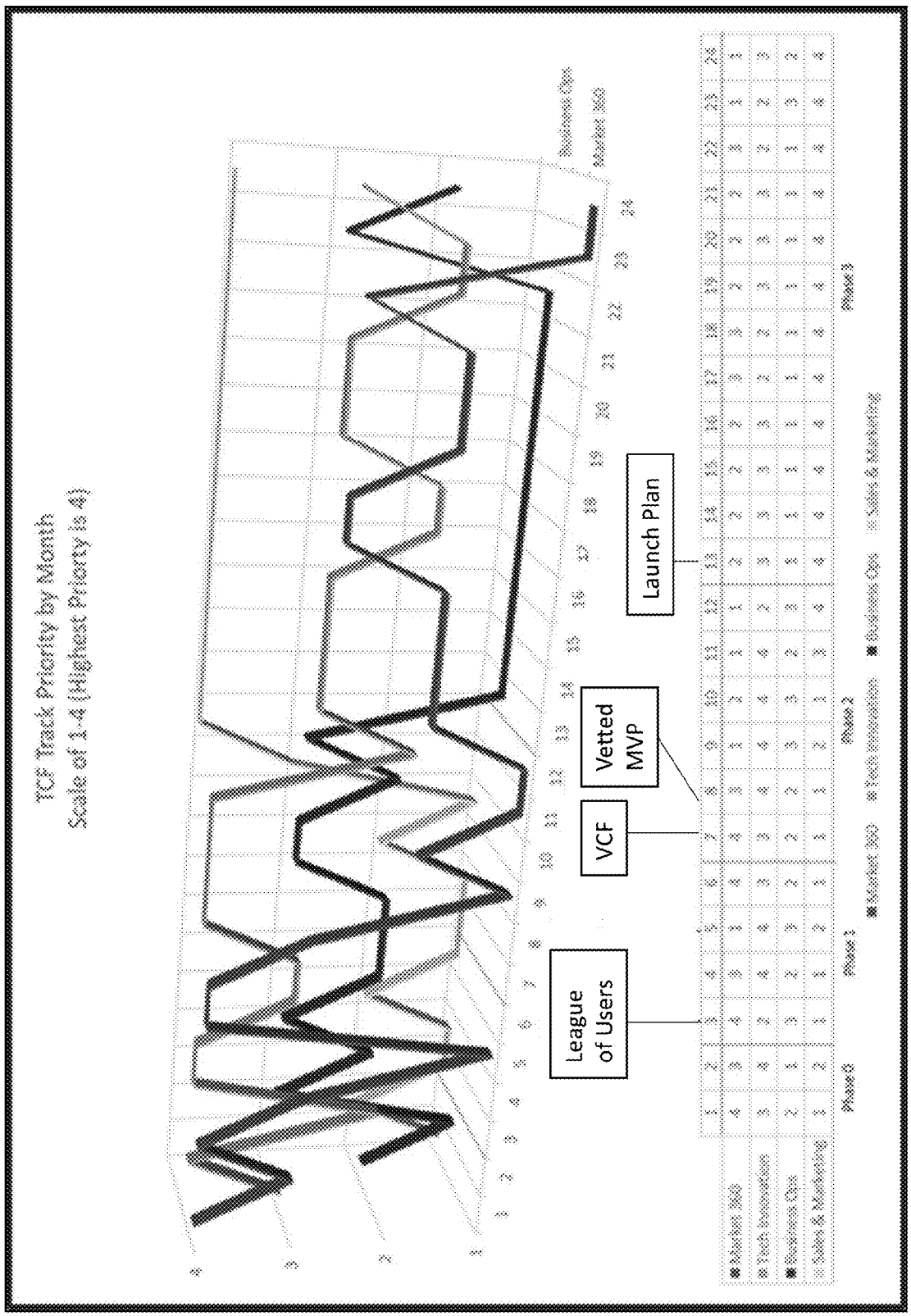
FIG. 11 illustrates a graphical representation of Track Priority according to one embodiment of the present invention.

After the standard TCF track-based helper functions specific to the upcoming phase are integrated into the QEP, a granular track-based priority scheme that shifts relative to key milestones, as shown in FIG. 11, is generated along with an auto-derived initial assessment of the confidence factor of the TO. The QEP is part of the agreement of terms between the TMT and the TO for the items, and only those items, that are to be worked in a given phase. The TMT is able to quantitatively evaluate the TO progress using the QEP, and all associated collaborative work products that automatically feed the TCF TILLER assessment engine. All functional tracks are monitored by the QEP and the QEP is instrumented such that data generated can be automatically aligned with work systems native to each functional track. Outputs from the QEP and other native work systems are fed into TILLER via the TCF Register and other instrument systems to automatically generate and present confidence scores on the web-accessible TO evaluation scoresheet.

FIG. 11 illustrates a graphical representation of the changes in Track Priority by Phase. The track priorities by phase are further decomposed to align with key milestones within each phase. One method of monitoring this baseline compared with actual work expended is the TCF instrumented timekeeping system that is designed to align directly to the TCF functional track method. Automated tools then pull data collected for one purpose (payroll) and because it is instrumented for TCF, the tools can use it multiple times for additional insights for the TO and the TMT.

Figure 12:
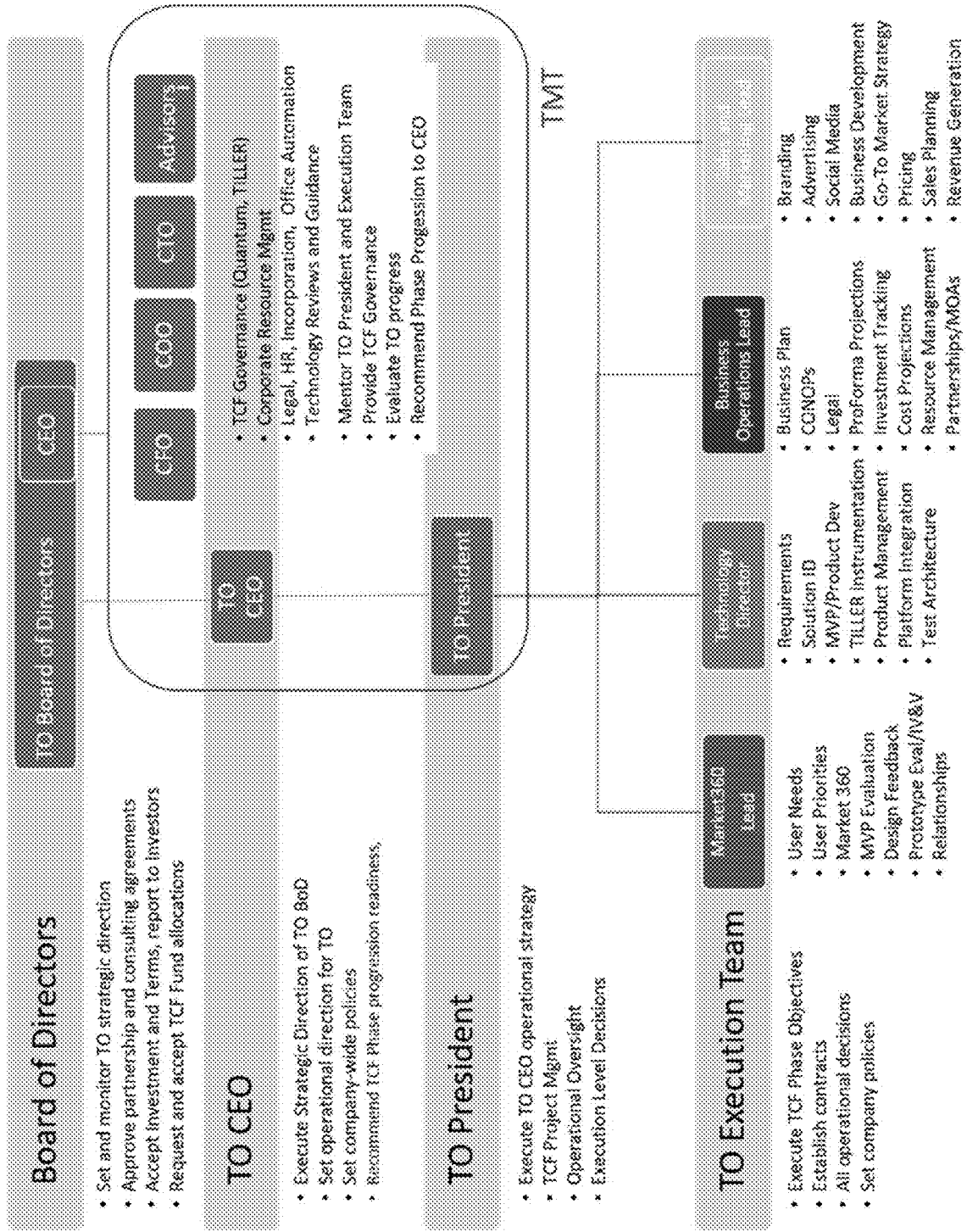
FIG. 12 illustrates an organizational structure according to one embodiment of the present invention.

FIG. 12 illustrates an organization structure according to one embodiment of the present invention. The present invention is designed to monitor and track the responsibilities of each member of an organization. Each TO, though managed as part of a multi-TO super structure, has an organizational structure that maps directly to the TCF functional tracks.

TCF Integrated Logic Layer and Enterprise Record (TILLER)

The TCF Integrated Logic Layer and Enterprise Record (TILLER) includes methods to model, manage and measure all aspects of a TO. TILLER supports an investor-centric method for assessing a TO as it progresses through the TCF process. Investors seek quantifiable, consistently developed metrics to use as indicators of progress and of anticipated success or failure. However, endeavors in their infancy rarely fit squarely into constructs that yield clean, uncomplicated data. The system is configured to take both qualitative and other variant, non-baselined inputs and automatically create a decision-making framework for TCF. The present invention transmits the required framework to the TMT and to the TO via the cloud-based network or network-based communication and the framework is displayed via the interactive GUI. Advantageously, the TILLER is designed to streamline the entire TCF process, systems, and methods to automatically generate normalized, useful data that provide context and critical insights for a TO.

In the present invention, THE TILLER is the systems-engineering backbone for enabling the data collection and insights that fuel TCF results. The TILLER defines the computer, software and network-based infrastructure required to complete the standardized tasks required by TCF as well as to automatically harvest data necessary for ML/AI transformations of data that enable the TO and multi-TO management methods unique to TCF. The TILLER structures all facets of the system architecture, software and templates to ensure the greatest degree of conformance and consistency in the data collected. Non-numerical data elements are converted to normalized, quantitative data wherever possible and confidence factors are employed in all such cases.

Figure 23:
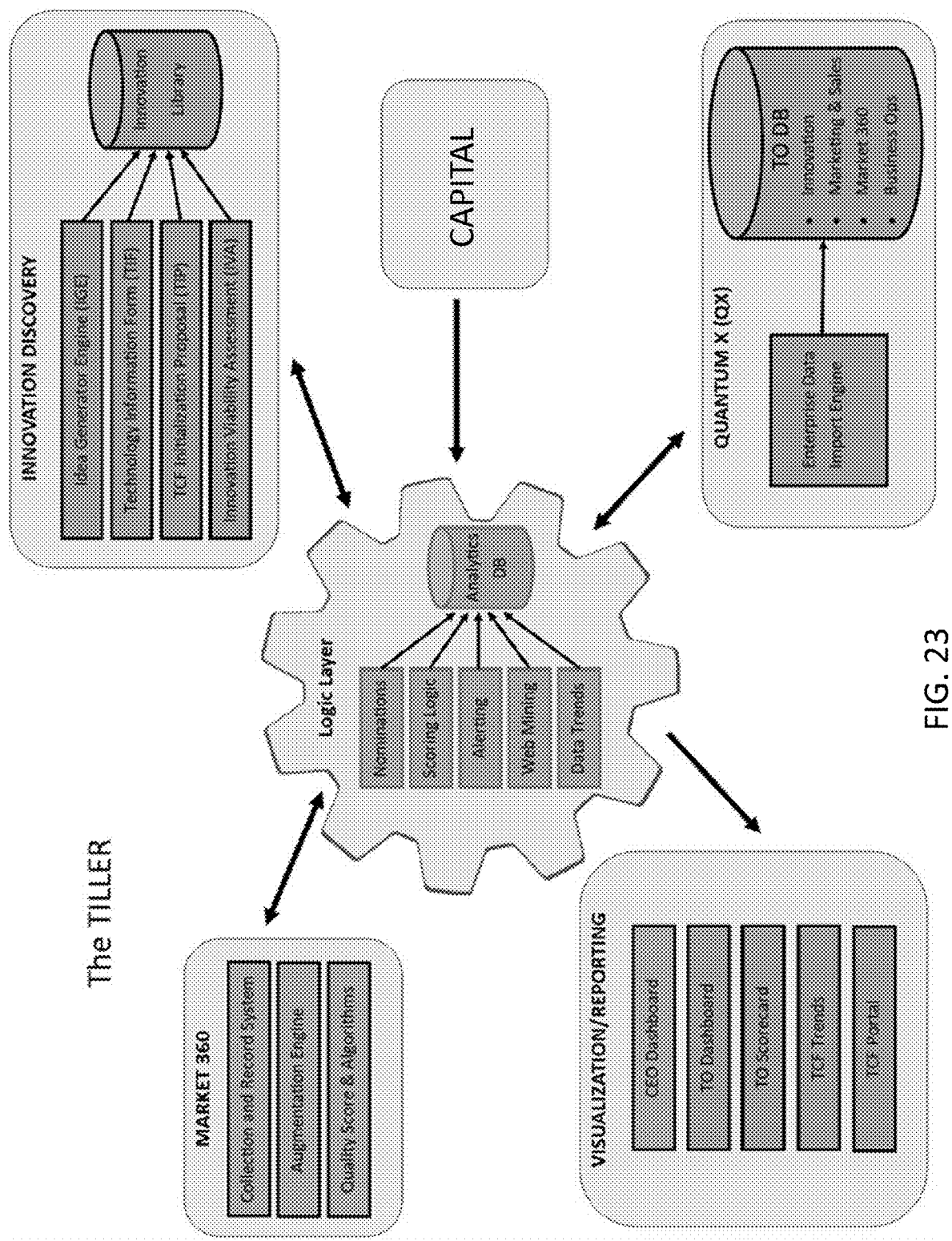
FIG. 23 illustrates a schematic representation of TILLER components according to one embodiment of the present invention.

FIG. 23 provides a logical view of the TILLER components. The TILLER framework instruments the work systems within each track to generate pre-normalized, standard, consistent, time-stamped data that is auto-harvested and ingested into the Quantum Execution (Quantum X) datastore. The Quantum X datastore captures data collected from each TO functional track's native work system. The Market360 datastore, since it sits at the multi-TO level, generates market sector tagged data that is stored in a separate datastore with its own routines that feed and are fed by TILLER functions. The Innovation Library represents all data relevant to technologies that may be candidates for the TCF process. The TCF Fund datastore represents the current state of committed or available TCF funds and any investor generated data relevant to TCF.

In the present invention, the TILLER produces confidence factors wherein confidence factors are numerical representations, based on TCF standard definitions, of the degree of confidence that a given entry is accurate. To reduce or eliminate bias in entry and ensure robust, well-formed data, a confidence factor is derived based on standard criteria specific to each action of interest. Confidence factors enable substantially increased uniformity in assessment and are employed to glean various insights, most notably to the characterization of risk. The present invention provides confidence factors for both numerical and non-numerical data elements. This increases uniformity across the assessment and improves the accuracy of analysis and evaluation. The confidence factors include industry standards. For example, in one embodiment, the present invention uses the Technology Readiness Levels which provide a standardized numerical evaluation of the state of technology development.

Furthermore, the confidence score is applicable for all technologies and businesses, which enables the TCF to be repeatable for all technologies and businesses. The confidence score is a numerical representation of the degree of confidence that data is accurate. This improves management insights, aids decisions for mid-phase pivots, and informs investors' evaluations when determining whether or not to provide funding to the TO.

Another embodiment of the present invention is the TILLER applied logic wherein specialized AI/ML algorithms are applied to data and confidence factors collected by the TILLER infrastructure, toolsets and methods. Multiple layers of TILLER applied logic live within the system to provide insights to assist with evaluation, monitoring, self-checking and gate progression assessments throughout the TCF phases. The TILLER collects authoritative data from native work systems and provides one-to-many outputs from the collected data. TILLER applied logic produces insights and actionable alerts to every TCF execution and management tier. TILLER applied logic produces automatic assessments of TO compliance with the TCF process, progression of the TO in accordance with the approved QEP plan, alignment with assumptions provided to the Board and to investors, and effective use of capital. The TILLER applied logic uses the same data to improve the TCF process, assist in deciding which candidate TIP to convert to a TO, identify anomalies, and guide funding decisions. The TILLER framework assures for: 1. Co-located, tagged, searchable and easily accessed data for applied logic, 2. Uniformity of data that is relatable to other data for equitable comparisons and aggregations, 3. Universally understood rulesets for all applied TILLER logic is available to all TOs, TMTs, investors, BoDs and TCF practitioners. The TILLER creates a framework for decision making, together with QEP and TCF governance, but in itself does not produce decisions. TILLER applied logic is consistent across phases but retains a dynamic quality for ad hoc reporting and advanced algorithm introduction as determined by the Chairman of the Board (CoB). AI/ML algorithms can be added at any time without disrupting traceability or backwards compatibility.

In one exemplary embodiment, the TILLER is configured to map to the QEP system model to instrument TO-specific elements in TCF. Advantageously, TILLER is further configured to collect and prepare data. In addition, TILLER models all elements for a proposed solution and its intended market to identify risk and candidate mitigations.

In another embodiment, when determining the confidence score for Market 360 data, TILLER includes the quality, breadth and depth of the information. This includes the authority of the data source, accuracy of the data source, objectivity, date of source material, and comprehensive coverage of data source. The data is time-stamped and is periodically refreshed to ensure that updated information is used for the TILLER analysis.

In one embodiment, TILLER is configured to quantify and evaluate the accuracy of the state of a phase completion and the progression readiness. This ensures there is control over the TO progression and provides consistency in the measurement of progress. The present invention prioritizes each phase and the necessary expectation and responsibilities. Any major deviations from expectations is flagged for awareness or investigation in the TO dashboard and is visible to the TMT and TO.

For example, and not limitation, at the end of Phase 0, one of the exit criteria is estimating the cost to mature the candidate solution set. The cost estimate includes technology specific costs as well as support ancillary costs. The estimate includes licensing fees for any foundational IP, software development costs, software licenses unique to the solution, hardware development materials, computing hardware or cloud-based hosting, specialty equipment access, source materials, patent costs, costs associated with regulatory compliance, anticipated testing costs and any additional expected costs unique to the maturing solution. The present invention is configured to display, on the interactive GUI, the percentage of required resources that are identified and that sources and price are confirmed. These data points are normalized by the TILLER framework for evaluation. TILLER logic evaluates the cost data in reference to other components of Phase 0 and produces a pricing model and assesses an overall confidence factor in the feasibility of the TO achieving TCF revenue goals.

Figure 22:
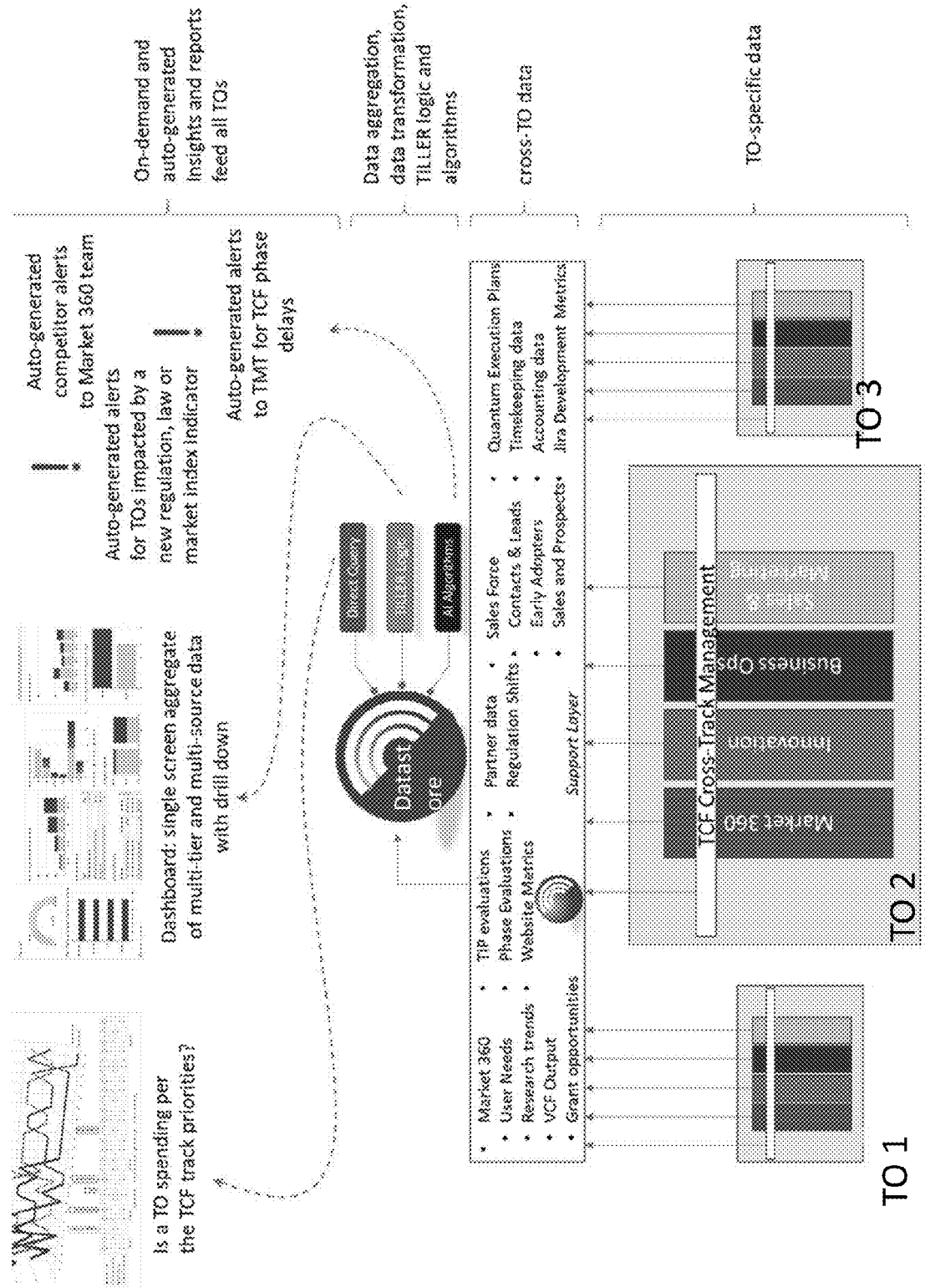
FIG. 22 illustrates a flow diagram according to one embodiment of the present invention.

FIG. 22 illustrates how the TCF standards and instrumented systems facilitate multi-tier products and insights based on data gathered with standardized, instrumented work systems. Each TO generates the same products for each functional track, all created and completed in the same work systems according to the same standardized methods, tools and templates. The products produced by nature of the helper functions in a track for each phase are valuable in their own right. But, because TCF creates all work systems, methods, templates and tools with a larger goal in mind, the TCF practitioners work systems are simultaneously producing pre-normalized data that is auto-harvested and ingested for use by cross-TO tools and methods, which also produce meaningful products at that level. In the same manner, those backend systems are instrumented for further data collection, which is automatically fed into the next level up and can then be used for ML/AI algorithms in the system that help feed both TMT level insights as well as higher fidelity data products that can alert TO execution teams of anomalies, opportunities and risks.

The present invention collects TO-specific data, performs research on the TO's intended market and technology, then aggregates all of the data and applies TILLER logic and algorithms to analyze the data. The multiplicity of data inputs and sources include but are not limited to (1) Market 360, (2) User Needs, (3) Research Trends, (4) VCF Output, (5) Grant Opportunities, (6) TCF Initialization Proposal (TIP) evaluations, (7) Phase Evaluation, (8) Website Metrics, (9) Partner data, (10) Regulation Shifts, (11) Sales Force, (12) Contacts & Leads, (13) Early Adopters, (14) Sales and Prospects, (15) Quantum Execution Plans, (16) Timekeeping, (17) Accounting data, and (18) Jira Development metrics. The present invention is designed to constantly update and collect the multiplicity of data inputs. Throughout each phase of TCF, the TCF platform tracks the changes and trends in data and provides alerts to a TO. The TCF platform is designed to auto-generate alerts for competitors, for delays in a TCF phase, and for new regulations, laws, or market index indicators that affect the TO. The TCF platform outputs the data to an insight table that displays the data and the confidence score of a TO. Furthermore, the present invention is operable to generate a graphical representation of a TO's spending and the present invention analyzes whether the TO's spending is aligned with the track priorities. If the track priorities are not on track, then the system is designed to alert the TO and the TMT. The tools and management methods are built to accommodate cross-team interaction and cross-team dependencies to ensure for automatic checks and balances within the company. All data flows upwards and is acted upon at multiple levels to enhance and share the data. Data is then aggregated and acted upon by algorithms and artificial intelligence to produce alerts for each tier of the company and also cross-tiers.

TCF is configured to determine whether an idea/organization meets the necessary requirements to be a TO. The TO criteria includes (1) a one-of-one capability of addressing a societal need, (2) whether the addressable market can generate $100 million dollars within three to five years, and (3) whether the C-suite has the necessary expertise to achieve the revenue goal and timing. One-of-one capability means that a TO's idea, product or solution is a unique opportunity in a market that represents an unmet societal need. The necessary requirements improve the probability that the TO will succeed and ensures that the TO is focused on addressing a societal need.

Governance

One aspect of the current invention is the TCF process governance methodology. The TCF Governance approach ensures that each of the four phases of the TCF process is executed in sequence with the proper focus and balance, and that each phase produces actionable information for decision makers and investors. The governance process works within the TCF framework with clear roles and responsibilities, objectives and phase-based entry and exit criteria. TILLER-generated confidence factors are integrated into this framework to yield a robust characterization of progress and TO potential, as well as to highlight areas of risk. TCF Governance ensures that the TO maintains focus on the most critical aspects of corporate formation at any given time, that stewardship of resources is optimized, and that the TO is on track to meet the phase goal. The TCF governance approach regulates the TCF phases, the intersection of TMT expertise, TILLER AI/ML and strict approach regulates the effectivity of a TO and its resources.

Each TCF Phase focuses on the most critical aspects of corporate formation at any given time. Stewardship of resources is optimized by establishing and adhering to unambiguous priorities that are set forth by the end-of-phase questions. This approach decomposes a complex problem into highly focused sets of tasks and isolates many variables until they are relevant. TCF practitioners use the phase-end question as the guiding principal of each phase, aligning all activities to the pursuance of its answer.

The discrete phase goals are set to be achievable and value generating and are executed by well-defined steps that are scoped appropriately to limit risk. TMT structure of management ensures services are applied throughout the TCF process, at defined and ad hoc phases. TILLER provides both uniform, unbiased input across TOs to the TMT as applicable to phase goals and QEP milestones as well as ongoing integrated and actionable TO-relevant data to the TO president. TMT governance ensures cross-checks to maintain agreed upon deliverables, proper stewardship of resources and information to investors.

TILLER harmoniously interlaces with the Quantum Approach toward Business throughout the four phases by first modeling all elements related to a proposed solution and its intended market to characterize risks and identify candidate mitigations. These elements are individually accounted for in the QEP and TCF governance is applied to oversee the refinement of the plan and the quality of its execution. To facilitate a low-impact governance structure, TILLER instruments the execution steps of the QEP immediately in Phase 0 to produce data as a matter of course as actions are worked and completed.

The QEP is a roadmap to achieve the TO vision and captures the entire approach for building and launching a TO in the TCF model. In addition to serving as the primary execution and project management tool, the QEP is also the basis for TCF reviews and for cross-TO resource planning. The present invention provides a template for the QEP which auto-populates the TILLER. The strategy set forth in the initial composition of the QEP remains largely unchanged throughout the TCF phases but will undergo a series of adjustments as assumptions and factors of influence increase in fidelity. The QEP forecasts as much as possible, noting that actions slated for the upcoming Phase will be the most accurate. The purpose of forecasting beyond the upcoming Phase is to ensure that a comprehensive strategy is put together and that resources are used to create work products with a view of longevity. When the QEP is developed, there are standard milestones that prompt engagements with the TMT. These engagements are to bolster and speed the progress, not impede it with burdensome reporting. In some cases, the engagements take the form of tasks to be completed by the TMT member(s), and in some cases they will be in the form of a review. The more risk that is identified during the QEP development, the more reviews and engagements with the TMT are budgeted into the plan. From this perspective of governance, the TMT is embedded into planned actions to help guide the decision space with deference toward experience.

Figure 8A:
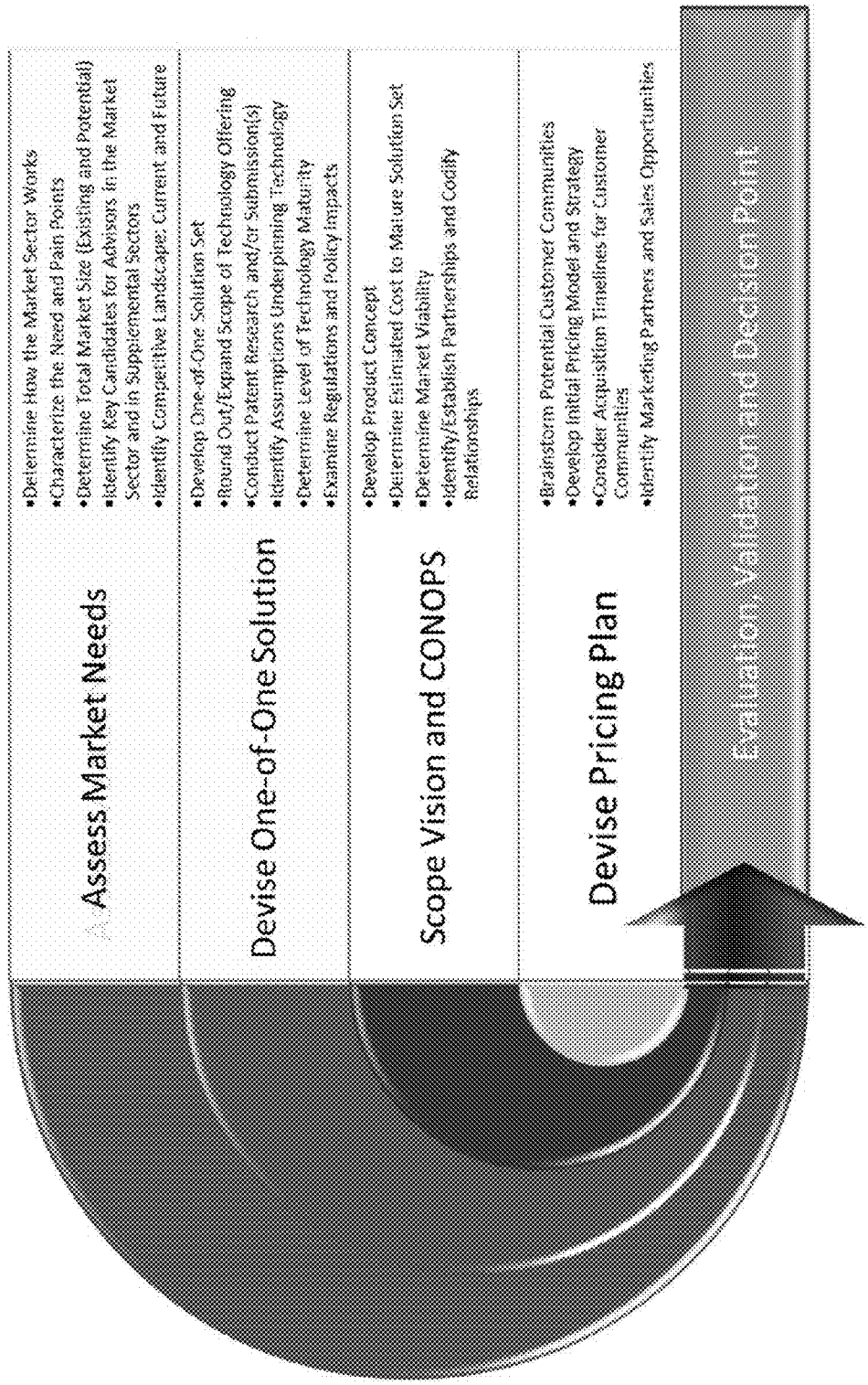
FIG. 8A illustrates a graphical representation of Phase 0 according to one embodiment of the present invention.
Figure 8B:
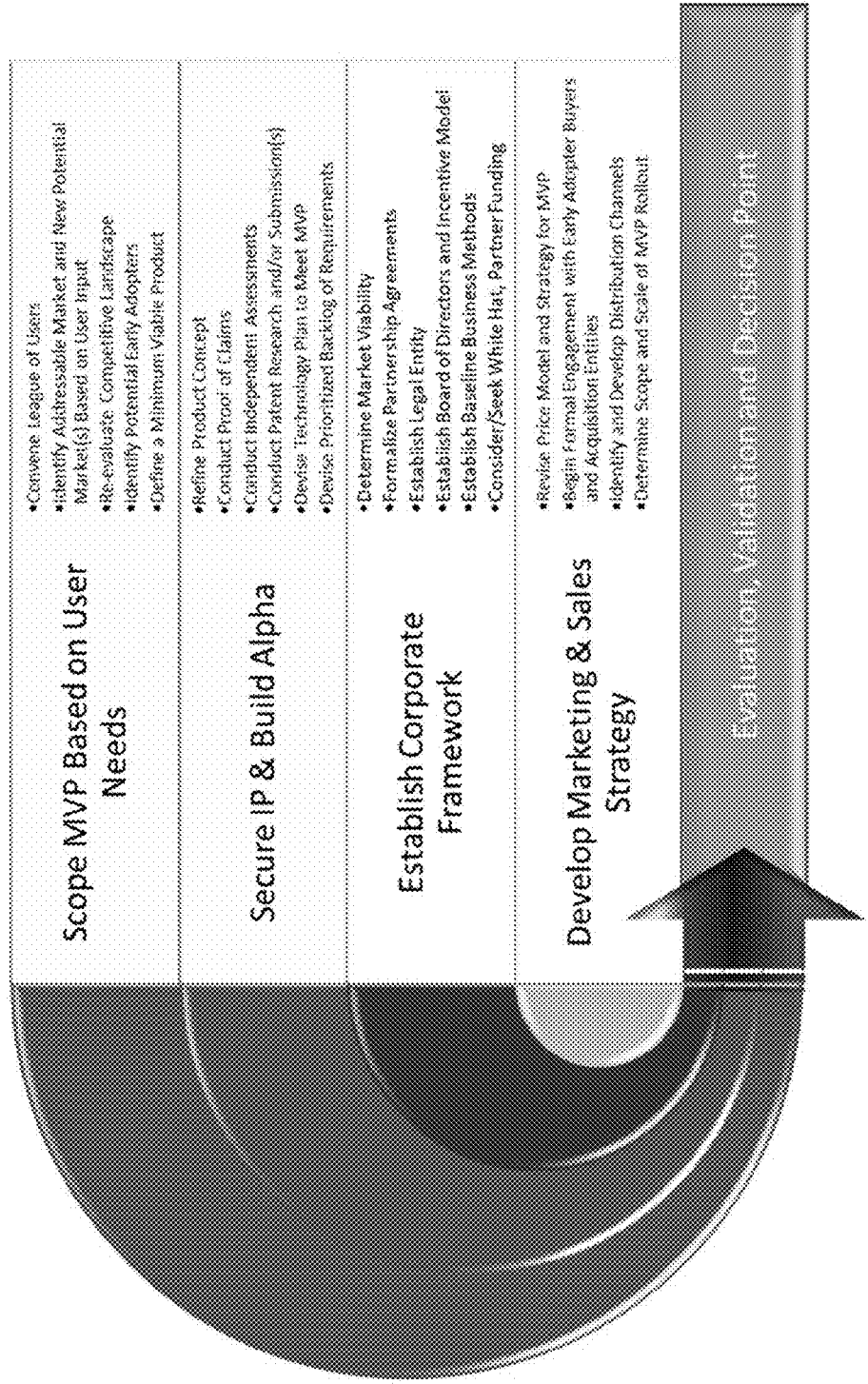
FIG. 8B illustrates a graphical representation of Phase 1 according to one embodiment of the present invention.
Figure 8C:
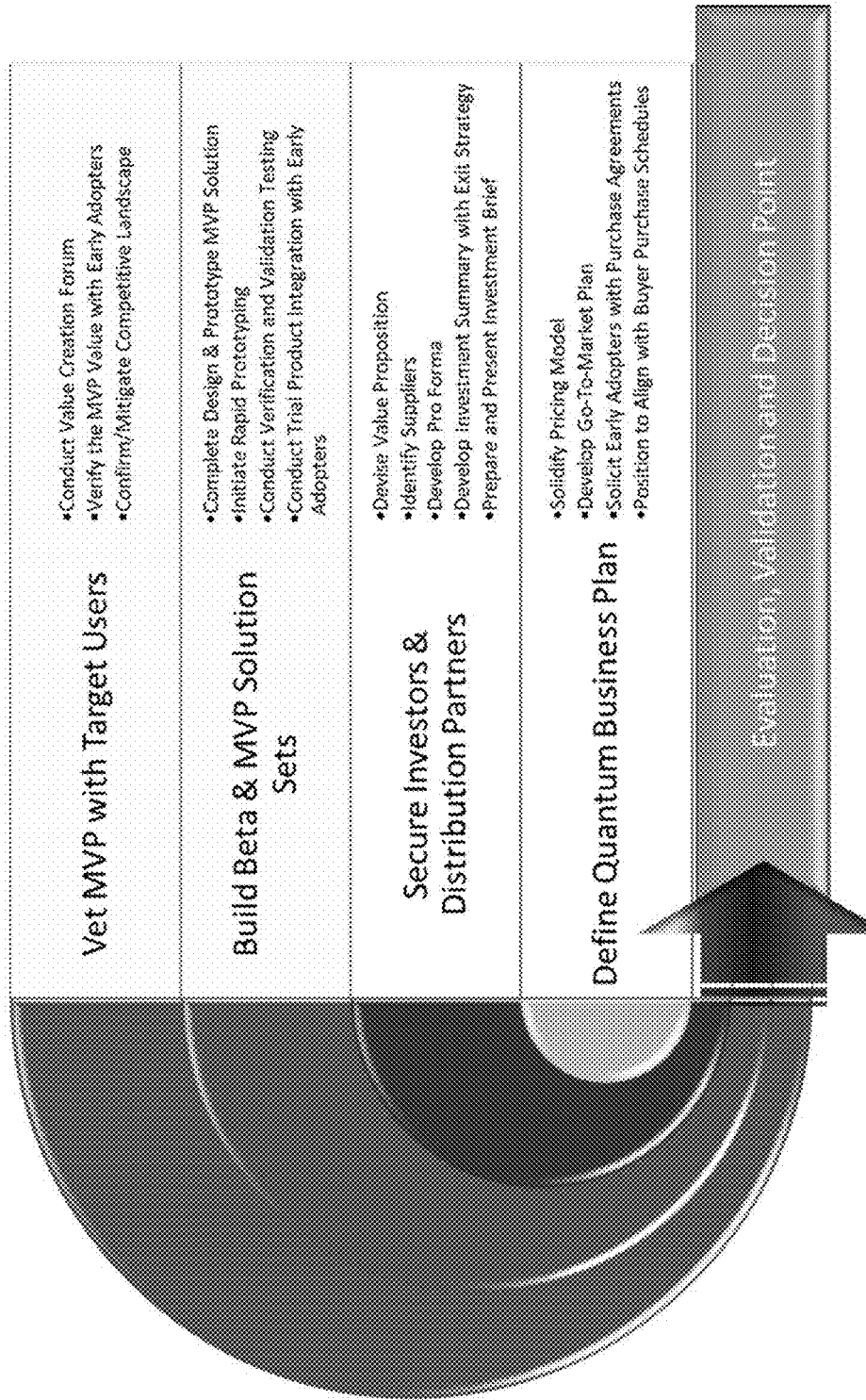
FIG. 8C illustrates a graphical representation of Phase 2 according to one embodiment of the present invention.
Figure 8D:
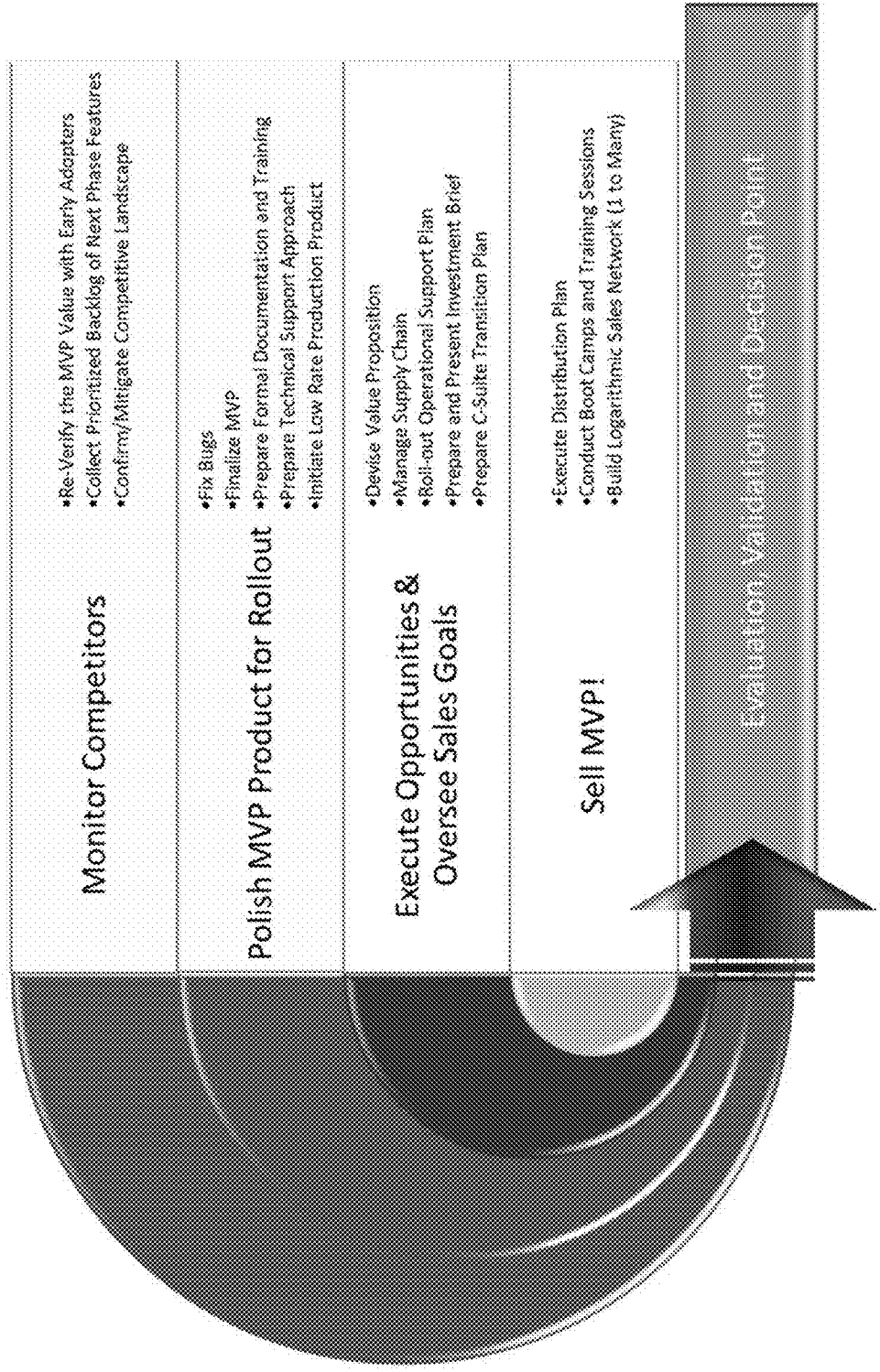
FIG. 8D illustrates a graphical representation of Phase 3 according to one embodiment of the present invention.

Additionally, each TCF track-focused sub-goal in a phase has built-in helper functions to further refine focus of the team. These are very specific tasks that must be completed in order to fully address the sub-goal. These tasks are regimented such that by following the template, there is very little risk to getting too far ahead. Actions for all phases are well-defined such that it is clear to a TCF practitioner which actions are to be performed at which stage. FIG. 8A shows the drill down from phase sub-tasks into helper functions for Phase 0.

During each phase, the TMT offers both guidance and oversight to keep the phase on track from a timing perspective as well as from a quality perspective. The TMT, as shown in FIG. 33, engages at key points during the phase to offer formal reviews of progress, and produces a TILLER-supported decision package to the CEO at the end of each phase. The TMT regulates the phases using key metrics that influence TO success: the baseline timelines, resource prioritization/utilization, validation of assumptions, milestone progression, budget adherence/burn-rates and effectivity ratings. TILLER applied logic assists the TMT in management and mentorship with auto-generated notifications of missed milestones, increased timelines, stagnant progress, unexpected burn rates, unresolved critical issues, competition barriers in the market and other emergent factors that serve as indicators of increased risk. TILLER also auto-generates candidates for TO improvements with technology assessments, new market opportunities, potential partnerships, price model variations, grant availability and other opportunity alerts.

The TCF scorecard is a key input for all TO governance evaluations. Every single field in the scorecard relates directly to an area of investor interest, is aligned to the Quantum Execution Plan, and is instrumented for TMT insight. The TILLER provides standards for evaluating each and every field to yield consistently developed confidence factors. These values are available to the TMT in both raw format as well as in normalized format with logic applied. The values are displayed onto a TO dashboard as well as the CEO dashboard to provide current phase progression status. TILLER logic is applied at different levels of management to provide instant insights and indicators of issues or opportunities.

TCF has scheduled and planned points of engagement for the TMT with the TO, but the TILLER provides critical insights to the TMT between those standard points of engagement. In one embodiment, the TILLER is configured to alert the TMT based on monitored thresholds that serve as indicators of increased risk or opportunity that may encourage the TMT to schedule an ad-hoc focused review. Sample autogenerated alerts that could trigger TMT engagement with a TO include, but are not limited to: New competitor identified, Potential patent infringement, Issue resolutions lagging, Critical issue that may require immediate resource allocation, No change in reported status for more than 2 weeks, Data sets out of date by >2 weeks, Burn rate exceeding threshold by 20%, Revenue projections>20% off target, TCF Track-based level of effort>20% off target, QBP progress>20% off projection. In all cases, TCF and the TILLER facilitate on-demand up-to-date auto-reporting that allows ad hoc meetings to be called on the spot without any additional time lost to preparing meeting materials. All relevant data elements are captured from native work systems and viewable in a cloud-based, web-hosted GUI that can be used to drive the meeting and input any new content derived from the meeting real-time.

The TMT governs and regulates each phase based on the QEP, fueled by the TILLER with visualization tools and ML/AI that generate insights and refined data that help the TMT identify if a pivot point or other remediation is necessary when critical issues arise. TCF and the TILLER allow multi-aspect insights into a TO without day-to-day micro-management of activities. TMT uses standards and TCF trend data to establish goals and objectives for each phase that are reasonable, achievable with the resources provide, and that all assumptions are well-known and vetted. Any action within the QEP that requires time as a resource is reviewed carefully up front to avoid predictable delays, reduction in expected quality or cost overruns, and the TILLER monitors these items based on thresholds and alerts if trends imply a change. As phases progress, the TILLER monitors the process to ensure that the right actions are occurring when they should and the right resources are being expended. Furthermore, the TILLER enables the TMT to monitor multiple TOs simultaneously and consistently.

Standardized Processes

Additionally, TCF is well-defined and repeatable by business practitioners or users of the systems and methods of the present invention. TCF includes steps for a repeatable engineering process of identifying, evaluating, scoring, and improving the operations of any entity for automatically addressing and considering all aspects and components of TCF. The present invention automates a very complex process flow, which needs to be followed, documented and monitored for every implementation, regardless of technology sector considered. In preferred embodiments of the present invention, outputs or deliverables for any project are provided in at least one GUI or an electronic format or printed in a hard copy paper form. Preferably, the GUI is a web-based GUI accessible via a plurality of remote devices including laptop computers, mobile phones, tablets, etc. Significantly, with electronic GUI representation, the process flow is outlined both as a path forward and automatically updates for steps completed and for milestones, thereby providing a living documented output for the project. Use of TCF standards, templates, tools and methods are mandatory by every TO.

In yet another embodiment, as shown in FIG. 19, the present invention includes a template repository that contains all documentation, data and tools necessary for TCF. TCF hosts a cloud-based, (Configuration Managed) CM repository of every tool, method, system, scoring logic component, and template needed to execute the helper functions within each track and within each phase. Each standard, method and tool are designed for automatic data collection of pre-normalized data and is pre-instrumented such that by nature of using it in the state offered on the Process and Asset Library, the TCF practitioner will generate TCF metrics without additional intervention as they do their standard work. TCF offers standardized tools and methods to accomplish every type of task in a TO. The present invention is designed to limit access to the tools and documentation to only intended users. In one embodiment, a catalogue of all methods, tools, templates and procedures is available in an authoritative, web-based CM repository named the Process and Asset Library (PAL). Each procedure, tool and method are purposefully developed to automatically collect metrics relevant to a TO's management and to automatically generate standardized, regular reporting and alerting without additional intervention. Companion guides provided for any tool or form, providing standardized guidance at top level and at question level to reduce assumptions and bias in entries. All tools are created to generate quantifiable, scoreable data to be leveraged by TCF management methods, reporting, AI and ML.

Documents relating to the judicial entity (LLC, C-Corp, S-Corp, LP, GP, etc.) such as the Articles of Incorporation, By Laws, and/or Subscription Agreements are also preferably accessible via the GUI of the present invention. These documents are uploaded as word processing documents, PDFs, or any other type of document file, and/or are available via hyperlinks to websites of all appropriate government or corporate entity. Business plans, business models, human resources policy manuals, including manuals specifically tailored for certain business locations, are also accessible and/or editable through the GUI of the present invention.

The GUI of the present invention also provides standardized software for live video teleconferencing, with functionality to record video, audio, and/or transcripts from these conferences and automatically save these recordings to the server computer or cloud-based system which hosts the GUI for later access. Video teleconferencing is performed through an application such as LIFESIZE in one embodiment of the present invention.

Figure 20:
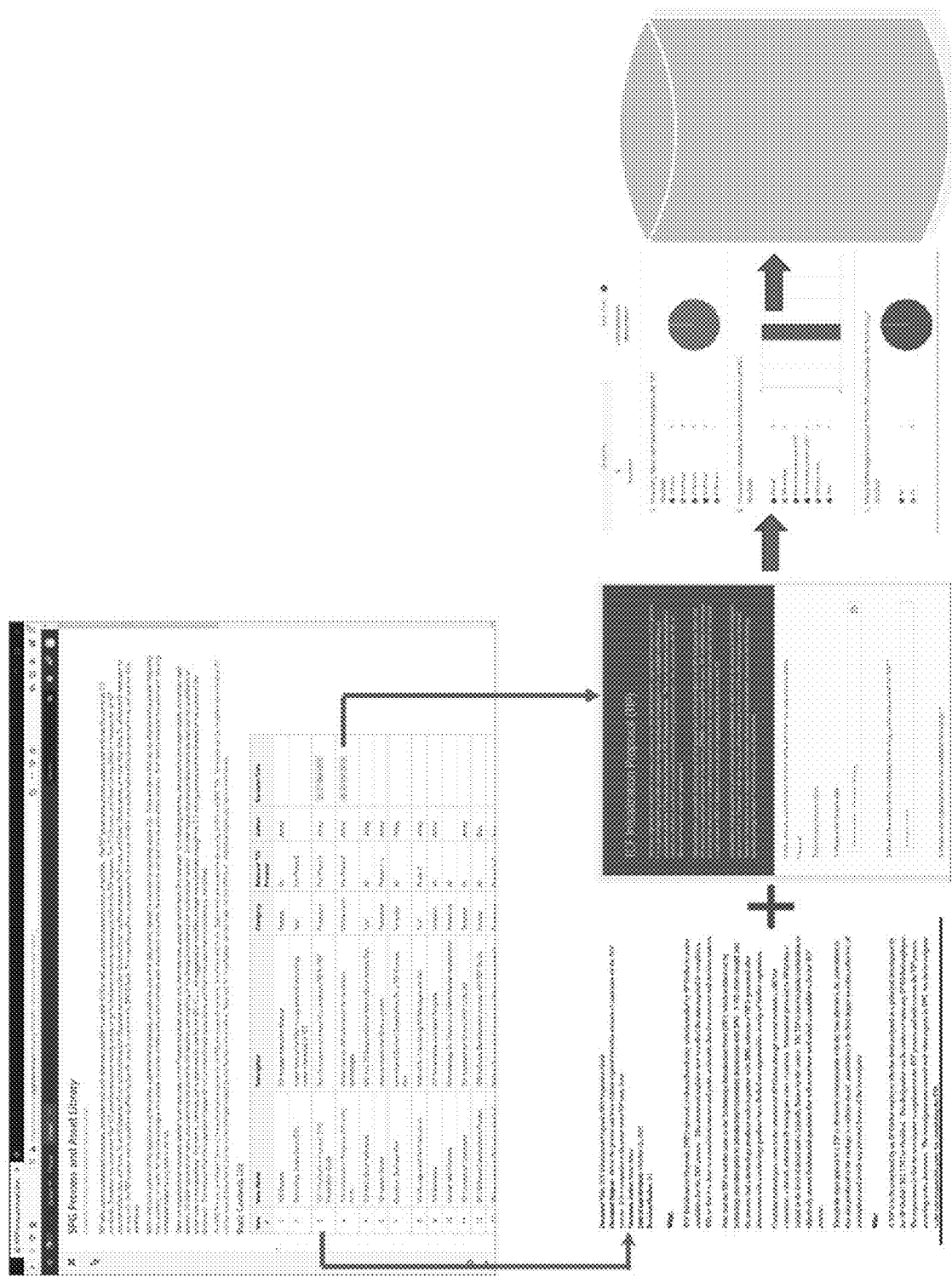
FIG. 20 illustrates a flow diagram according to one embodiment of the present invention.
Figure 21:
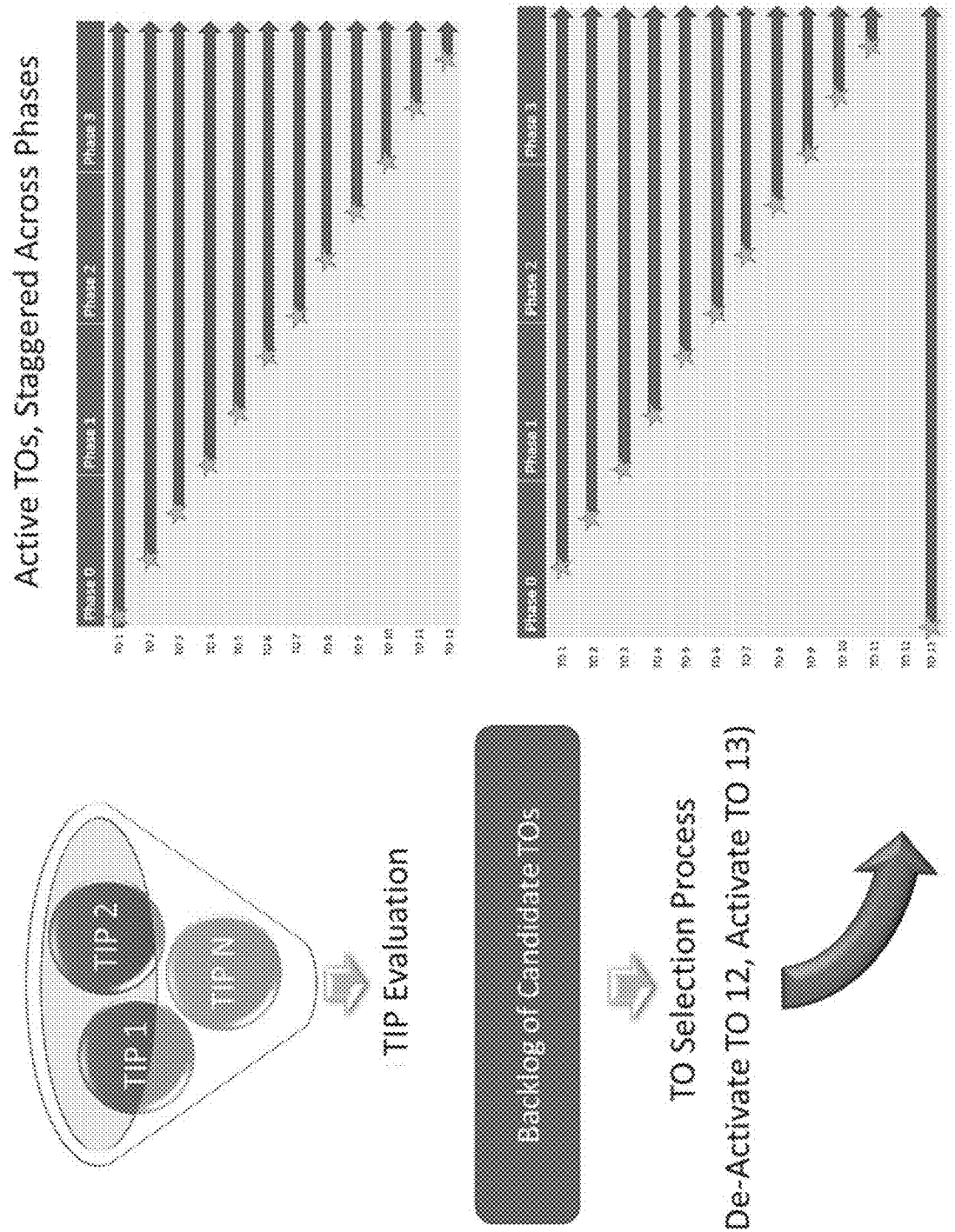
FIG. 21 illustrates a graphical representation according to one embodiment of the present invention.

FIGS. 20-21 are illustrative embodiments of a TCF standardized end-to-end sub-process and tool stored in the PAL. A TCF method referred to as the TCF Initialization Proposal (TIP) articulates a set of focused guidelines for researching a potential technology with potential to become a TO. The TIP sub-process, guidelines, tool and automatic scoring logic are all maintained in the PAL. The TIP is emblematic of each TCF template, process and tool, which are all composed explicitly to both complete an essential, discrete task as well as to generate re-usable data that has value in evaluation of the overall success likelihood of the TO. In this example, a TIP is available from an internet accessible location, accessed with standardized enterprise credentials, produces auto-normalized 75% quantified responses, and is stored in a datastore. A TIP, like all TCF products, is unlike any other example of prior art which almost exclusively uses native work systems and templates that are non-integrated and land in flat files which lack standardization at the data element level, and lack reach inward for multi-point consumption.

FIG. 20 illustrates an example of how a tool registered in the PAL offers guidance for its use that explains standards for any element manually entered. This guidance, along with the manner in which the tool is constructed, reduces bias and variation of assumptions in entry and pre-normalizes data that is auto-harvested and registered into the TCF database. FIG. 21 illustrates how TCF Initiation Proposal (TIP) feeds a multi-TO management pipeline. FIG. 21 illustrates how TCF multi-TO management staggers TOs such that efficient usage of the TMT resources is best achieved. ML/AI routines monitor several elements within the TCF system to make automatic nominations to the TMT for best-fit technologies to backfill an opening when a previous TO has a liquidity event after full launch to market. In this example, TCF backend ML would review details of the candidate technologies stored in the Innovation Library, such as applicable market, technology readiness, patent status, anticipated cost to mature and so forth, as well as metrics collected for the nearly-complete TO, such as available TMT members with proven experience in the applicable market or technology type, and couples it with data gleaned regarding funds available in the TCF Fund and makes automatic nominations for best-fit TO candidates. A TCF method referred to as the TIP articulates a set of focused guidelines for researching a potential technology with potential to become a TO. The TIP sub-process, guidelines, tool and automatic scoring logic are all maintained in the PAL. A TO submits a TIP entry form and the collected data is inserted in the TIP Raw Data column. The Candidate Technology field is auto generated. In one embodiment, the Candidate Technology field is auto generated by using a web crawler and databases accessible via network communication. In another embodiment the Candidate Technology field is populated by the TCF entry form that provides a TO's information and background. In one embodiment, the TCF entry form includes (1) name of TO, (2) need that TO will solve, (3) number of leveraged sources, (4) confidence factor of leveraged sources, (5) societal enhancement of TO, (6) what market sector(s) are targeted, (7) corresponding market data, (8) time importance of TO's need, (9) the TO's competition, (10) identification of end users, (11) what technology is need for TO and who owns the technology, (12) Technology Readiness Level (TRL), (13) Federal or Regulatory Approval needed, and (14) potential source of funding. The TCF platform includes an idea generator that is directed to the criteria or interest or the subject matter of a TO's technology. The system applies initial scoring logic and then aggregates the scoring to provide an initial score. The scoring aggregation is repeated for the TIP raw data and the TIP scoring data. During TCF, information is collected form the Market 360 datastore when aggregating a TO's score. TCF uses the initial scoring to determine whether to move forward during a phase. The scoring is standardized to allow consistent comparison across technologies. Furthermore, the data is time-stamped so if scoring system is updated then the scores of multiple TOs are updated. The present invention includes machine learning algorithm to adapt the scoring analysis of TOs to continuously improve the confidence factor of success for the TOs.

3. (e) Instrumented Work Systems that Automatically Produce and Harvest Inherently Normalized, Quantifiable Data that Feed the TILLER for Instrumenting Work Systems to (f) Automatically Produce and (g) Harvest Inherently Normalized Data that Feeds the TILLER In the present invention, TCF presents unique methods of formulating and governing work systems to automatically feed reliable data to the TILLER decision aid system. Such data that can yield justified insights must be timely, easily acquired, stored and retrievable, consistent, comprehensive, aggregable and transformable, actionable, and minimally invasive. In one embodiment of the present invention, all TCF work systems are configured for deliberate collection of data needed for both near-term and long-term insights, for enabling one-to-many opportunities (one data element leveraged for multiple insights), for collection of implicit data and augmentation with explicit data, and for design of services and systems with data access and harvesting in mind.

Each TO has a unique datastore that captures its own data generated by employing the TCF instrumented systems. The data is collected in a consistent manner for every TO, so that cross-TO data is normalized at time of collect. All data is time-stamped and lagging refresh rates auto-generate alerts. Key systems at the TO level include but are not limited to MS Outlook (Calendar), MS Excel (QEP, S&OP, Proforma), Confluence (Product Development Requirements and Management), Amazon Web Services-hosted custom web applications (TCF Registers, TCF Scorecard), Amazon QuickSight (Dashboards), Jira (Agile Sprint Management), Salesforce (Sales planning and capture).

The present invention includes a data repository wherein the TILLER data and analysis, Market 360 data, innovation discovery data and all other TCF data are stored. The present invention is configured for automated algorithms and notifications. The automated algorithms include machine learning and neural networks. The machine learning algorithms continuously evolves the type of data collected and the analysis to improve the consistency and reliability of TCF results. Furthermore, the system uses stored repository data to provide estimates for a TO. The data repository is accessible via the cloud-based network for the remote devices. The present system is configured to use the automated algorithms in combination with the date stored in the data repository to provide predictive analytics on the probability or risk and success for a TO.

Figure 26:
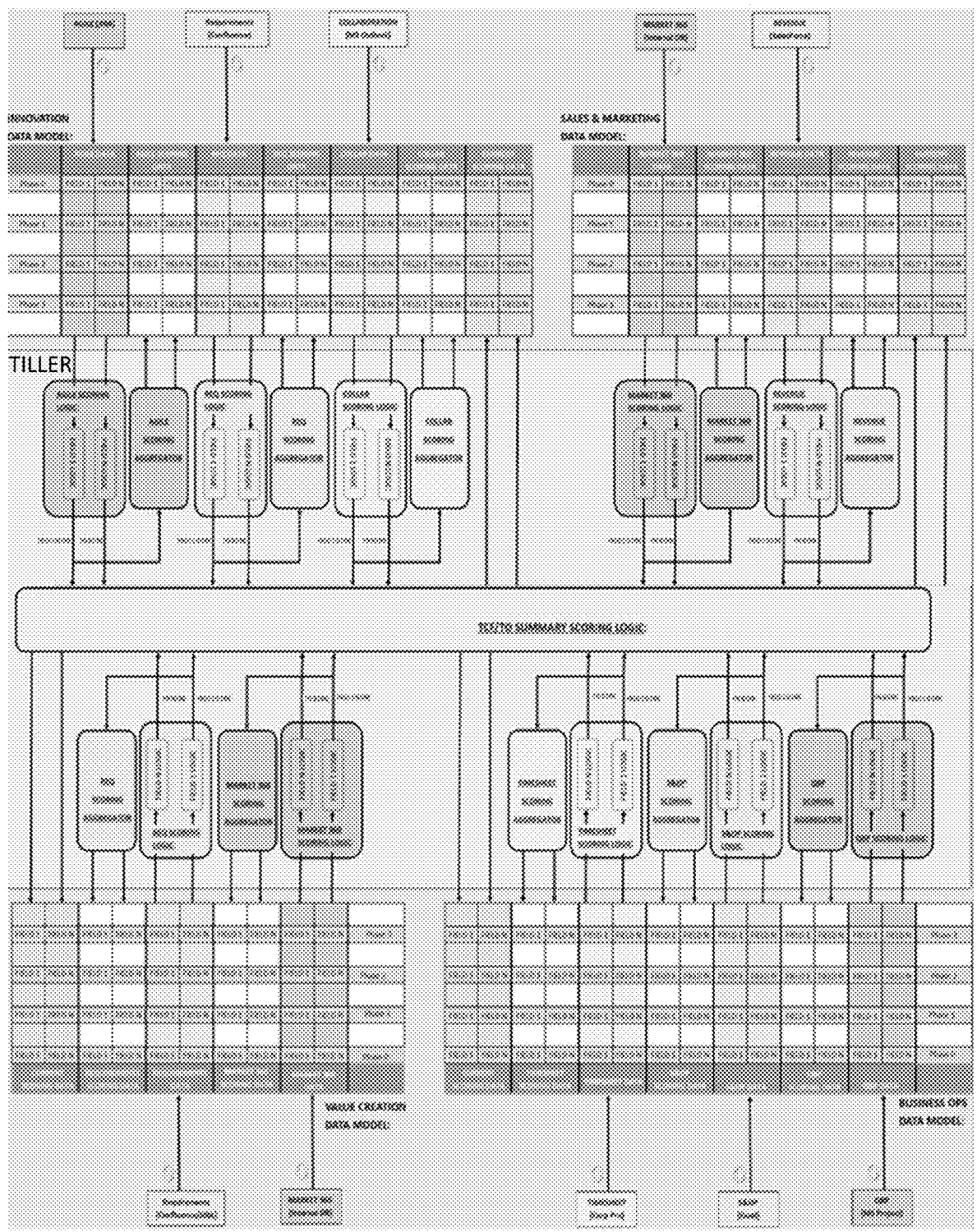
FIG. 26 illustrates the QuantumX datastore according to one embodiment of the present invention.

In the present invention, the data repository or data warehouse contains searchable, tagged, uniformed data. The data repository is configured so that the TO and TMT have immediate access to the data. The data repository is leveraged by data presentation layers, ex. dashboards, that enable a user to search and access the data in the data repository. The system is configured to limit the ability to edit data fields to protect the data. The data fields are updated automatically as the data repository is configured to periodically search data authoritative sources via network-based communication. The data repository provides the timestamp data so a user can identify when then the data was last updated. This repository is referred to as the Quantum Execution (Quantum X) datastore, as illustrated in FIG. 26. The QuantumX datastore captures TO data from instrumented TCF work systems. This data is acted upon by nearly all of the TILLER logic elements: scoring, alerting, nominating, Monte Carlo simulations, web mining, and trends. The TILLER nominating engine can add to the web mining queue if conditions are appropriate.

Figure 27:
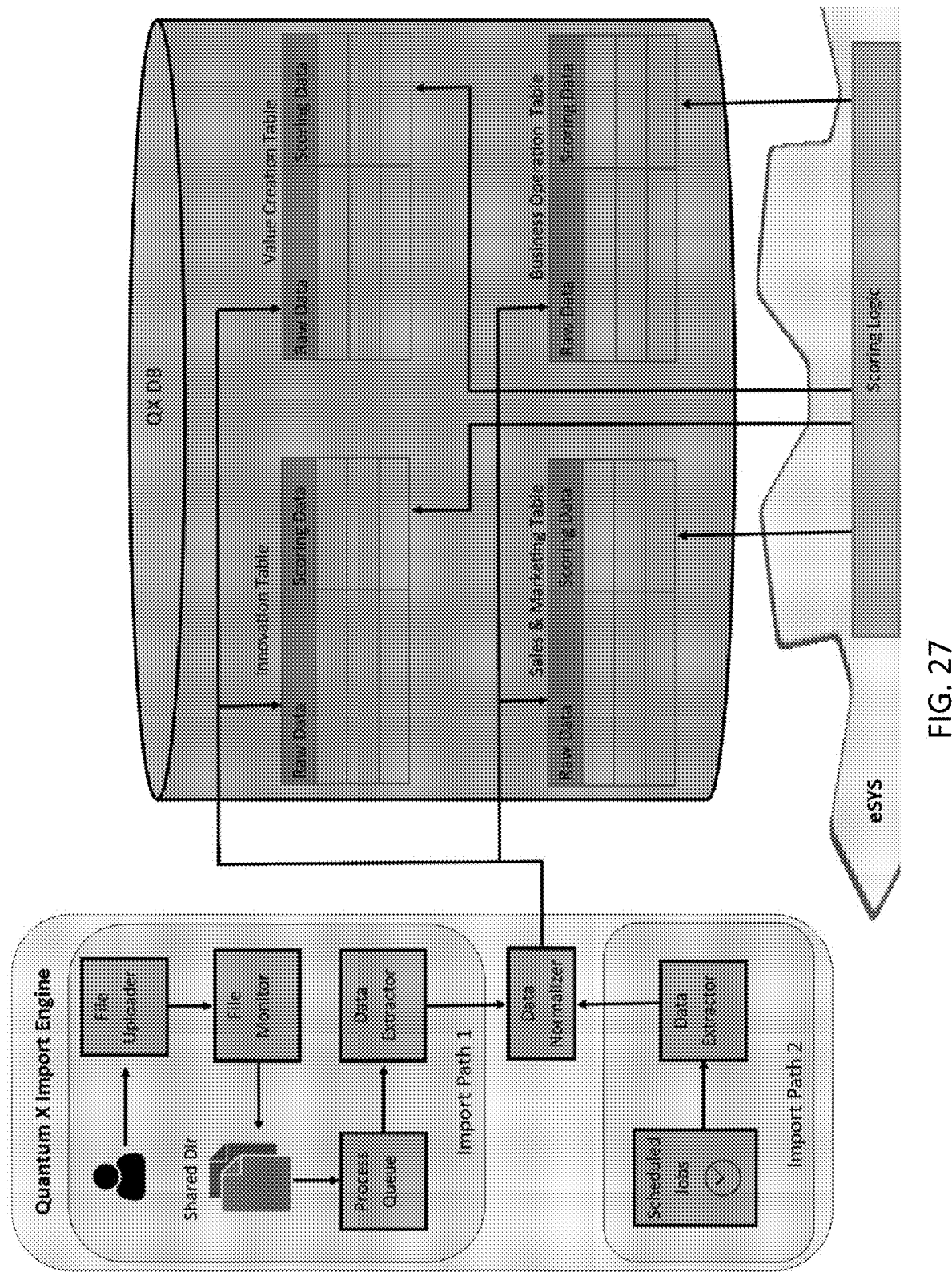
FIG. 27 illustrates a data flow according to one embodiment of the present invention.

The data repository has the capability to ingest disparate sources of data, to include Market 360 results, candidate intellectual property harvested, key points of contact across market sectors, business relationships, grant opportunities, TO phase-based confidence factors and so forth. This data warehouse, populated with data relevant to all four TCF tracks of effort, is available for manual query, pre-formed reports and dashboards as well as applied logic and algorithms. The Quantum X Data Ingester is illustrated in FIG. 27. The Data Ingester pulls data from TO native work systems into the Quantum X datastore. Data is either ingested by a manual validation and upload activity for templated native work systems that lack APIs, or is ingested on a schedule meaningful to the native work system's degree of accuracy. Data is stored natively within the Quantum X datastore and automatically has scoring logic applied. This is a second logical rendering of the Quantum X datastore illustrated in FIG. 26, slightly simplified to show that each element entered into the Quantum X datastore has scoring logic applied to produce confidence factors at a discrete element level as well as at a more macroscopic roll-up level. Additionally, as shown in FIG. 27, the present invention includes an import engine that includes standard methods for data collection and processing.

To provide the most accurate, up-to-date data, TCF leverages authoritative data entries from their source location whenever possible. If data is harvested at a snapshot in time, the date of last refresh is annotated with the data. For example, the timecard implementation of the present invention is instrumented for QEP level of effort tracking. The timecard data needs to be harvested and included in the TCF data warehouse in order for the TILLER to act on it automatically. Logic is applied to all timecard data, even interim data not formally submitted or approved. Confidence factors take into account the authoritative component of the data, prioritizing approved data (high confidence) but including interim daily updates (lower confidence) to avoid two week delays in updates while providing insights into the confidence of interim data. These data elements will be tagged with their last date of refresh and that is a field that will be employed by any TILLER logic applied to the data.

The TCF Platform further includes Dynamic Forms. In essence, Dynamic Forms is an enabling capability that stretches beyond functionality traditionally provided with standard form generators. Most form generators allow very minimal option combinations, almost no backend database structure to support easy changes to forms over time, limited access to data, and limited flexibility in the presentation of forms. Advantageously, Dynamic Forms allows limitless combinations of form and question types to be presented via the GUI. Dynamic Forms provides for fast form spin-up and simple cross-platform updates. This enables a time reduction and an increase in confidence in data outputs and scores. All updates to Dynamic Forms are applied directly and automatically to all forms, thereby, reducing coding and testing times.

Dynamic Forms includes a standard set of form options to TOs that are quick to implement, easy to modify, and traceable between versions. Advantageously, Dynamic Forms includes (1) Dynamic content and dynamic question groups, (2) Nested question groups, (3) Dynamic answer option population, (4) Dynamic version control, (5) Backend data mapping across forms, (6) Form/Form element scoring support, and (7) Integration with TILLER logic engine.

Dynamic Forms include forms that can be designed with any combination of questions, sections, answer types, or answers. Each field of the Dynamic Forms can offer a hint for the expected type of information. Additionally, each field type has automatic validation based on criteria, and each field has the option for conditional presentation, with complex logic options beyond binary. Dynamic Forms further includes groups of questions that can be generated with supplemental nested questions of any type. Advantageously, the nested question groups provide an advantage over prior art because prior art fails to include nested question groups in a dynamic form generation platform.

The Dynamic answer option population component of Dynamic Forms includes dynamically generating content that populates answer options. Dynamic Forms allow for answer options to change seamlessly over time. Another advantageous aspect of Dynamic Forms is Dynamic version control that enables every modification to a Dynamic Form to be tracked. Additionally, Dynamic Forms supports backwards compatibility. Dynamic Form data is linked to the version of the Dynamic Form that the Dynamic Form Data was submitted. Advantageously, the Dynamic Form data is dynamically linked to the appropriate field in a newer form version.

Dynamic Forms is further configured to be automatically populated based on data mapped elements in a database and/or datastore. The automatic population of the Dynamic Forms allows for conditional priority logic (e.g. auto-populate only when empty or only on form initialization), thereby reducing redundant data entries and reducing the chance for a transcription error. Dynamic Forms is designed to create a score and is configured to support all of the TILLER features, datastores, and logic.

Business Operations; Quantum Execution Plan (Microsoft Excel); Proforma (Microsoft Excel); Accounting (CorpPro); Timekeeping (CorpPro)

Every TO has a Microsoft Excel-based Quantum Execution Plan auto-aligned with TCF Phases and milestone activities. Data can be extracted from this normalized plan for baseline to actual reporting plus added algorithmic data combinations for alerting and reporting through the TILLER system. Quantum Execution Plan is the umbrella project tracking tool that oversees all TO tracks of effort and the interplay between each.

Market 360: Market Research Auto-Polling Engines (AWS, www); Patent Forecasting (Magic Number); Value Creation Modeling and Mapping (AWS, Confluence)

The Market 360 datastore captures market research data, competitive analyses, patent landscape data, and other data necessary to evaluate a TO's potential market. External sources are polled based on configurable tags: congressional direction for spending, university research trends, US dept of labor data, patent database, trade magazines, market sector conferences, major technology releases/launches from major brands, and headline news. Internally generated data is collected for total market size, competitive landscapes, major players, and potential distribution partners. Market 360 can be kicked off automatically for some things, and can be "tasked" by a web-based request form to produce additional macro or micro data in support of a TO. Once established, Market 360 will automatically refresh as much as possible or will generate alerts that TO or TMT intervention is needed to refresh. Market 360 data is leveraged by TILLER ML/AI routines to increase fidelity in one-of-one innovation solutions, alert all relevant TOs of changes in market assumptions and/or changes in competitive landscape.

Innovation: Innovation Library (AWS); Product Development Requirements (Confluence); Product Development Issues/Project Tracking (Jira)

Innovation library: The Innovation Library hosts innovative technology ideas gathered from multiple web-based sources (both automated and manual); refined by unbiased TCF standard processes (TIF, TIP, IVA), data and applied logic; and serve as the basis for the TCF TO candidate pipeline and IP rounding. Entries are designed to be at least 70% quantitative for scoring and insight generation. Records are stored in a datastore, improved upon and available for AI and ML algorithms. In one embodiment, a CM-maintained, instrumented method is the TCF Initialization Proposal (TIP) entry, which is a part of a multi-step process for collecting, analyzing, refining and validating candidate technologies for the TCF process. A TCF practitioner consults the PAL to find the most recent TCF documentation describing the standards for completing the TIP. The TIP Preparation Guide provides guidance for conducting efficient research to thoroughly answer the TIP questions. It also provides guidance on a question-by-question basis to clarify the intent of the question and the expected quality of the answer. Upon completion of the allocated TIP research window, the TCF practitioner refers to the TCF Portal web-based TIP entry form. The data collected from the TIP entry updates the Innovation Library, has TILLER logic applied to it and generates the input for the next step in the process: the innovation validation assessment (as shown on the next chart).

Figure 25A:
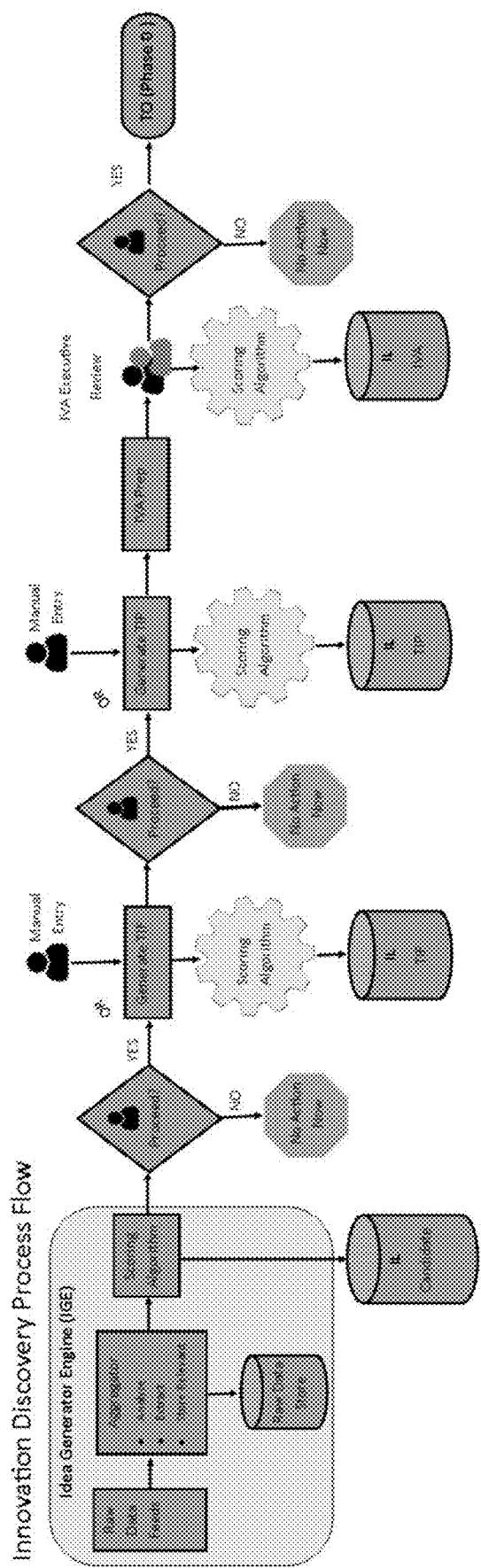
FIG. 25A illustrates a flow diagram of the innovation library according to one embodiment of the present invention.
Figure 25B:
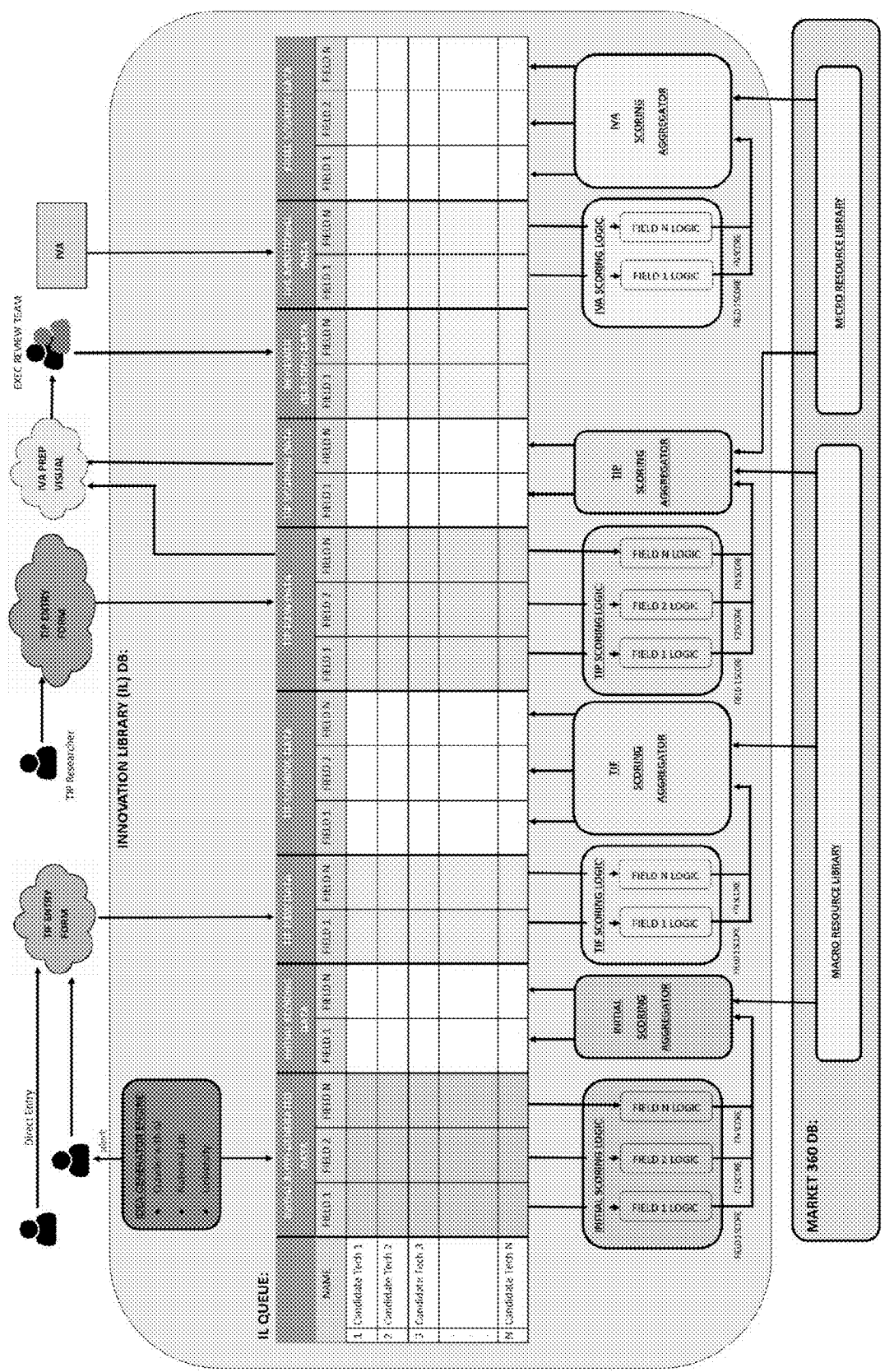
FIG. 25B illustrates a flow diagram of the innovation library according to one embodiment of the present invention.

FIG. 25B is illustrative embodiment of the standardized TIP process. FIG. 25B highlights a standardized tool purposely built with a series of pre-normalized questions that populate and build upon an entry for a candidate technology in the Innovation Library datastore. Upon submission of a TIP entry form, the collected data is inserted in the TIP Raw Data column corresponding to a previously established Candidate Technology row. In one embodiment, the Candidate Technology field is initially auto generated by using a web crawler and databases accessible via network communication, with some initial data fields populated that include but are not limited to technology name, technology source, patent status, and owner. In another embodiment the Candidate Technology field is populated by the Technology Introduction Form (TIF) that provides information and background as provided by a technology owner seeking help with commercialization. In one embodiment, the TIP entry pre-populates any relevant data in the Candidate Technology row of the database and presents all data and the TIP questions to the end user. The TIP is devised with TCF instrumentation, so every single question is designed for pre-normalization and multi-tier usage. The form presents questions such as, but not limited to, (1) name of technology, (2) need that technology will solve, (3) number of leveraged sources, (4) confidence factor of leveraged sources, (5) societal enhancement potential of technology, (6) what market sector(s) are targeted, (7) corresponding market data, (8) time importance of need, (9) the competition, (10) identification of end users, (11) what technology is need for TO and who owns the technology, (12) Technology Readiness Level (TRL), (13) Federal or Regulatory Approval needed, and (14) potential source of funding. The TCF platform includes an idea generator that is directed to the criteria or interest or the subject matter of a candidate's technology. The TIP sub-system writes all pre-normalized data into the Innovation Library where the system applies initial scoring logic and then aggregates the scoring to provide an initial score. The scoring aggregation is repeated for the TIP raw data and the TIP scoring data. During TCF, information is collected form the Market 360 datastore when aggregating a Candidate Technology's score. TCF uses the initial scoring to determine whether to move forward during a phase. The scoring is standardized to allow consistent comparison across technologies. Furthermore, the data is time-stamped so if the scoring system is updated then the scores of multiple TOs are updated. The present invention includes machine learning algorithms to adapt the scoring analysis of TOs to continuously improve the confidence factor of success for the TOs. The TIP process, designed as a part of TCF, employs standard, templated and instrumented methods to generate pre-normalized data that feeds the TILLER and multi-tier insights.

Figure 24:
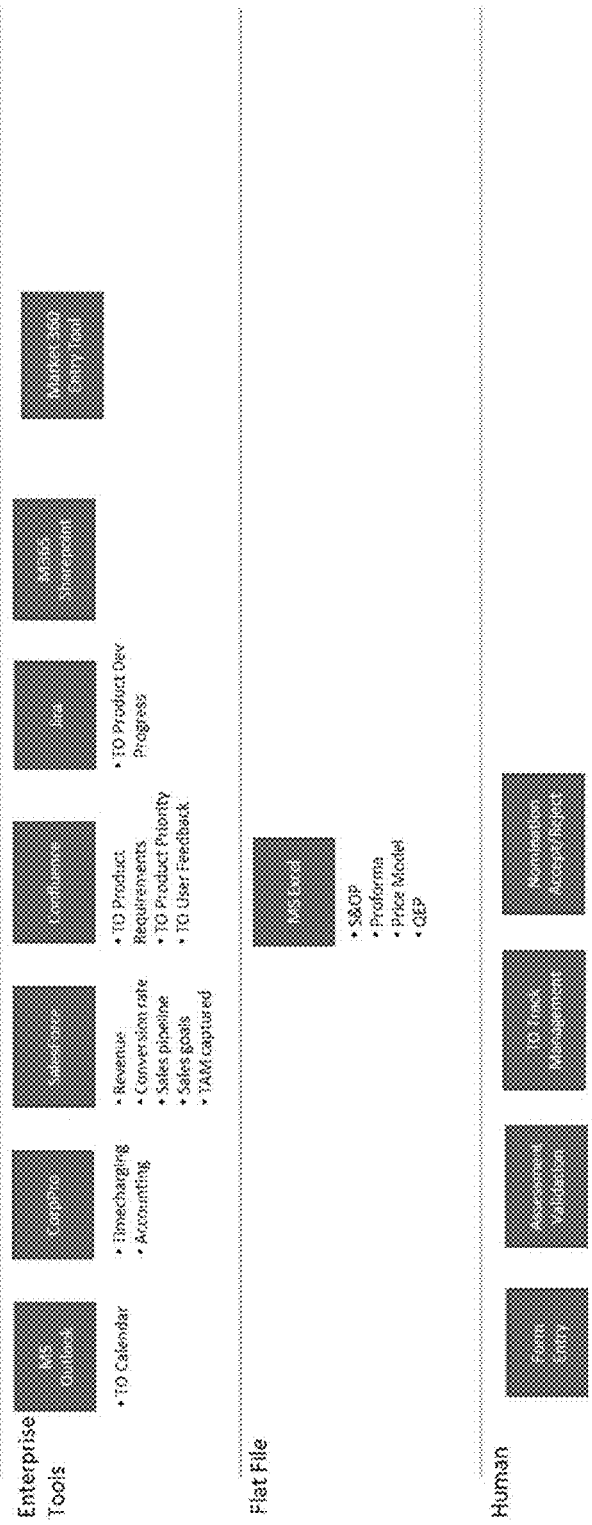
FIG. 24 illustrates a graphical representation according to one embodiment of the present invention.
Figure 25C:
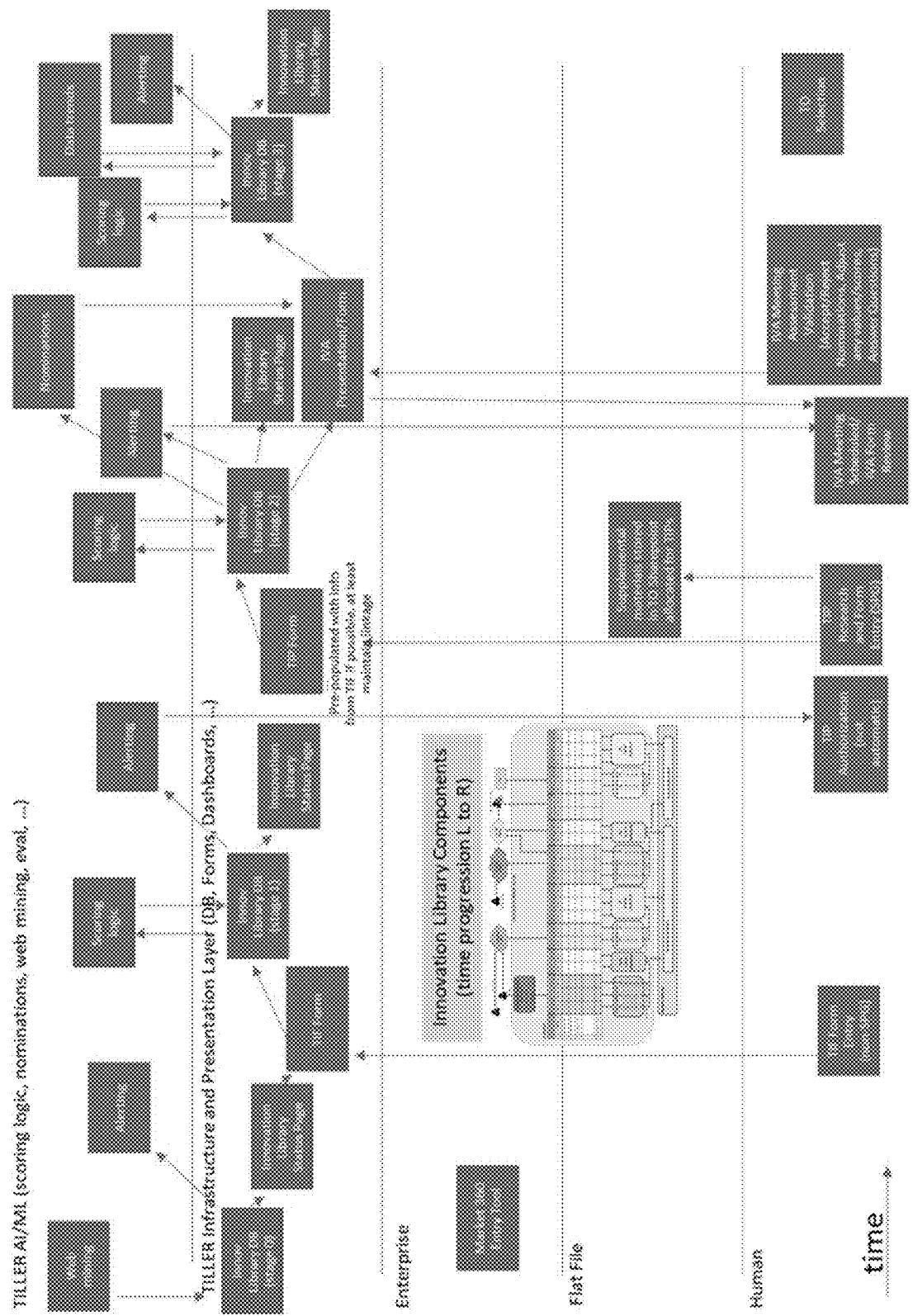
FIG. 25C illustrates a graphical representation of TILLER components according to one embodiment of the present invention.
Figure 37:
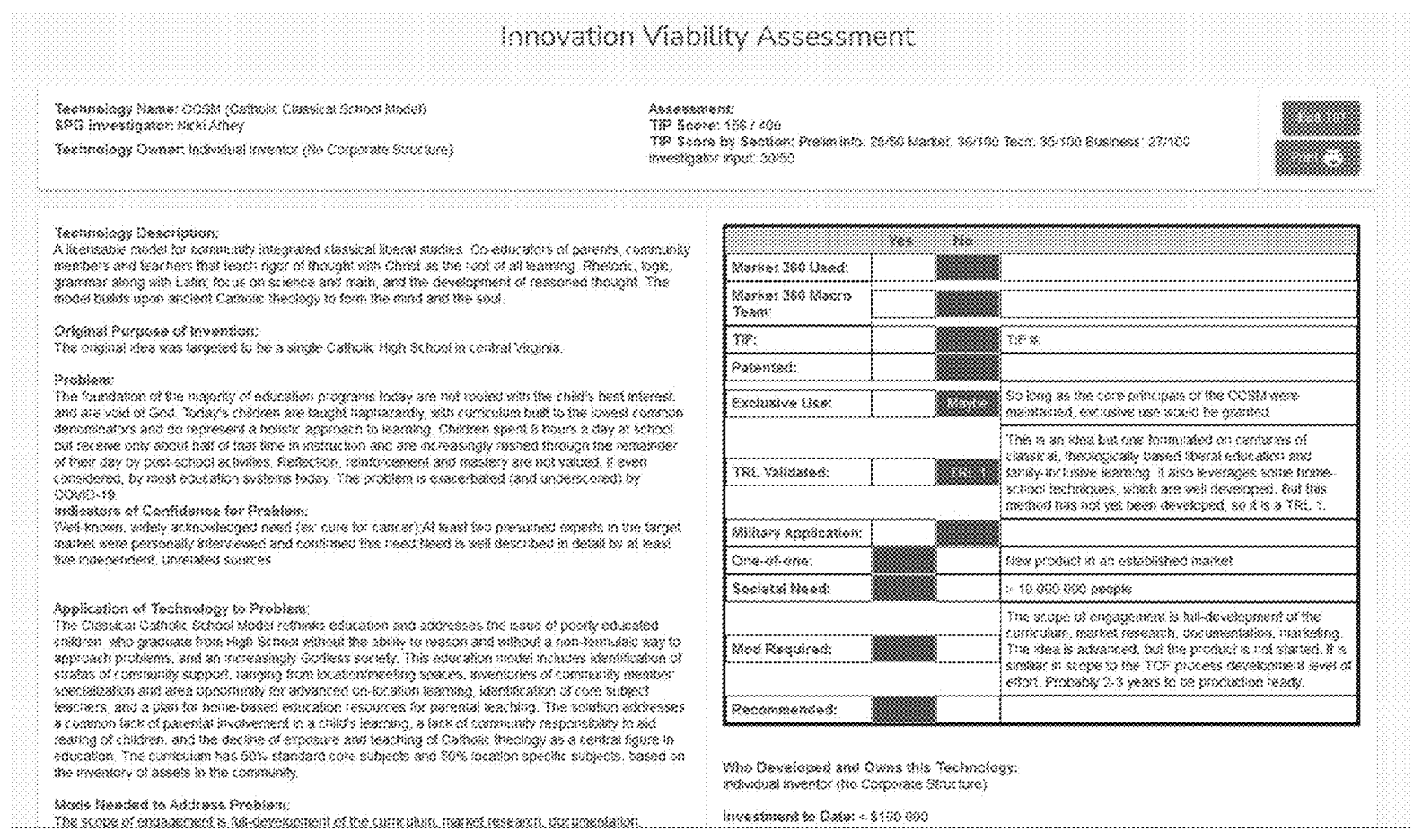

FIG. 25A represents the Innovation Library which populates in serial, with a conditional start point of either an Idea Generator Engine (IGE) initial population or a TIF population. The Idea Generator is an internet crawler using AI that is both initially trained and then ML-enabled by other TCF TILLER nominations to identify candidate technologies from web-accessible entities, including but not limited to university tech transfer offices, national and government labs, patent databases, social media, conference notes, published research papers, and so forth. The Idea Generator will look for candidates based on either TMT entered criteria or TILLER ML nominations based on TMT availability and their strength in a market, Market360 identified needs, or existing TO technology improvement areas. The Idea Generator will populate a portion of the fields related to a candidate technology, such as technology name, technology owner, patent status, invention date, and so forth. The Innovation Library can also harvest data from a human entry in a TCF standardized, cloud-hosted Technology Introduction Form (TIF) which is instrumented to facilitate bias-reduction and standardized confidence factor generation and scoring. When the TMT deems a candidate technology worthy of internal investment in further research, a TIP researcher completes targeted research and enters the output of the research into a cloud-hosted TCF Initialization Proposal (TIP) form. The TIP is also a TCF instrumented form with questions that automatically collect pre-normalized, consistent and scorable data that is ingested into the Innovation Library datastore. TILLER logic keys on particular data elements entered in the TIP and executes further logic, such as Market360 validation of the value of TAM entered in the TIP for a particular market. The completed TIP data, TILLER scored data, and TILLER ML/AI nominations (such as other related candidate technologies that may offer increased market share if combined, best-fit TMT resource based on TMT member expertise and scored TCF acumen in the relevant field of the technology and/or market need, and red-flag warnings about candidate technology barriers to entry based on the market sector that could add cost or time to the TO) are consolidated and presented by the TILLER into an Innovation Validation Assessment cloud-hosted, web-based interactive form. The IVA webpage, as illustrated in FIG. 37, is used by TMT executives as a standard agenda and input receiving tool. The TMT can drill down into the raw TIP data and can override an answer provided by the TIP reviewer if required (for example if the answer was based on a flawed assumption) and the TILLER would automatically rescore the TIP. The IVA form allows the TMT to input any notes and to then select whether the TIP is a recommended TO candidate, a rejected TO candidate or if the TIP needs to be reworked completely. This data is added to the record for the candidate technology in the Innovation Library and is available in summary form on the cloud-based, web-hosted Innovation Library status page. FIG. 25B illustrates how the data logically is represented in the Innovation Library with increasingly populated data elements as the data flow progresses from IGE to IVA. FIG. 25C provides yet another view from the perspective of the TILLER elements introduced in FIG. 24, with a time element added from left to right showing the specific TILLER components engaged during the Innovation Discovery process.

In one embodiment, the TIP data is transferred to the TILLER via network-based communication. The TILLER is configured to create a normalized score. The normalized score allows for comparison across the TIP data and improved the answer reliability.

In another embodiment, once a candidate technology has been officially designated as a TO and Phase 0 begins, the Innovation functional track has two primary work systems that are instrumented for the TILLER. The QEP hands off the management of major innovation activities to the authoritative portion of the TCF process for the innovation functional track. Confluence and Jira, both industry standard, cloud-hosted, web-accessible tools are the native work systems that report out the status of product development. The clear demarcation of functional ownership is necessary to avoid non-authoritative reporting, while still allowing clear traceability back to the QEP. Confluence is instrumented for integration with Jira and Jira is used by the TILLER for automated API-based status reporting of sprints. Confluence is designed to create a fully traceable flow of business requirements from product vision to concept of operations (CONOPS) to components to sub-components to requirements to Jira tracking numbers. Advantageously, Jira is instrumented such that business-specific metrics can be generated automatically. The TILLER timestamps all key records which enables trend-based reporting, such as notifications if the current worklog has remained static and the backlog has increased.

Marketing and Sales: Pricing Model (MS Excel); S&OP (MS Excel); Revenue Execution (Sales Force)

TCF overcomes a long and unmet need to quantifiably characterize traditionally unquantifiable data, such as creative work products typically associated with marketing. Logos, branding, messaging, and persona development to name a few are typically only monitored from a binary complete or not complete standard. TCF overcomes this unmet need by integrating multi-modal confidence factors into TCF. TCF M&S templates are created expressly to generate not only the marketing product necessary for the task, but also to generate quantifiable confidence scores that indicate the quality of the input that led to the product development and the quality of the final product. In one example, these metrics are not captured in any other comparable prior art, but are essential to a best-fit product to market approach in a greatly reduced timeframe. TCF M&S also captures more easily quantified metrics generated by pricing models, marketing and/or sales campaigns effectivity, ratings of ads placed, sales capture rates and so forth. The TCF method differentiates itself even in capturing these metrics, as they draw upon deliberate, consistent and cross-TO indicators collected from the instantiation of the TO in Phase 0 that carry through with increasing refinement through the remaining Phases.

4: Backend Data Enhancement and Management Decision Aids (Data Aggregation, Automatic Analysis, Scoring, Insight Generation, and Automated Alerts)

An important distinction of the present invention from prior art is the multi-tier usability of a single source of data as well as combinations of data. In the present invention, there are at least four tiers of interested parties which include but are not limited to investor, BoD/CEO, TMT and TCF practitioners. In one embodiment, TCF practitioner work systems authoritatively produce inherent data and outputs that are directly relevant to completion of a TCF task at that level. The data and outputs are useful in native format and in reference to the task that created them and are also relevant and useful to other TCF tiers of effort. Accordingly, the inherently generated authoritative data and outputs are automatically harvested, aggregated and transformed for usability by other tiers, such as the TMT, CEO and investors.

The TILLER backend includes an aggregation of unique datastores and databases (Quantum X, Market360, TCF Fund, Innovation Library, and so forth), with specialized algorithms, ML and AI attributed for management and insights at the CEO level.

Each datastore and database is cross-leveraged to enhance the global offerings and confidence factors in the TCF system. Different types of algorithms and scoring are applied depending on the data of relevance to the management tier (TO or BoD/investor), TILLER-enabled data collection, aggregation and algorithm engines allow the production of critical insights, alerts and auto-nominated process improvements.

The backend instrumentation of systems, the automatic population of datastores, databases, and the applied algorithms allow for real-time dashboards and insight tables visualizing critical areas of TO management that can be acted upon immediately. All reports represent the most accurate available data without requiring any TCF practitioner to stop their work to reformulate or repackage data.

In the present invention, illustrated in FIG. 24, TILLER ML/AI functions live in the TILLER logic layer. FIG. 24 illustrates the various components of the TCF process according to one embodiment of the present invention. FIG. 24 shows a representation of elements leveraged by TILLER. The TILLER logic, AI and ML functions live in the TILLER logic layer and are categorized as scoring logic (static routines), alerting (threshold based routines), nominations (ML based routines that are initially trained and then learn to look for TO and cross-TO anomalies, opportunities, and risks), and trends (time-based routines). The TILLER infrastructure and presentation layer includes the cloud-based storage locations, application engines for processing and TILLER generated visualizations and presentations of data.

Statically defined routines for scoring every element tracked by the TILLER as well as collective scores, are conducted at every level of the system. These scoring routines are visualized in the presentation layer, either in the evaluation scorecard, the TO database or the CEO database. But the same data elements are leveraged for multiple different end products, so several variants of scoring logic are defined depending on the insight of interest. Also, in the TILLER logic layer are an alerting engine, a nomination engine, a trending engine, a mining engine and TILLER infrastructure and presentation layer includes the cloud-based storage locations, application engines for processing and the TILLER generated visualizations and presentations of data. Enterprise systems used by TCF are all instrumented for the TILLER auto-harvesting and ingest, as are elements in TCF that represent hands-on work products that may live in a flat file but are instrumented in the TILLER architecture for standardization, consistency and ingest into the TILLER. In one embodiment, TCF is not fully automated, nor should it be as humans are essential in providing insight into whether they would spend their money to invest in a company or buy the product, but it provides a framework such that any human engagement is standard, unbiased to the greatest degree possible and can generate scorable metrics for use as decision aids. Each of these TILLER components has a multi-point touch on the data repositories fed by the instrumented work systems.

Figure 28:
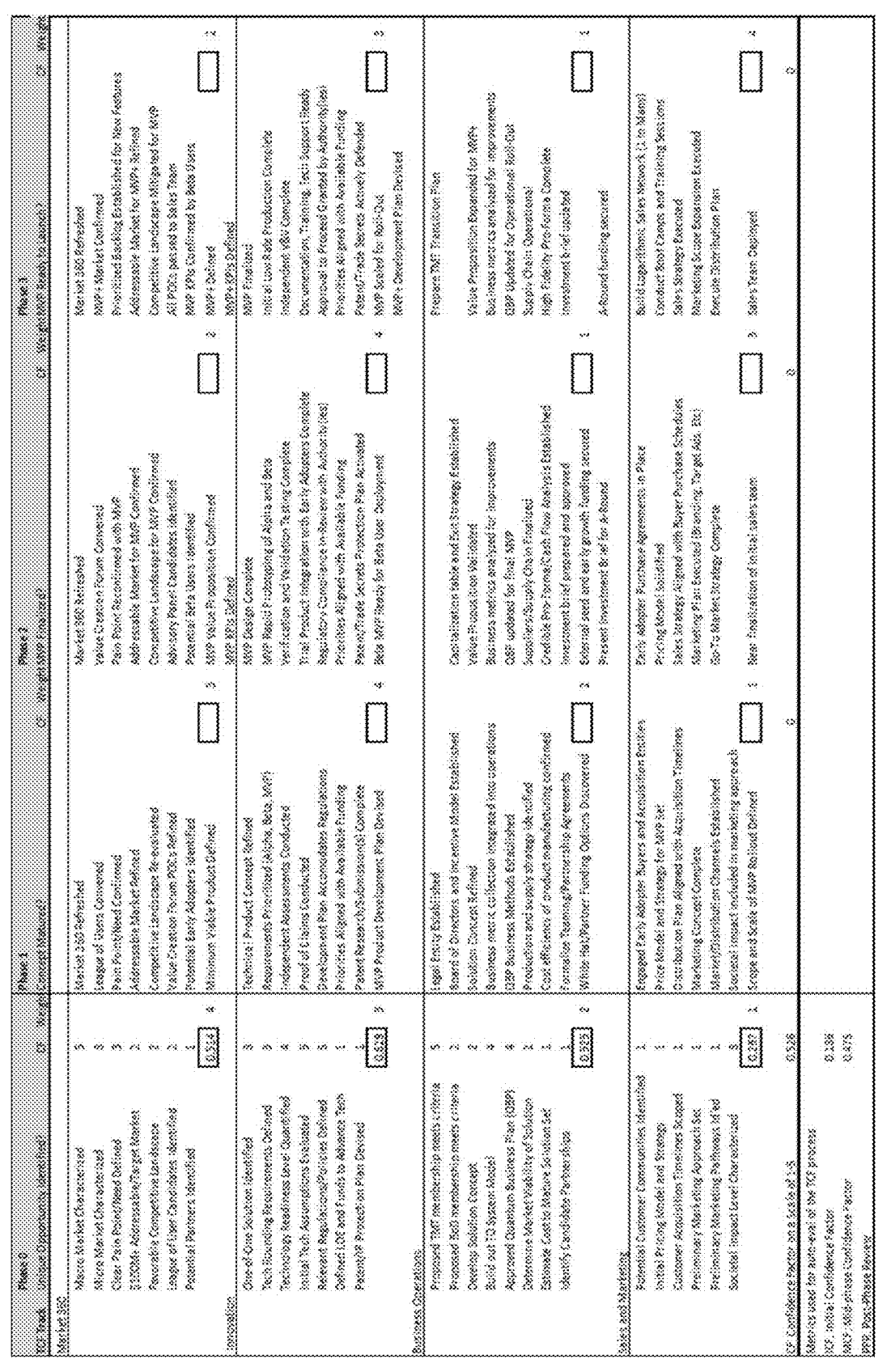

FIG. 28 illustrates a TO Evaluation Scorecard according to one embodiment of the present invention. The TO Evaluation Scorecard is tied directly to the key investor questions and subsequently to the end-of-Phase question. Each element has a confidence factor that the TILLER generates based on data in the QuantumX datastore, the Market360 datastore and the TCF Fund datastore. The QEP-defined phase-based track priorities are used to weight to the individual confidence factors and generate a combined confidence score. This score is time-stamped, as is every element in the TILLER datastore, and can be traced through time to provide TMT critical insights into TO progression and risk. The helper functions tie closely with the scorecard functional tracks in each phase. Since the QEP builds the work plan to answer those helper functions, the work systems and templates are pre-instrumented to gather the data required to measure progress quantitatively and with significant bias reduction. The TILLER transforms TO functional track-based data and employs algorithms to provide weighted scoring, in concert with the phase-based priorities set in the QEP. The TILLER leverages the Quantum X datastore, the Market 360 datastore and the TCF Fund datastore to produce the time-traceable scorecard.

Figure 29:
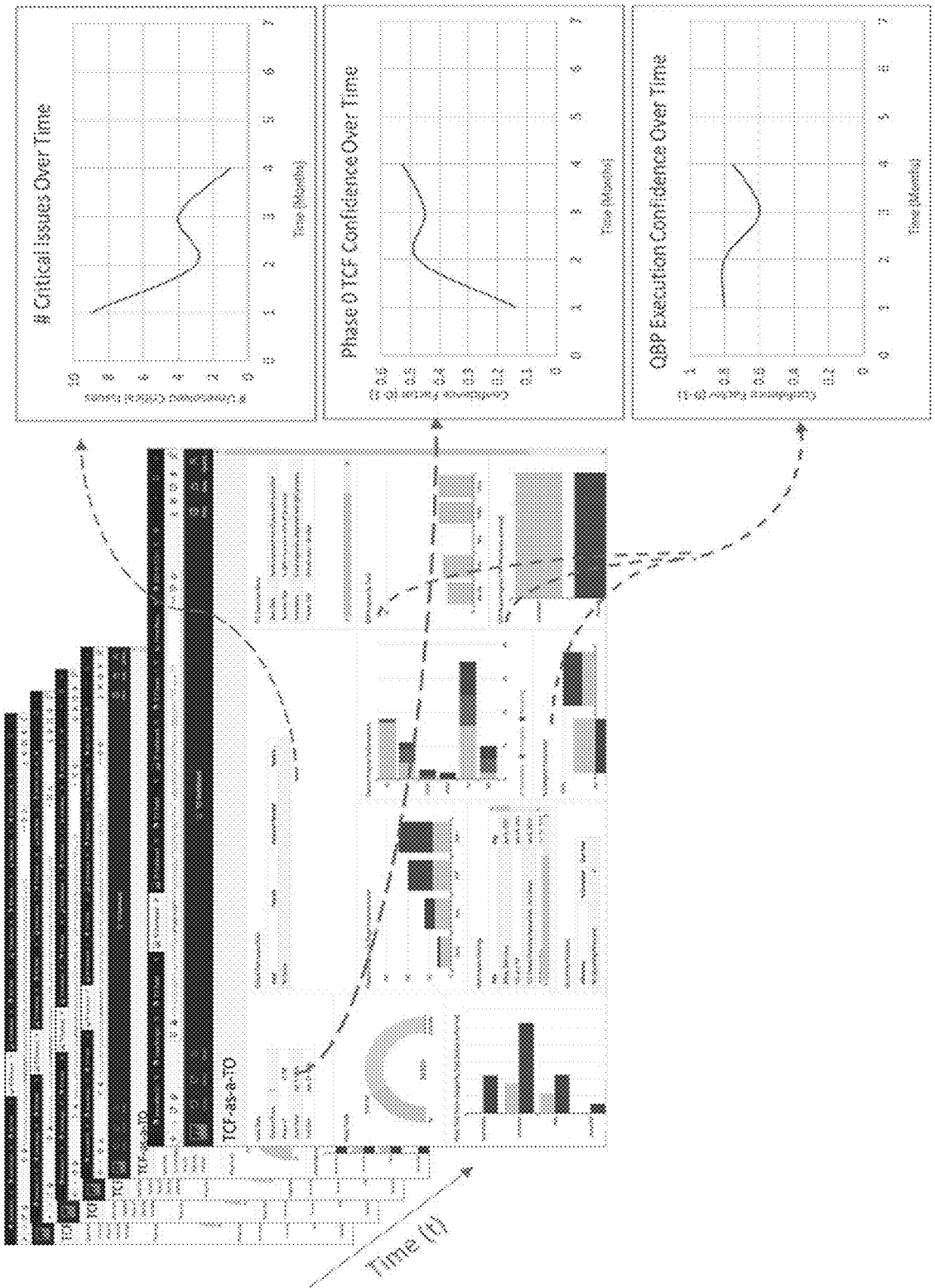
FIG. 29 illustrates a graphical representation according to one embodiment of the present invention.
Figure 35:
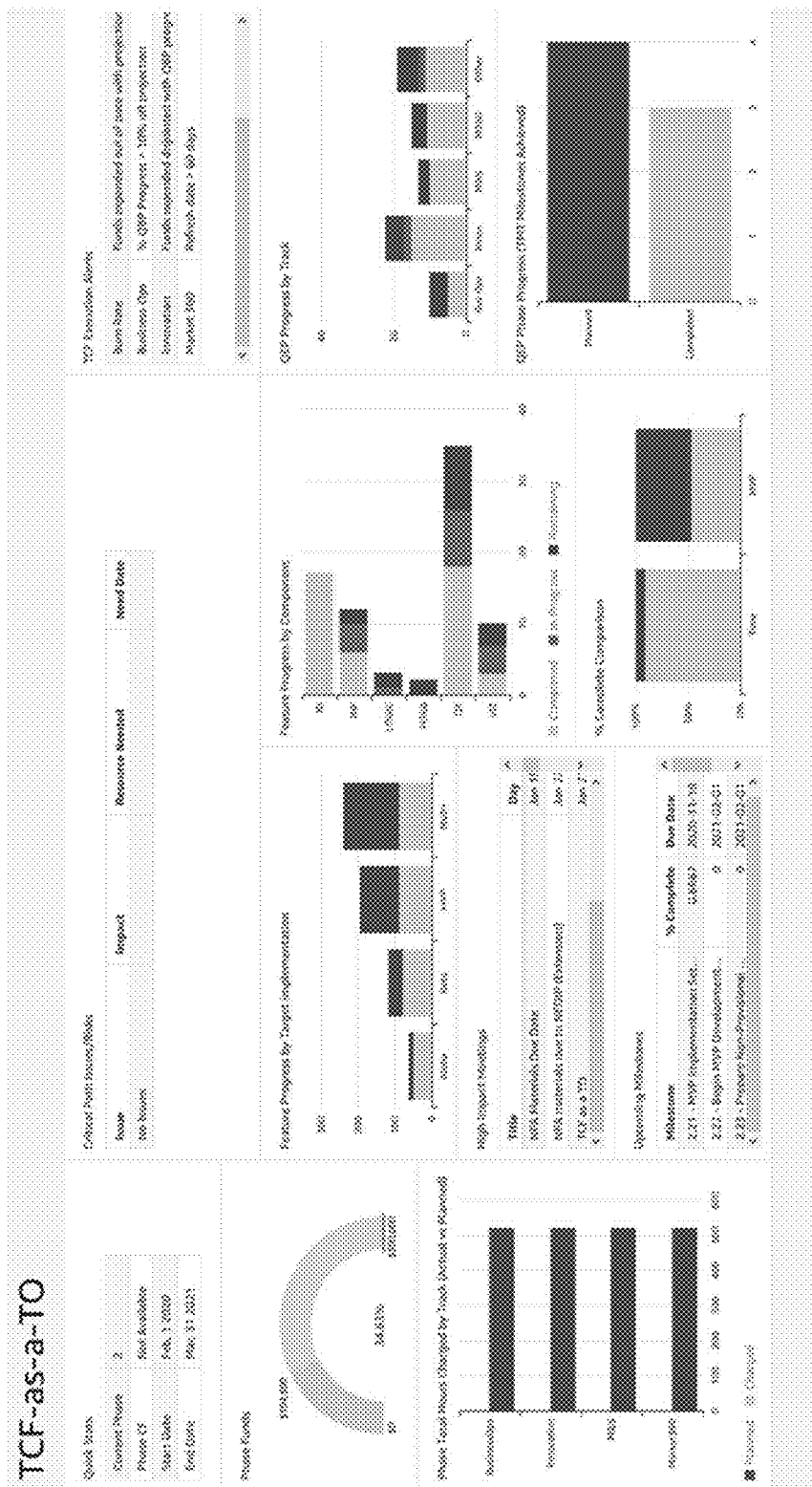
FIG. 35 illustrates a dashboard according to one embodiment of the present invention.
Figure 36:
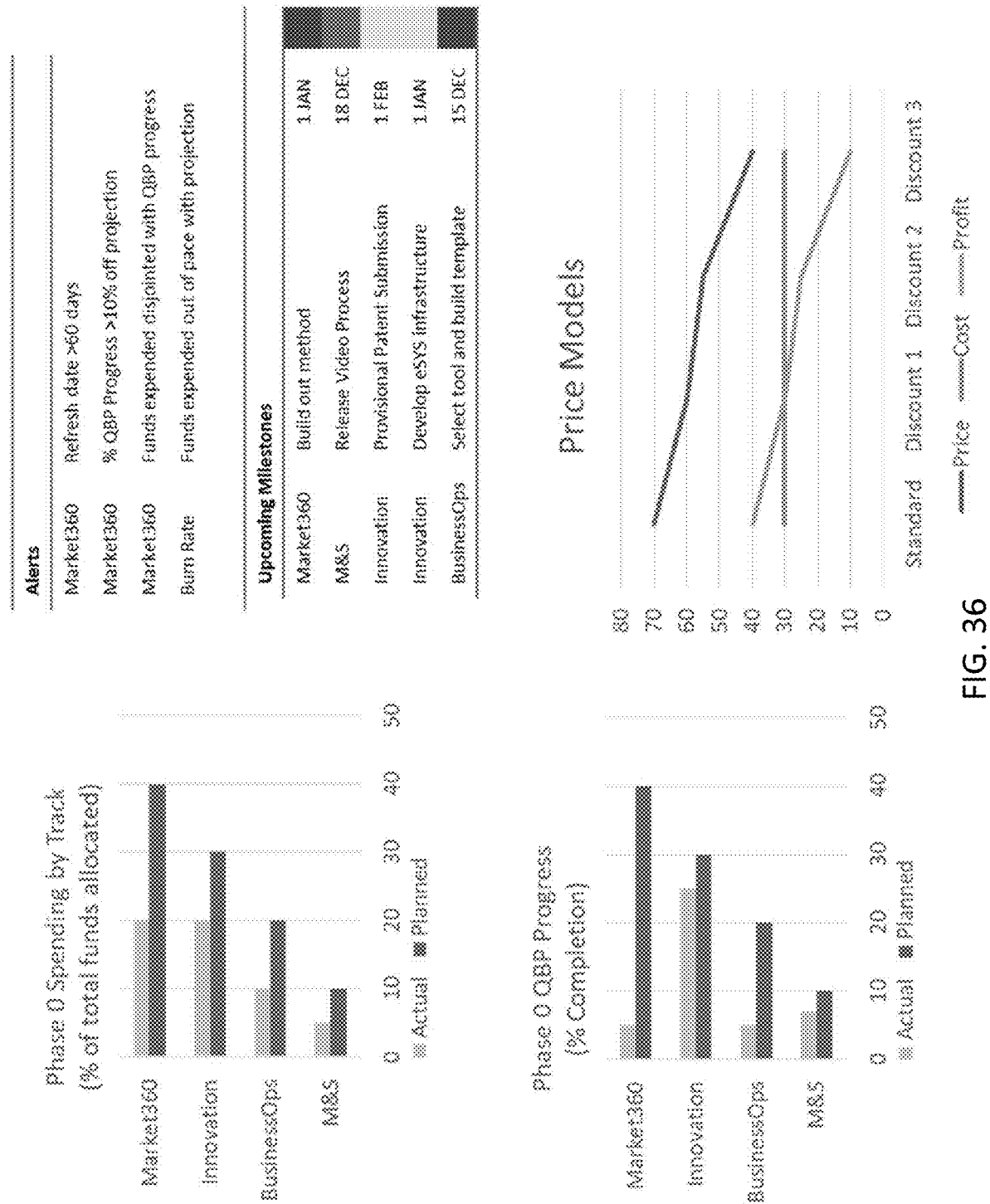
FIG. 36 illustrates a dashboard according to one embodiment of the present invention.

In one embodiment, as shown in FIG. 35, a dashboard is displayed on at least one remote device. The dashboard illustrates the current phase of a TO. The dashboard also includes the amount of funds allocated, the amount of funds expended, alerts, the TO's spending by track, the progression of the TO's business plan progress toward innovation implementations, the timeline for goals and milestones, the critical issues/risks and the current pricing models. The present invention is configured to update the dashboard in real-time to allow for continuous monitoring of a TO's progress. In one embodiment, the dashboard leverages data generated from sections of FIG. 9A to identify the steps included in each phase and/or track. FIG. 29 illustrates an embodiment of a TO Status Dashboard. The TILLER draws from its available resources to generate a slice-in-time rendering of current TO status, such as but not limited to QEP progress per baseline, spending by track compared with QEP projections, critical issues, nominated risks, revenue metrics, and so forth. The default information presented changes with each Phase, since some elements such as revenue in Phase 0, may not be a valuable metric for evaluating that phase goal. Because of the time-stamped values in the TILLER, the TO dashboard can also show trends that provide the TMT another dimension of evaluation. This trend data is both viewable as well as available to the TILLER ML/AI for additional nominations and alerting.

Figure 30:
FIG. 30 illustrates a dashboard according to one embodiment of the present invention.

FIG. 30 illustrates a dashboard according to one embodiment of the present invention that highlights cross-TOs insights and draws form each of the TILLER data sources and the TILLER logic methods. The TO Status Dashboard includes a multiplicity of outputs. The multiplicity of outputs includes TO's status by phase, the phase goal progression with confidence factors, the amount of dollars at risk, the amount of dollars available for investment and an aggregate field of candidate TOs. The TO status dashboard uses funding data, the TILLER evaluations, TO project management data, TIP entry data, and TO accounting data to generate the outputs. The diamonds on the TO Status dashboard correspond with a TO's confidence score. In one embodiment, the diamond is red if a TO is routinely not meeting its goals and has a low confidence score. In another embodiment, the diamond is yellow if there is concern and a medium confidence score. In yet another embodiment, the diamond is green, which indicates that the TO is meeting most or all of its plan. The TO Status Dashboard also allows for a user to determine when funds are available and where they should be invested in the future. The TO dashboard is configured to track multiple TOs to optimize the available funding.

Another TILLER visualization is the TCF CEO Dashboard, which highlights cross-TO insights and draws from each of the TILLER data sources and TILLER logic methods. The CEO dashboard is deceiving in its simplicity. From this dashboard, the CEO has a view of multiple TOs at one time, as well as the upcoming pipeline of candidate TOs recommended by the IVA review. In this example, the TO pipeline data is a variation of rendering the same data in the Innovation Library Status webpage. The Innovation Library Status page showcases details of how far along a candidate technology is in proving its merit through TCF and can also represent how many recommended IVAs are in queue. However, using the exact same data collected to generate the Innovation Library, the CEO is presented with insights into how fresh the Market360 is across the sectors of interest, how many candidate TOs applied to a particular market sector are available, how strong the candidate pool is in the IP pipeline and so forth. From just this portion of the dashboard, the CEO can direct resources as necessary for the benefit of all TOs. In a similar way, the CEO is presented with algorithmically generated consolidations of data, all consistent across TOs and generated based on consistently produced data, that indicate not necessary points of engagement with a particular TO, but also cross-TO strengths or weaknesses as well as potential opportunities regarding available funding. The CEO dashboard has drill down access into the TO dashboard, which has further drill down access into specific trend visualizations.

New business ventures are inherently complex and fraught with quantum risk associated with five significant types of rapid change: (1) market needs such as unintended users or use cases, (2) environmental shifts such as competitive alternatives, new policies or regulations, public/private priorities, etc., (3) product development and operational troubles such as design flaws, latent defects, changed APIs, etc., (4) availability of investment capital or loans such as pre-seed, seed, A round, etc. and (5) new technology such as bio-genetics, the Internet of Things (IoT), cloud computing, machine learning, nanotechnology, robotics, etc. The present invention lowers the risks associated with these types of change using communication and information management systems to facilitate quantum dynamic decision making and optimal decision realities. A measure of projected business outcome effectiveness is kept on a dashboard of the GUI used by the TMT and shared at regular time intervals, such as quarterly, with stakeholders such as the Board of Directors.

Figure 31:
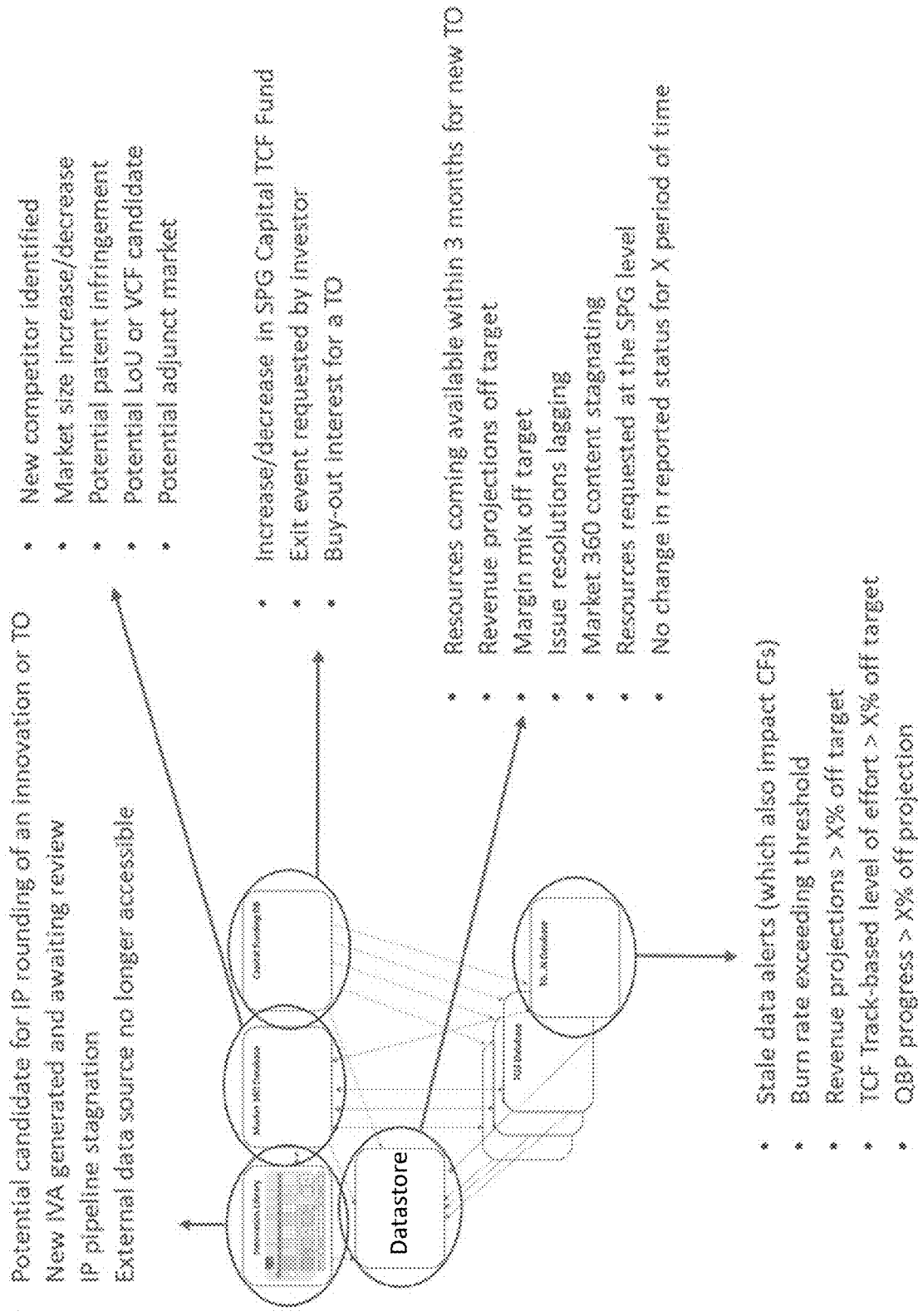
FIG. 31 illustrates alerts according to one embodiment of the present invention.

FIG. 31 illustrates alerts corresponding to the various subsystems of the TCF process according to one embodiment of the present invention. Alerting is a key TILLER feature and is based on algorithms housed in each of the databases and datastores. Various levels of alerts and auto-nominated suggestions are generated and reported out via methods such as appropriate dashboards, subscription emails or email broadcast. Samples alert types include: (1) Innovation Library: Potential candidate for IP rounding of an innovation or TO, New IVA generated and awaiting review, IP pipeline stagnation, External data source no longer accessible; (2) Market360: New competitor identified, Market size increase/decrease, Potential patent infringement, Potential LoU or VCF candidate, Potential adjunct market; (3) Fund: Increase/decrease in the Capital TCF Fund, Exit event requested by investor, Buy-out interest for a TO, (4) CEO: Resources coming available within 3 months for new TO, Revenue projections off target, Margin mix off target, Issue resolutions lagging, Market 360 content stagnating, No change in reported status for X period of time; and (5) TO: Stale data alerts (which also impact CFs), Burn rate exceeding threshold, Revenue projections>X % off target, TCF Track-based level of effort>X % off target, QBP progress>X % off projection.

Figure 32:
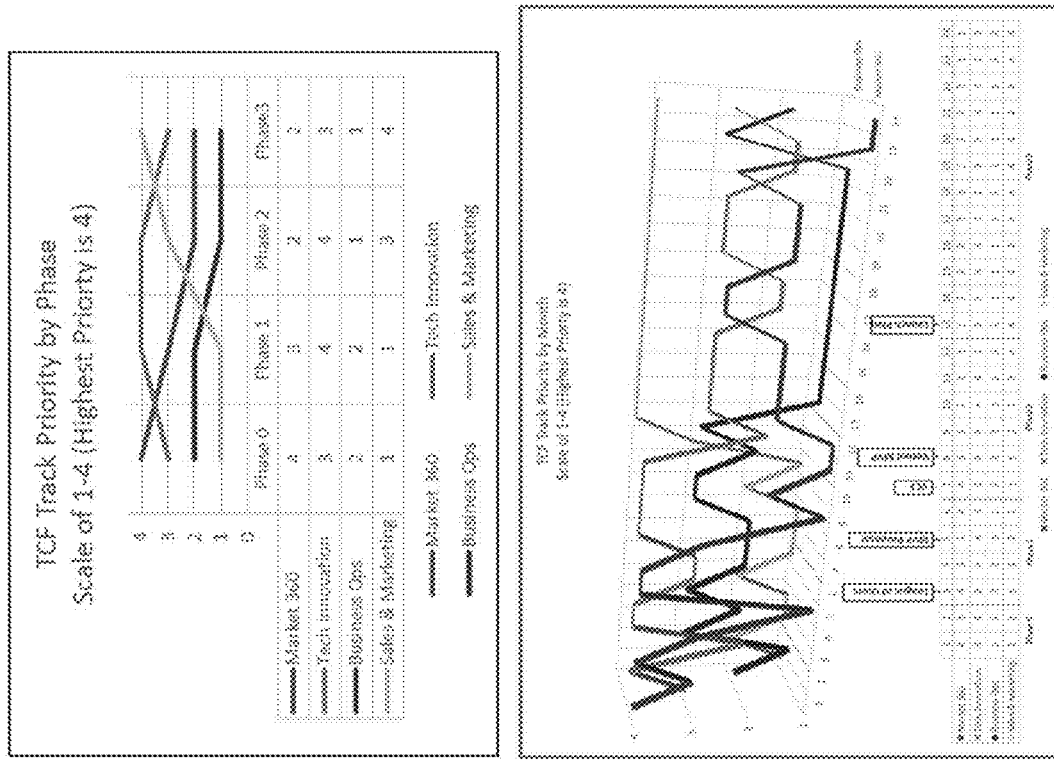
FIG. 32 illustrates an insight according to one embodiment of the present invention.
Figure 34:
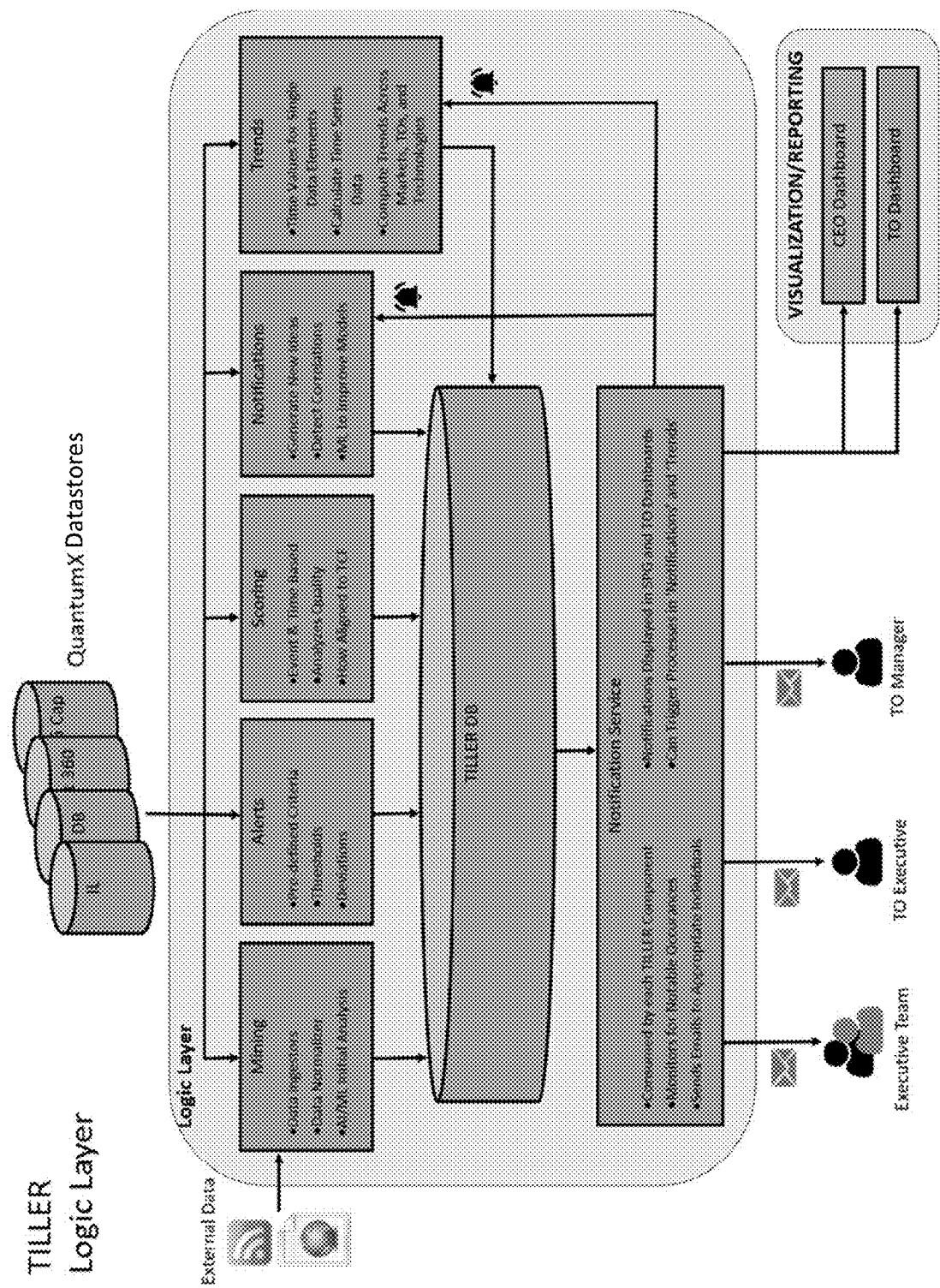
FIG. 34 illustrates a flow diagram of the TILLER according to one embodiment of the present invention.

FIG. 32 illustrates an insight according to one embodiment of the present invention. One insight of particular value to the TMT, and the TO, is how closely their spending is following the phase-based priorities. FIG. 32 shows that the insight cannot be generated without the entire TCF framework, instrumentation, QEP and work systems being harmonized. Inputs required to generate this insight include: instrumented timekeeping data, QEP priorities for TCF tracks by phase, QEP projected timeline and milestones, the funds allocated to the current TO TCF Phase. With these inputs, the user is not encumbered to create this complex report. The user only has to enter their time according to the time charging guidance. Where in most prior art, timekeeping data is used for payroll, in TCF this single entry can be leveraged to produce insights to the TMT for TO governance, to the TO President and CEO to monitor funds and actions, to the TMT for TCF process improvement (for example, TILLER trend and/or nomination logic would identify a pattern of under or over allocation in the QEP for levels of effort relative to a particular market sector or type of technology and could offer an improved, more realistic spread for either priorities or phase timing), and for TCF proof points.

The present invention is configured to allow network-based communication between a TO and the TMT. The present invention includes instant communication regarding the C-suite executives' analysis and review of various phase criteria to the TO. The system is further configured to evaluate whether more members need to be added to the TMT, based on the necessary subject matter expertise. Furthermore, if the present invention determines that the C-suite lacks the necessary subject matter expertise, then the system provides recommendations for potential C-suite candidates.

The TCF platform includes quantitative metrics and applies unique logic and artificial intelligence to provide insights for (1) multi-tier characterization of resource utilization and progress, (2) alerts for cross-TO opportunities and threats, (3) bases for company valuation, with confidence factors, (4) TCF phase progression readiness assessments, and (5) trends, forecasts and projections.

This proactive repeatable scientific method and information management toolset enables the TMT to be holistically informed by TILLER elements, and to plan steps to avert strategically critical setbacks or reallocate resources to seize upon opportunities. Advantageously, the GUI of the present invention provides for collaboration over a network in real-time or near real-time. In one embodiment, a server computer or cloud-based system hosting the GUI of the present invention is operable to provide real-time updates on activity within the GUI via email, text message, or any other form of electronic communication.

Figure 39:
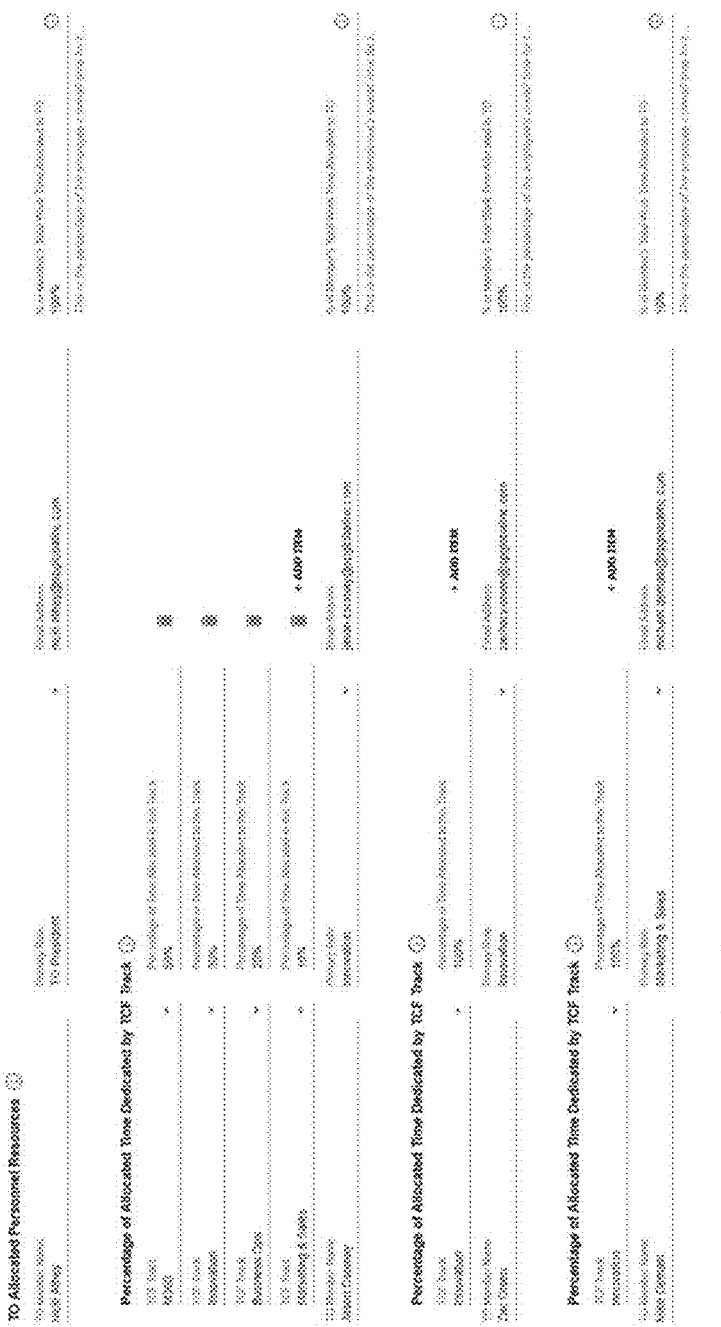
FIG. 39 illustrates a dashboard according to one embodiment of the present invention.

The TCF platform further includes a TCF register. The TCF register is configured to collect outputs from the QEP tasks as well as critical TMT decisions and allocations. All data is collected such that it is quantifiable, consistent, comparable, and reusable for multiple purposes across the TILLER. Each TO has its own register, and each register is restricted to individuals with access (e.g. TO members and TMT members). Furthermore, the GUI is configured to display a TCF Register tab for each track. The TCF Register tab includes outputs relevant to the corresponding track. Additionally, the GUI includes a Governance tab that captures all relevant data for the TMT. The governance data also captures anticipated and/or approved funds/resources, assigned personnel (including % time allocated as shown FIG. 39), TMT review output, and action items and decisions. This enables cross-TO resource utilization monitoring (overallocation across TOs, overuse by a single TO individually and overall as indicators to avoid personnel burnout), upcoming resource availability alerts (for use in planning for new TO Phase 0 starts), more granular cost estimates for Phase dollar allocation (couple QEP planned durations with the number of resources per track), as well as machine learning for comparing actual vs. estimate gaps and future automated recommendations for durations. The TCF register illustrates that key data is collected and aids the TILLER in predicting the likelihood of success as well as early alerts of risk.

5: Automated ML and AI Methods Trained on TCF Enhancement and Process Improvement TCF and the TILLER are designed for multi-level insights based on well-formed native, authoritative data tied to a consistent QEP that represents the key success indicators for a TO. The data collected, as previously evidenced, provides insights into the accomplishment of every TCF task and product, to include TCF practitioner execution. The TILLER is able to act on the same data to produce a multiplicity of variant outputs due to the end-to-end, holistic instrumentation and construction of the TCF process with every element designed for inter-relationship. The TILLER ML/AI components, specifically the nominations, trending and web mining elements, are trained to look at cross-TO data to interact on the back-end with each other as well as with predefined thresholds to nominate opportunities and risks to a TO or across-TOs in a particular sector or at large. The ML/AI looks at time-based trends against baselines to identify anomalies, areas of repetitive error, quality tendencies or overall performance of TMT decisions, areas where timelines are routinely extended past QEP definitions, routine areas of miscalculation, routine areas of manual override, and so forth. The nomination engine generates a notification to the TMT and also posts the nomination to relevant TO dashboards and CEO dashboard for action resolution. The acceptance or rejection of the nomination is received back by the ML/AI engine in the self-training of quality of automatic observations. Advantageously, the ML/AI is further operable to consider a plurality of tradeoffs. The plurality of tradeoffs includes considerations across each phase and each track that provide limitations of a separate phase and/or a separate track. The ML/AI further supports predictive analysis impacts of decisions across processes and phases in numerical, textual, and graphical presentation styles, with potential multi-path decision indexing (showing multiple paths for tradeoff). The TCF Platform AI includes experiential rules based on previous TO developments which will augment initial estimates of cost, complexity, manpower, management, market opportunity and additional elements as necessary.

The TILLER ML/AI can also auto-task other TILLER functions itself. For example, if an alert is generated or a trend is noticed, the nomination engine can place a task on the web mining queue to collect particular information to fill a void and nominate it for acceptance/rejection.

As data is collected, auto-nominations will be made for human response. These responses will be logged for machine learning and improved auto-nominations. One example is during the TIP IVA. The innovation library algorithm will automatically generate candidate IP rounding technologies for consideration. Part of the IVA input will be to accept or reject the candidacy of the auto-nominated data. These responses will be logged separately and used to improve AI and algorithms as new TIPs and TOs are evaluated.

Another example of data re-use for ML/AI is for marketing data collected as part of a brand messaging template. The template is designed to collect discrete data elements, such as top tier messaging, product description, differentiation words from competitors and so forth. The TILLER nomination engine will harvest key words from this entry and put a task on the Market360 queue and the web mining queue to refine results related to competition, patents, funding opportunities as examples. The results will be presented to the TO level housing the source data, any TO relevant in the market sector and potentially the TMT as necessary.

The present invention leverages all functions available to it to automatically, quantitatively and consistently assess confidence of TO success, particularly trained on opportunities and risks based on trends found within the instrumented system and beyond.

In another embodiment, the AI and ML algorithms are configured to generate and adapt a pricing model for a TO. The present invention collects the Market 360 data, price factors data, the customer input data, and other TCF input data. The AI and ML algorithms are configured to track and model a recommended pricing model based on the input data for a TO. Every piece of input data is time-stamped and integral to the TCF Process. The AI and ML algorithms constantly receive the time-stamped data, and are configured to analyze historical time-stamped data to predict trends and provide recommendations for a TO. Advantageously, the AI and ML algorithms help eliminate bias by comparing cross-TO data. For example, the AI and ML algorithms are configured to recognize similar trends and factors between TOs and provide recommendations and alert the TO and TMT to critical information. This is an improvement over prior art because the TCF system provides consistent, tangible decisions based on historical and real-time data across multiple tiers and multiple TOs, thereby improving the success rate of a TO.

In yet another embodiment, the AI and ML algorithms are configured to continuously receive, monitor, and model all data inputted and outputted from the TCF process. The AI and ML algorithms compare all time-stamped data to continuously adapt the TCF process, thereby improving the success rate and lowering the risk for TOs. For example, the AI and ML algorithms are configured to receive decision input data from the TMT. The AI and ML algorithms are operable to provide recommendations to the TMT and will continuously update the recommendations based on the TMT input. Furthermore, the AI and ML are configured to monitor the results following the TMT decision and model the effectiveness and success rate of members of the TMT. This provides consistent and comparable feedback for each member of the TMT, which can be used to improve the decision-making process as well as the confidence in each TMT member's decision. The AI and ML algorithms are configured to alert the TMT if a TMT member has a negative trend and provide recommendations to improve the decision-making process. The constant monitoring and feedback of the TMT enables the TCF system to provides confidence in the TCF process because risks are identified and recommend steps are included to lower the risk.

In one embodiment, the AI and ML algorithms are configured to determine if the collected input data (ex. the TIP data or TIF data) needs to be changed to improve the initial analysis of a TO candidate. The ML and AI algorithms will nominate TO questions that improve the confidence score of a TO and will recommend that the question be given more weight in factoring a TO's confidence score. Furthermore, the AI and ML algorithms are configured to use the results from analyzing the time-stamped data of previous TOs to suggest new questions and/or data inputs to improve the evaluation of a TO candidate. For example, and not limitation, the AI and ML algorithms are operable to recognize that a surgical medical device needs to be tested by surgeons or similar users and the feedback needs to be included as part of the initial TO evaluation. The AI and ML algorithms will recommend that the TIP include an input field for specific user (ex. surgeon) feedback.

Advantageously, the ML and AI algorithms are integrated across all levels and tiers of the TCF process. The ML and AI algorithms provide recommendations for every component of the TCF process based on the time-stamped data. The ML and AI algorithms monitor and recommend tangible decisions and support the cross-TO interactivity to lower the risk and improve the confidence of TOs.

The TCF system provides management and guidance for a TO from start to finish of the TCF process. The AI and ML algorithms help adapt the TCF system to improve the instrumentations, frameworks, logic, tiers and systems to improve the success rate of a TO. This allows the TCF process to support multiple TOs, even if the TOs are in different industries and/or different stages of their development process.

The present invention uses structured data queries to create custom insights for different businesses and/or technologies. The structured data includes market data, timecard data, intellectual property data, and other TCF evaluation criteria. The timecard data is collected as users submit their time during each phase, which allows for the present invention to determine where a TO's effort is being focused. This is unique over prior art because timekeeping for different business operations is not tracked and analyzed to further improve a TO. The present invention applies TILLER Logic to the collected data to consistently and constantly update insights. The present invention further applies auto-correlation and/or artificial intelligence algorithms to evaluate the data.

The TCF platform generates investor reports after finalizing its analysis of a TO. The investor report includes timekeeping data, market data, product data, TO data, intellectual property data, value creation data and confidence scores. The confidence scores provide a normalized data point to allow investors to make a reliable decision for TOs using different technologies.

The decision-making tools are implemented via templates integrated with an interactive GUI to apply the principles of quantum uncertainty with Kepner-Tregoe (K-T) decision analysis and Statistical Process Control (SPC). The quantum dynamic decision-making toolset leverages the rightfully dispersion both organizationally as well as geographically for the TO team. Kepner-Tregoe methods are described on the Kepner-Tregoe website (www.kepner-tregoe.com), The New Rational Manager by Charles H. Kepner and Benjamin B. Tregoe (2013), Improving Performance: How to Manage the White Space on the Organization Chart by Geary A. Rummler and Alan P. Brache (1995), Implementation: How to Transform Strategic Initiatives into Blockbuster Results by Alan P. Brache and Sam Bodley-Scott (2005), each of which is incorporated herein by reference in its entirety. Kepner-Tregoe methods include, inter alia, strategic outcome comparison and thinking models. SPC includes identifying extrinsic variances from the 5 sources of change described above.

The TCF platform is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The TCF platform is operable to use any of the aforementioned learning techniques alone or in combination.

Further, the TCF platform is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The predictive analytics includes business planning, technical risks, secondary and tertiary effects of trade-offs, model course of action (COA) in real time, real-time market trends, and the cross track impacts of these elements. The TCF platform is preferably operable to recommend and/or perform actions based on historical data, external data sources, ML, AI, NNs, and/or other learning techniques. The TCF platform is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques. The TCF platform is further operable for prescriptive analytics to recommend the best course of action (COA) based on prescribed policy or common risks associated with specific COAs.

Figure 40:
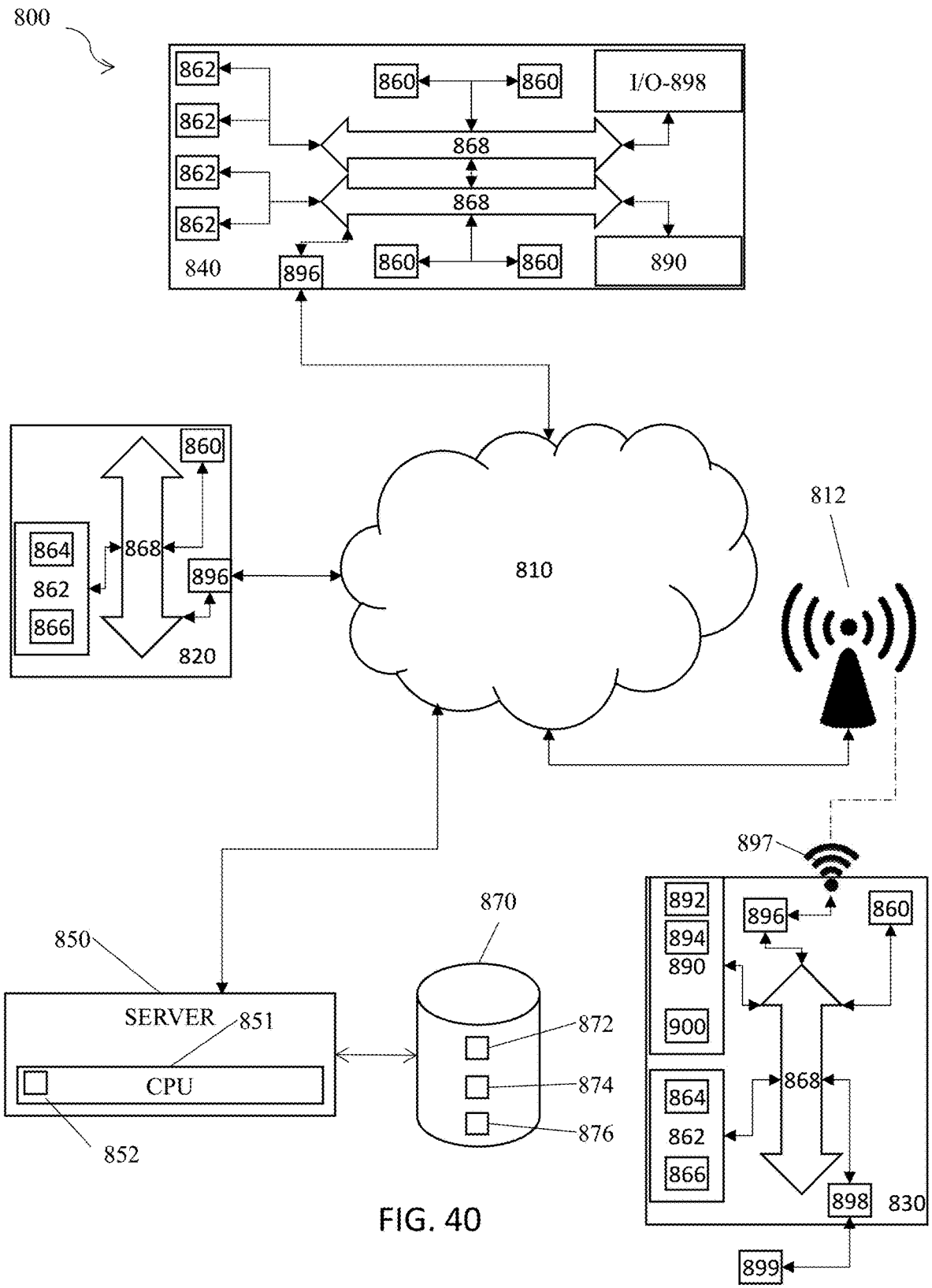
FIG. 40 illustrates a schematic of a computer network system according to the present invention.

In one embodiment of the present invention, the methods operate on a system as illustrated in the figures, in particular FIG. 40, that includes at least one device in network-based communication with at least one computer and/or cloud-based computing system, and wherein the at least one computer or cloud-based system is operable for storing, modifying, outputting, and retrieving information in communication with the at least one input device and at least one output device; and software installed and capable of running on the at least one computer for automatically evaluating technology and associated intellectual property, corporate management resources and structure, and commercialization opportunity and corresponding likelihood of success FIG. 40 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 40, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 40, is operable to include other components that are not explicitly shown in FIG. 40, or is operable to utilize an architecture completely different than that shown in FIG. 40. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The present invention is necessarily rooted in computer technology in order to overcome a problem specifically arising in the realm of computer networks. More specifically, the present invention electronically searches and parses, in real-time, millions of web sites, documents, images and videos from around the planet to find the ones that are relevant. This immense amount of content, which cannot be parsed in real-time or near-real-time by humans, was not available prior to the advent of the Internet. Prior to the Internet, litigators would have to deal with hundreds or maybe thousands of documents per case, which required a large amount of time. Now, with the availability of millions of articles of content, there are not enough persons trained in litigation to review all the content in real-time or near-real-time. Thus, this is a problem created by the Internet.

Additionally, many of these documents are offered electronically and only through the Internet, but in unstructured or in a variety of structured data formats that are not uniformly analyzed with traditional research and analysis methods. Thus, it is not possible to automatically analyze documents except by using computer and electronic networking technology, including GUIs. The GUIs described in the present invention are also a product of computer technology and Internet connectivity, and as such were unavailable before the Internet. computing technology and the Internet.

Additionally, the present method differs from prior art manual methods of assessing business opportunities for start-up companies or for considering intellectual property for investment and commercialization.

Furthermore, the high-throughput, real-time screening necessitated by the enormous number of documents along with the constraints of computer displays requires technological features that did not exist before the Internet. Specifically, the need to review multiple electronic documents in real-time within a fixed monitor requires an interactive method that can toggle rapidly between documents. The GUIs described in the present invention provides this ability.

Certain modifications and improvements will occur to those skilled in the art upon a reading of the foregoing description. All modifications and improvements have been deleted herein for the sake of conciseness and readability but are properly within the scope of the following claims.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for providing an end to end, systematic, and repeatable approach for starting, building, and launching a single startup company or simultaneously launching a plurality of startup companies comprising:

at least one server platform including memory, a processor, and a logic engine; and at least one remote device including a graphical user interface (GUI);

wherein the at least one server platform includes at least one set of parameters and at least one ruleset, wherein the at least one set of parameters and the at least one ruleset include focused and repeatable metrics for the single startup company and/or the plurality of startup companies to reduce risk, cost, and time to achieve success;

wherein the at least one server platform includes a web crawler, a web mining tool, an application interface, and at least one database accessible via network communication;

wherein the at least one server platform receives input data from the at least one remote device, the web crawler, the web mining tool and the at least one database via network communication, wherein the input data includes structured data and unstructured data, wherein the input data includes management data, intellectual property data, market data, innovation data, financial data, future sales data, time data, consumer data, social media data, and product data, wherein the input data further includes conference notes and published research papers;

wherein the web crawler automatically generates the input data;

wherein the input data is updated in real-time or near real-time;

wherein the at least one server platform transforms the input data to pre-normalized, standard, consistent, time-stamped input data; wherein the at least one server platform includes a management system, wherein the management system includes a first phase, a second phase, a third phase, and a fourth phase, wherein each phase includes continuous, predictive, and classical analysis with a plurality of entry thresholds and a plurality of exit thresholds to achieve business success, wherein the plurality of entry thresholds and plurality of exit thresholds must be met before moving to the next phase;

wherein the management system further includes an infrastructure, wherein the infrastructure is separated into a plurality of functionality tracks, wherein the plurality of functionality tracks include a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time and is designed to keep the startup company and/or the plurality of startup companies on track to meet the plurality of exit thresholds;

wherein the at least one server platform includes a management summary, wherein the management summary is displayed via the GUI, wherein the management summary includes summary data corresponding to each functionality track of the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or the plurality of startup companies;

wherein the management system analyzes future needs based on the input data and the related needs of the startup company and/or the plurality of startup companies in its current phase;

wherein under the continuous market analysis track, the at least one server platform continuously samples, researches, and determines market and consumer needs, create and refine a product concept, and provide a plurality of recommendations to identify and maintain a representative customer base based on the input data;

wherein under the innovation track, the at least one server platform assesses the startup company's technology and develop a truly unique, "one-of-one" solution, wherein the "one-of-one solution" is directed to meet unfulfilled or underserviced market pain points and address a societal need;

wherein under the business operations track, the at least one server platform is directed to incrementally staged project and business management functions, wherein the at least one server platform identifies potential business partnerships, creates a production and supply strategy, determines the cost efficiency of manufacturing, and provides a plurality of financial management recommendations and projections related to the startup company's and/or the plurality of startup companies' market and technology, wherein the at least one server platform further creates a pricing model for the startup company's technology, wherein the pricing model is based on at least one factor, wherein the at least one factor includes cost to recapitalize initial product development, long range sales support, product improvement, testing to assess readiness, required regulatory compliance, manufacturing, supply chain, business operations, documentation and training, and staffing, wherein the at least one server platform receives user input to change the at least one factor via the GUI, wherein the at least one server platform analyzes and displays how the change of the at least one factor affects the pricing model;

wherein under the marketing and sales track, the at least one server platform plans a product lifecycle and at least one early revenue generating action, wherein the at least one server platform performs risk identification routines, and generate alerts related to competition;

wherein the at least one server platform generates a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track of the plurality of functionality tracks;

wherein the management system prioritizes at least one functionality track based on the input data for each functionality track of the plurality of functionality tracks;

wherein the at least one server platform tracks a progress of the startup company and/or the plurality of startup companies during each phase;

wherein the progress of each startup company and/or the plurality of startup companies during each phase is displayed via the GUI;

wherein the at least one server platform is tracks the amount of time spent for each functionality track of the plurality of functionality tracks;

wherein the at least one server platform generates the at least one confidence score for the input data and for the progress of the startup company and/or the plurality of startup companies, wherein the at least one confidence score indicates the risk of the startup company and/or the plurality of startup companies, wherein the at least one server platform records and timestamps the input data and the at least one confidence score during and after the startup company and/or the plurality of startup companies progresses through a phase for analysis;

wherein the first phase includes creating a management team and performing automatic assessment of the startup company and/or the plurality of startup companies, wherein the at least one server platform provides at least one recommendation for the management team, wherein the management team initially includes employees external to the startup company and employs a specialized mentored management strategy that transitions executive management roles to the startup company by the end of the fourth phase, wherein the at least one server platform receives input from the management team based on the at least one recommendation, wherein the management team input includes feedback on the at least one recommendation, wherein the at least one server platform records the management team input, wherein the at least one server platform analyzes and adjusts the at least one recommendation based on the management team input, wherein under the continuous market analysis track, the at least one server platform assesses at least one market need and at least one impact to the other functionality tracks based on the at least one market need, wherein under the innovation track, the at least one server platform devises the one-of-one solution with associated tradeoffs to allow for coordination with the other functionality tracks of the plurality of functionality tracks, wherein under the business operations track, the at least one server platform frames an execution plan with manufacturing and design considerations in coordination with the other functionality tracks of the plurality of functionality tracks, and wherein under the marketing and sales track, the at least one server platform creates a pricing plan in coordination with the other functionality tracks of the plurality of functionality tracks, wherein all functionality tracks of the plurality of functionality tracks of the phase provide information to the at least one server platform, wherein the at least one server platform analyzes the data for each functionality track of the plurality of functionality tracks based on the at least one ruleset and the at least one set of parameters, wherein each functionality track of the plurality of functionality tracks incorporates data captured during other functionality tracks of the plurality of functionality tracks;

wherein the at least one server platform determines if the startup company and/or the plurality of startup companies should proceed to the second phase, wherein the at least one server platform determines if the startup company and/or plurality of startup companies should receive more funding based on the progress of the startup company and/or the plurality of startup companies, whether the startup company and/or the plurality of startup companies has met the plurality of goals and/or the plurality of milestones for the first phase, and whether the at least one confidence score are acceptable, wherein the plurality of goals, the plurality of milestones, and the at least one confidence score are based on data captured during the plurality of functionality tracks in the first phase, wherein the at least one confidence score is based on a date of a source material for the input data, and wherein the input data is periodically refreshed to ensure updated information is utilized to generate the at least one confidence score, wherein the at least one confidence score is timestamped, wherein the at least one server platform determines at least one trend of the at least one confidence score, wherein the at least one server platform provides at least insight based on the at least one trend of the at least one confidence score;

wherein during the second phase, under the continuous market analysis track, the at least one server platform continuously collects input data and provide a plurality of recommendations for a minimum viable product (MVP) based on consumer needs, wherein the at least one server platform confirms the at least one market need, and performs a patentability analysis, wherein the at least one server platform uses the web crawler to search for patent and patent applications based on the input data, wherein the results of the patentability analysis are displayed via the GUI, wherein the GUI is customizable and sortable, wherein the GUI sorts displayed patent documents by assignee, by inventors, and/or by publication date based on user input via the GUI, wherein under the innovation track, the at least one server platform provides at least one recommendation for securing or generating new intellectual property to meet the at least one market need with coordination across the other functionality tracks of the plurality of functionality tracks, wherein under the business operations track, the at least one server platform includes documentation and recommendations for establishing corporate framework and legal partnerships, infrastructure, and facilities with coordination across the other functionality tracks, wherein establishing corporate framework includes establishing the management team, and wherein under the marketing and sales track, the at least one server platform develops a marketing and sales strategy and perform an appropriate level of cost/price modeling in coordination with the other functionality tracks of the plurality of functionality tracks, wherein each functionality track of the plurality of functionality tracks of the phase provide information to and gain information from the other functionality tracks of the plurality of functionality tracks using the at least one ruleset and the at least one set of parameters;

wherein the at least one server platform determines if the startup company and/or the plurality of startup companies should continue to the third phase and if the startup company and/or the plurality of startup companies should receive more funding based on the progress of the startup company and/or the plurality of startup companies, whether the startup company and/or the plurality of startup companies has met the plurality of goals and/or the plurality of milestones for the second phase, and if the at least one confidence score is of sufficient value across the plurality of functionality tracks, wherein all functionality tracks of the plurality of functionality tracks of the phase provide information to and gain information from the other tracks using the at least one ruleset and the at least one set of parameters;

wherein during the third phase, under the continuous market analysis track, the at least one server platform continuously compares the MVP to the consumer data, wherein under the innovation track, the at least one server platform provides at least one detailed design and at least one working prototype of the MVP, wherein under the business operations track, the at least one server platform identifies an investor and/or at least one distribution partner based on the input data and in coordination with the other functionality tracks of the plurality of functionality tracks, wherein under the marketing and sales track, the at least one server platform provides marketing and sales input data for the execution plan, wherein the execution plan defines every function necessary to plan the marketing and sales activities in the next phase supporting the plurality of exit thresholds, wherein all functionality tracks of the phase provide information to and gain information from the other functionality tracks of the plurality of functionality tracks using the at least one ruleset and the at least one set of parameters;

wherein the at least one server platform determines if the startup company and/or the plurality of startup companies should continue to the fourth phase and if the startup company and/or plurality of startup companies should receive more funding based on the progress of the startup company and/or plurality of startup companies, whether the startup company and/or the plurality of startup companies has met the plurality of goals and/or the plurality of milestones of the third phase with an acceptable confidence score, wherein all functionality tracks of the plurality of functionality tracks of the phase provide information to and gain information from the other functionality tracks of the plurality of functionality tracks using the at least one ruleset and the at least one set of parameters;

wherein during the fourth phase, under the continuous market analysis track, the at least one server platform monitors competition and prioritize the MVP, wherein under the innovation track, the at least one server platform confirms MVP readiness and to initiate full rate manufacturing and launch to market, wherein under the business operations track, the at least one server platform includes monitoring of at least one sales goal, providing at least one recommendation for creating a distribution chain, and providing employee support training documentation, and wherein under the marketing and sales track, the at least one server platform provides a plurality of recommendations for marketing and selling the MVP, wherein each functionality track of the plurality of functionality tracks are coordinated to ensure a successful transition to product delivery;

wherein across all phases of the management system, the at least one server platform further includes at least one enterprise tool, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool collects input data related to the startup company's and/or plurality of startup companies' technology and activity without reformatting or receiving manually inputted data, wherein the at least one enterprise tool receives the input data via the GUI, wherein the at least one enterprise tool automatically transmits the pre-normalized input data to the logic engine;

wherein the at least one server platform further includes a process and asset library, wherein the process and asset library includes all documentation, data, protocols, and tools for the management system, wherein the at least one server platform receives user input to search the data stored in the process and asset library via the GUI, wherein the at least one server platform displays the process and asset library data based on the user input via the GUI;

wherein the documentation includes templates, supplemental process, procedures and other documents needed to maintain consistency throughout the management system, wherein each protocol, method and template automatically generates quantifiable data elements, wherein the documentation further enables the management system to be used for a plurality of startup companies;

wherein the logic engine includes a market engine, an innovation discovery engine, a reporting engine, and an artificial intelligence engine, wherein the logic engine includes methods to model, manage, and measure all data of the management system, wherein the logic engine assesses the startup company and/or the plurality of startup companies as the startup company and/or the plurality of startup companies progresses through each phase, wherein the logic engine is designed to streamline the management system to automatically generate normalized, useful data to provide insights and alerts across the plurality of functionality tracks for the startup company and/or for the plurality of startup companies, wherein the alerts are sent in an email and displayed via at least one of the plurality of dashboards, wherein the alerts include a plurality of levels of alerts, wherein the market engine includes a collection and recording system, an augmentation engine, at least one confidence factor, and at least one algorithm;

wherein the innovation discovery engine includes an idea engine, a technology introduction form, an initialization proposal, a viability assessment, and an innovation library, wherein the innovation library receives the input data via the web mining tool, wherein the idea engine uses the web crawler to identify technologies via network based communication, wherein the idea engine is transfers information to the innovation library via network communication, wherein the technology introduction form receives the startup data, wherein the innovation discovery engine determines if the startup data should be analyzed further based on the initialization proposal, wherein the startup data is transferred to the initialization proposal, wherein the initialization proposal includes questions that automatically collect pre-normalized data and scoreable data, wherein the initialization proposal data is scored by the artificial intelligence engine, and wherein the score is stored in the innovation library;

wherein the artificial intelligence engine includes scoring logic, nominations, web mining, application interfaces, and data trends based on the input data, wherein the input data includes startup data from at least one different startup company;

wherein the at least one server platform creates on-demand and auto-generated insights, alerts, and reports;

wherein the auto-generated insights include resource utilization, phase progress, market opportunities and threats, startup valuation with confidence factors, trends, forecasts and projections for at least one phase of the startup company and/or across the plurality of startup companies;

wherein the alerts, insights, reports, and the at least one confidence score are displayed via the GUI, wherein the GUI is updated in real-time to provide real-time status of the startup company;

wherein updates to the GUI are communicated in real-time via email or text message;

wherein the GUI provides for toggling between documents in real-time;

wherein the GUI further provides live video teleconferencing through a third-party application, and wherein recorded video, audio, and transcripts from the live video teleconferencing are saved by the at least one server platform;

wherein the GUI receives an assignment input in real-time, wherein the assignment input includes at least one new assignment for the management team and/or the startup company's and/or plurality of startup companies' employees to improve the startup company's and the plurality of startup companies' performance;

wherein the artificial intelligence engine continuously receives, monitors and models all data received and outputted by the system, wherein the artificial intelligence engine uses the modeled data to provide a recommendation for each functionality track of the plurality of functionality tracks and/or phase to lower the risk, cost, or time associated with the success of the startup company and the plurality of startup companies, wherein the web mining tool is trained to mine data related to the startup company and the plurality of startup companies;

wherein the web mining tool is trained to interact with a nomination engine;

wherein the artificial intelligence engine analyzes time-based trends against baselines to identify anomalies, repetitive error, performance of decisions of the management team, miscalculation, and areas of manual override to nominate opportunities and risks to an organization or across organizations in a sector;

wherein the nomination engine generates a notification and posts the notification to at least one dashboard of the plurality of dashboards;

wherein the nomination engine creates a task for the web mining tool to collect information to fill a void and nominate the information for acceptance or rejection;

wherein the artificial intelligence engine receives input data from the management team, wherein the artificial intelligence stores the management team input, wherein the artificial intelligence engine modifies the scoring logic, nominations, application interfaces, and data trends based on the management team input;

wherein the artificial intelligence engine receives an acceptance or a rejection of the nomination;

wherein the artificial intelligence engine uses the acceptance or the rejection and the management team input as a training set for a future nomination by the artificial intelligence engine;

wherein the artificial intelligence engine provides predictive analysis impacts of decisions across the plurality of functionality tracks in numerical, textual, and graphical presentations and further provides multi-path decision indexing showing multiple paths for tradeoffs based on the training of the artificial intelligence engine;

wherein the artificial intelligence engine is trained based on the identified anomalies, the identified repetitive error, the identified performance of decisions of the management team, the identified miscalculation, and the identified areas of manual override to nominate opportunities and risks to an organization or across organizations in a sector;

wherein the artificial intelligence engine uses machine learning to train the web mining tool based on the management team input to identify technology for the startup company;

wherein the at least one server platform characterizes the risk and confidence of the startup company and/or the plurality of startup companies based on the alerts, insights and reports;

and wherein the artificial intelligence engine includes a plurality of trade-offs of cost, risk, and time against the key areas of management, innovation, marketing and sales, and continuous market analysis as well as across phases within the startup company and/or the plurality of startup companies.

2. The system of claim 1, wherein the system to reduces the risk of at least one common point of failure for the startup company and/or the plurality of startup companies with a particular emphasis on the pitfalls routinely encountered by startup companies, wherein the startup company and/or the plurality of startup companies include early stage companies, spinoff companies, newly merged companies, a new division of a company and/or a company directed to creating and bringing a breakthrough, innovative technology to market.

3. The system of claim 1, wherein the system further provides for a risk mitigating, repeatable, stage-gated process regulated by governance.

4. The system of claim 1, wherein the system automatically produces and harvests inherently normalized data, wherein the at least one server platform uses the normalized data for a plurality of startup companies.

5. The system of claim 1, wherein the system further includes a plurality of backend data enhancement and management decision aids.

6. The system of claim 1, wherein the system further includes automated machine learning and artificial intelligence methods, wherein the automated machine learning and artificial intelligence methods are trained to enhance and improve the management system.

7. The system of claim 1, wherein the system performs automatic quantitative assessment of opportunities and risks based on a plurality of confidence factors.

8. A commercialization method for end-to-end management and execution of starting, building, and launching a startup company or simultaneously launching a plurality of startup companies that confidently yields a more robust, more consistent, and more profitable product for investors with less investment, higher likelihood of success, and in less time than other methods, comprising:

receiving input data via at least one server platform from at least one remote device, a web crawler, a web mining tool, a graphical user interface (GUI), and/or at least one database, wherein the at least one server platform is in network communication with the at least one remote device, the web crawler, the web mining tool, and the at least one database, wherein the at least one server platform includes memory, a processor, a logic engine, at least one enterprise tool, at least one ruleset, at least one set of parameters, an application interface, and a process and asset library, wherein the logic engine includes a market engine, an innovation discovery engine, a reporting engine, and an artificial intelligence engine, wherein the market engine includes a collection and recording system, an augmentation engine, at least one confidence factor, and at least one algorithm, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool collects input data related to the startup company's technology and activity without reformatting or receiving manually inputted data, wherein the input data includes structured data and unstructured data, wherein the input data includes management data, intellectual property data, market data, innovation data, financial data, future sales data, time data, consumer data, social media data, and product data, wherein the input data further includes conference notes and published research papers, wherein the web crawler automatically generates the input data, wherein the input data is updated in real-time, wherein the at least one set of parameters and the at least one ruleset include focused and repeatable metrics for the startup company and/or the plurality of startup companies to reduce risk, cost, and time to achieve success;

creating a management system via the at least one server platform, wherein the management system is designed to lower risk, improve capital resource efficiency and reduce time to launch, wherein the management system includes a first phase, a second phase, a third phase, and a fourth phase, wherein each phase include predictive and classical analysis with a plurality of entry thresholds and a plurality of exit thresholds to achieve business success, wherein the management system further includes an infrastructure, wherein the infrastructure includes a plurality of functionality tracks, wherein the plurality of functionality tracks includes a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time, wherein the plurality of goals is further designed to keep the startup company and/or the plurality of startup companies on track to meet the plurality of exit thresholds, wherein the management system includes a management summary, wherein the management summary is displayed via the GUI, wherein the management summary includes summary data on the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or plurality of startup companies, wherein the plurality of entry thresholds and plurality of exit thresholds must be met before moving to the next phase, wherein under the continuous market analysis track, the at least one server platform continuously samples, researches, and determines market and consumer needs, create and refine a product concept, and provide a plurality of recommendations to identify and maintain a representative customer base based on the input data, and develop and maintain a customer base based on the input data, wherein under the innovation track, the at least one server platform assesses the startup company's and/or plurality of startup companies' technology and develop a truly unique, "one-of-one" solution, wherein the one-of-one solution is directed to meet unfulfilled or underserviced market pain points and address a societal need, wherein under the business operations track, the at least one server platform is directed to incrementally staged project and business management functions, wherein the at least one server platform identifies identify potential business partnerships, creates a production and supply strategy, determines the cost efficiency of manufacturing, and provides a plurality of financial management recommendations and projections related to the startup company's and/or plurality of startup companies' market and technology, wherein the at least one server platform further creates a pricing model for the startup company's technology, wherein the pricing model is based on at least one factor, wherein the at least one factor includes cost to recapitalize initial product development, long range sales support, product improvement, testing to assess readiness, required regulatory compliance, manufacturing, supply chain, business operations, documentation and training, and staffing, wherein the at least one server platform receives user input to change the at least one factor via the GUI, wherein the at least one server platform analyzes and displays how the change of the at least one factor affects the pricing model, wherein under the marketing and sales track, the at least one server platform plans a product lifecycle and at least one early revenue generating action, wherein the at least one server platform performs risk identification routines and generate alerts related to competition, wherein the management system analyzes the future needs based on the input data and the related needs for the startup company and/or the plurality of startup companies in the current phase;

transforming the input data to pre-normalized, standard, consistent time-stamped data; wherein the at least one enterprise tool automatically transmits the pre-normalized input data to the logic engine;

automatically generating quantifiable data elements via the process and asset library, wherein the process and asset library includes all documentation, data, protocols and tools for the management system, wherein the at least one server platform receives user input to search the data stored in the process and asset library via the GUI, wherein the at least one server platform displays the process and asset library data based on the user input via the GUI, wherein the documentation includes templates, supplemental process, procedures and other documents needed to maintain consistency throughout the management system, wherein each protocol, method and template automatically generates quantifiable data elements, wherein the documentation further enables the management system to be used for a plurality of startup companies, wherein the at least one server platform generates a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track;

identifying technology data via the web crawler;

providing the input data to the innovation discovery engine via network communication, wherein the innovation discovery engine includes an idea engine, a technology introduction form, an initialization proposal, a viability assessment, and an innovation library, wherein the innovation library receives the input data via the web mining tool;

receiving the startup data via the technology introduction form;

determining whether to further analyze the startup based on the technology introduction form;

transmitting data to the initialization proposal, wherein the initialization proposal includes questions that automatically collect pre-normalized data and scoreable data automatically collecting pre-normalized data and scoreable data via the initialization proposal;

scoring the initialization proposal data via an artificial intelligence engine, wherein the artificial intelligence engine includes scoring logic, nominations, web mining, and data trends based on the input data, wherein the input data includes startup data from at least one different startup company;

generating a plurality of goals and a plurality of milestones for each phase, wherein the plurality of goals is designed to limit risk;

prioritizing at least one functionality track of the plurality of functionality tracks based on the input data for each functionality track of the plurality of functionality tracks;

tracking the amount of time spent for each functionality track of the plurality of functionality tracks;

tracking a progress of each phase;

generating at least one confidence score for the input data and for a progress of the startup company and/or the plurality of startup companies, wherein the at least one confidence score indicates the risk of the startup company and/or the plurality of startup companies, wherein the at least one server platform records and timestamps the input data and the at least one confidence score during and after the startup company and/or the plurality of startup companies progresses through a phase for analysis;

creating a management team and performing automatic assessment of the startup and/or the plurality of startup companies, wherein the at least one server platform provides at least one recommendation for the management team, wherein the management team comprises only nonemployees of the startup company, wherein the management system is designed so the members of the management team will transition to only the startup company's and/or the plurality of startup companies' employees by the end of fourth phase, wherein the at least one server platform receives input from the management team based on the at least one recommendation, wherein the management team input includes feedback on the at least one recommendation, wherein the at least one server platform records the management team input, wherein the at least one server platform analyzes and adjusts the at least one recommendation based on the management team input, assessing a market need via the at least one server platform under the continuously market analysis track, wherein the at least one server platform assesses the impact of the market need on the other functionality tracks of the plurality of functionality tracks, wherein the at least one server platform devises the one-of-one solution with associated tradeoffs to allow for coordination with the other functionality tracks of the plurality of functionality tracks;

framing an execution plan under the business operations track via the at least one server platform;

creating a pricing plan under the marketing and sales track via the at least one server platform, wherein the at least one server platform creates a pricing plan in coordination with the other functionality tracks of the plurality of functionality tracks, wherein information is received by the at least one server platform under all functionality tracks of the plurality of functionality tracks of the phase, wherein the at least one server platform analyzes the data for each functionality track of the plurality of functionality tracks based on the at least one ruleset and the at least one set of parameters, wherein each functionality track of the plurality of functionality tracks incorporates data captured during other the functionality tracks of the plurality of functionality tracks;

determining if the startup should proceed to the second phase, wherein the at least one server platform determines if the startup company and/or the plurality of startup companies should receive more funding based on the progress of the startup company and/or the plurality of startup companies, whether the startup company and/or the plurality of startup companies has met the plurality of goals and/or the plurality of milestones for the first phase, and whether the at least one confidence score is acceptable, wherein the plurality of goals, plurality of milestones, and the at least one confidence score are based on the data captured during the plurality of functionality tracks in the first phase, wherein the at least one confidence score is based on a date of a source material for the input data, and wherein the input data is periodically refreshed to ensure updated information is utilized to generate the at least one confidence score, wherein the at least one confidence score includes a time-stamp, wherein the at least one server platform determines at least one trend of the at least one confidence score, wherein the at least one server platform provides at least insight based on the at least one trend of the at least one confidence score;

providing a plurality of recommendations for a minimum viable product (MVP) based on consumer needs from continuously collected input data via the at least one server platform under the continuous market analysis track;

confirming the market need via the at least one server platform under the continuous market analysis track;

performing patentability analysis via the at least one server platform under the continuous market analysis track, wherein the at least one server platform uses the web crawler to search for patent and patent applications based on the input data, wherein the results of the patentability analysis are displayed via the GUI, wherein the GUI is customizable and sortable, wherein the GUI sorts displayed patent documents by assignee, by inventors, and/or by publication date based on user input via the GUI;

providing at least one recommendation for securing or generating new intellectual property to meet the market need under the innovation track with coordination across the other functionality tracks of the plurality of functionality tracks;

establishing corporate framework and legal partnerships, infrastructure and facilities under the business operations tracks with coordination across the other functionality tracks of the plurality of functionality tracks, wherein the at least one server platform includes documentation and a plurality of recommendations for establishing the corporate framework and legal partnerships, infrastructure, and facilities, wherein establishing corporate framework includes establishing the management team;

developing a marketing and sales strategy under the marketing and sales track, wherein the at least one server platform develops a marketing and sales strategy and perform an appropriate level of cost/price modeling with the other functionality tracks of the plurality of functionality tracks, wherein all functionality tracks of the plurality of functionality tracks of the phase provide information to and gain information from the other functionality tracks of the plurality of functionality tracks;

determining if the startup company and/or the plurality of startup companies should continue to the third phase and if the startup company and/or the plurality of startup companies should receive more funding based on the progress of the startup company and/or the plurality of startup companies, whether the startup company has met the plurality of goals and/or the plurality of milestones for the second phase, and whether the at least one confidence score is acceptable, wherein the plurality of goals, the plurality of milestones, and the at least one confidence score are based on the plurality of functionality tracks in the during phase;

comparing the MVP to the consumer data via the at least one server platform under the continuous market analysis track;

providing at least one detailed design and at least one working prototype of the MVP under the innovation track via the at least one server platform;

identifying at least one investor and/or at least one distribution partner based on the input data and in coordination with the other functionality tracks of the plurality of functionality tracks;

defining the execution plan via the at least one server platform under the marketing and sales track, wherein the execution plan defines every function necessary to plan the marketing and sales activities in the next phase supporting the plurality of exit thresholds, wherein all functionality tracks of the phase provide information to and gain information from the other functionality tracks using the at least one ruleset and/or the at least one set of parameters;

determining if the startup company and/or the plurality of startup companies should continue to the fourth phase and if the startup company should receive more funding via the at least one server platform based on the progress of the startup company and/or the plurality of startup companies, and whether the startup company and/or the plurality of startup companies has met the plurality of goals and/or the plurality of milestones of the third phase with an acceptable at least one confidence score;

monitoring competition and prioritizing the MVP via the at least one server platform under the continuous market analysis track;

determining if the MVP is ready for full rate manufacturing and launch to market via the at least one server platform under the innovation track;

monitoring of at least one sales goal, providing at least one recommendation for creating a distribution chain and providing employee support training documentation via the at least one server platform under the business operations track;

providing a plurality of recommendation for marketing and selling the MVP via the at least one server platform under the marketing and sales track, wherein the plurality of functionality tracks are coordinated to ensure a successful transition to product delivery;

monitoring competition, prioritizing the MVP, finalizing the MVP for launch to market, executing and monitoring sales goals, creating a distribution chain, providing employee training and selling the MVP during the fourth phase;

creating on-demand and auto-generated insights, alerts and reports for each phase and functionality track of the plurality of functionality tracks, wherein the auto-generated insights include resource utilization, phase progress, market opportunities and threats, startup valuation with confidence factors, trends, forecasts and projections for at least one phase of the startup company and/or across the plurality of startup companies, wherein the alerts are sent in an email and displayed via at least one of the plurality of dashboards, wherein the alerts include a plurality of levels of alerts;

displaying the alerts, the insights, the reports, and the at least one confidence score via the GUI, wherein the GUI is updated in real-time to provide real-time status of the startup company and/or the plurality of startup companies, wherein updates to the GUI are communicated in real-time via email or text message, wherein the GUI provides for toggling between documents in real-time, wherein the GUI receives an assignment input in real-time, wherein the assignment input includes at least one new assignment for the management team, the startup company's employees and/or the plurality of startup companies' employees to improve the startup company's and/or the plurality of startup companies' performance, wherein the GUI further provides live video teleconferencing through a third party application, and wherein recorded video, audio, and transcripts from the live video teleconferencing are saved by the at least one server computer;

monitoring and modeling all data received and outputted by the at least one server platform via the artificial intelligence engine, wherein the artificial intelligence engine includes a plurality of trade-offs of cost, risk, and time against the key areas of management, innovation, marketing and sales, and continuous market analysis as well as across phases within the startup company and the plurality of startup companies;

providing a recommendation via the artificial intelligence engine based on the modeled data for each functionality track of the plurality of functionality tracks and/or phase to improve the management system to lower the risk, cost, and time associated with the success of the startup company;

training the web mining tool to mine data related to the startup company and the plurality of startup companies, wherein the web mining tool is trained to interact with a nomination engine, wherein the artificial intelligence engine analyzes time-based trends against baselines to identify anomalies, repetitive error, performance of decisions of the management team, miscalculation, and areas of manual override to nominate opportunities and risks to an organization or across organizations in a sector, wherein the nomination engine generates a notification and posts the notification to at least one dashboard of the plurality of dashboards, wherein the nomination engine creates a task for the web mining tool to collect information to fill a void and nominate the information for acceptance or rejection, wherein the artificial intelligence engine receives input data from the management team, wherein the artificial intelligence stores the management team input, wherein the artificial intelligence engine modifies the scoring logic, nominations, application interfaces, and data trends based on the management team input, wherein the artificial intelligence engine receives an acceptance or a rejection of the nomination, wherein the artificial intelligence engine uses the acceptance or the rejection and the management team input as a training set for a future nomination by the artificial intelligence engine, wherein the artificial intelligence engine is trained by the training set, wherein the artificial intelligence engine provides predictive analysis impacts of decisions across the plurality of functionality tracks in numerical, textual, and graphical presentations and further provides multi-path decision indexing showing multiple paths for tradeoffs based on the training of the artificial intelligence engine, wherein the artificial intelligence engine is trained based on the identified anomalies, the identified repetitive error, the identified performance of decisions of the management team, the identified miscalculation, and the identified areas of manual override to nominate opportunities and risks to an organization or across organizations in a sector, wherein the artificial intelligence engine uses machine learning to train the web mining tool based on the management team input to identify technology for the startup company; and characterizing the risk and confidence of the startup and/or plurality of startup companies based on the alerts, insights and reports.

9. The method of claim 8, further including reducing risk of at least one common point of failure for the startup company and/or the plurality of startup companies, wherein the startup company and/or the plurality of startup companies include early stage companies, spinoff companies, newly merged companies, a new division of a company and/or a company directed to creating and bringing a breakthrough, innovative technology to market.

10. The method of claim 8, wherein the method provides a risk mitigating, repeatable, stage-gated process regulated by governance.

11. The method of claim 8, further including automatically producing and harvesting inherently normalized data, wherein the at least one server platform uses the normalized data for a plurality of startup companies.

12. The method of claim 8, wherein the management system further includes a plurality of backend data enhancement and management decision aids.

13. The method of claim 8, further comprising automated machine learning and artificial intelligence methods, wherein the automated machine learning and artificial intelligence methods are trained to enhance and improve the management system.

14. The method of claim 8, wherein the management system performs automatic quantitative assessment of opportunities and risks based on a plurality of confidence factors.

15. A system for providing an end to end, systematic, and repeatable approach for starting, building, and launching a single startup company or simultaneously launching a plurality of startup companies comprising:
  at least one server platform including memory, a processor, a logic engine; and
  at least one remote device including a graphical user interface (GUI);
  wherein the at least one server platform includes at least one set of parameters and at least one ruleset, wherein the at least one set of parameters and the at least one ruleset include focused and repeatable metrics for the single startup company and/or the plurality of startup companies to reduce risk, cost, and time to achieve success;
  wherein the at least one server platform includes a web crawler, a web mining tool, an application interface, and at least one database accessible via network communication;
  wherein the at least one server platform receives input data from the at least one remote device, the web crawler, the web mining tool and/or the at least one database via network communication, wherein the input data includes structured data and unstructured data, wherein the input data includes management data, intellectual property data, market data, innovation data, financial data, future sales data, time data, consumer data, social media data, and product data, wherein the input data further includes conference notes and published research papers;

wherein the web crawler automatically generates the input data;

wherein the input data is updated in real-time or near real-time;

wherein the at least one server platform transforms the input data to pre-normalized, standard, consistent, time-stamped input data;

wherein the at least one server platform includes a management system, wherein the management system includes a first phase, a second phase, a third phase, and a fourth phase, wherein each phase includes continuous, predictive, and classical analysis with a plurality of entry thresholds and a plurality of exit thresholds to achieve business success, wherein the plurality of entry thresholds and plurality of exit thresholds must be met before moving to the next phase;

wherein the management system further includes an infrastructure, wherein the infrastructure is separated into a plurality of functionality tracks, wherein the plurality of functionality tracks include a continuous market analysis track, an innovation track, a business operations track, and a marketing and sales track, wherein each functionality track of the plurality of functionality tracks includes a plurality of goals and a plurality of milestones for each phase, wherein the plurality of goals is designed to limit risk, cost, and time and is designed to keep the startup company and/or the plurality of startup companies on track to meet the plurality of exit thresholds;

wherein the at least one server platform includes a management summary, wherein the management summary is displayed via the GUI, wherein the management summary includes summary data corresponding to each functionality track of the plurality of functionality tracks within the current phase of the management system based on the input data, wherein the management summary enables changes to be made to at least one functionality track of the plurality of functionality tracks to lower risk, improve capital resource efficiency, and reduce time to launch the startup company and/or the plurality of startup companies;

wherein the management system includes analysis of future needs based on the input data and the related needs of the startup company and/or the plurality of startup companies in its current phase;

wherein under the continuous market analysis track, the at least one server platform continuously samples, researches, and determines market and consumer needs, create and refine a product concept, and provide a plurality of recommendations to identify and maintain a representative customer base based on the input data;

wherein under the innovation track, the at least one server platform assesses the startup company's technology and develop a truly unique, "one-of-one" solution, wherein the "one-of-one solution" is directed to meet unfulfilled or underserviced market pain points and address a societal need;

wherein under the business operations track, the at least one server platform is directed to incrementally staged project and business management functions, wherein the at least one server platform identify identifies potential business partnerships, creates a production and supply strategy, determines the cost efficiency of manufacturing, and provides a plurality of financial management recommendations and projections related to the startup company's and/or the plurality of startup companies' market and technology, wherein the at least one server platform further creates a pricing model for the startup company's technology, wherein the pricing model is based on at least one factor, wherein the at least one factor includes cost to recapitalize initial product development, long range sales support, product improvement, testing to assess readiness, required regulatory compliance, manufacturing, supply chain, business operations, documentation and training, and staffing, wherein the at least one server platform receives user input to change the at least one factor via the GUI, wherein the at least one server platform analyzes and displays how the change of the at least one factor affects the pricing model;

wherein under the marketing and sales track, the at least one server platform plans a product lifecycle and at least one early revenue generating action, wherein the at least one server platform performs risk identification routines, and generate alerts related to competition;

wherein the at least one server platform generates a plurality of outputs, wherein the plurality of outputs support risk quantification, wherein the plurality of outputs further support control of risk, cost, and time through a plurality of tradeoffs in the continuous market analysis track, the innovation track, the business operations track, and the marketing and sales track, wherein the plurality of tradeoffs includes limitations imposed by at least one functionality track on a different functionality track of the plurality of functionality tracks;

wherein the management system prioritizes at least one functionality track based on the input data for each functionality track of the plurality of functionality tracks;

wherein the at least one server platform tracks a progress of each phase;

wherein the progress of each phase is displayed via the GUI;

wherein the at least one server platform tracks the amount of time spent for each functionality track of the plurality of functionality tracks;

wherein the at least one server platform generates at least one confidence score for the input data and for a progress of the startup company and/or the plurality of startup companies, wherein the at least one confidence score indicates the risk of the startup company and/or the plurality of startup companies, wherein the at least one server platform record and timestamps the input data and the at least one confidence score during and after the startup company and/or the plurality of startup companies progresses through a phase for analysis;

wherein the first phase includes creating a management team and performing automatic assessment of the startup company and/or the plurality of startup companies, wherein the at least one server platform provides at least one recommendation for the management team, wherein the management team comprises only nonemployees of the startup company, wherein the management system is designed so the members of the management team will transition to only startup company employees by the end of fourth phase, wherein the at least one server platform receives input from the management team based on the at least one recommendation, wherein the management team input includes feedback on the at least one recommendation, wherein the at least one server platform records the management team input, wherein the at least one server platform analyzes and adjusts the at least one recommendation based on the management team input, wherein under the continuous market analysis track, the at least one server platform assesses at least one market need and at least one impact to the other functionality tracks based on the at least one market need, wherein under the innovation track, the at least one server platform devises the one-of-one solution with associated tradeoffs to allow for coordination with the other functionality tracks of the plurality of functionality tracks, wherein under the business operations track, the at least one server platform frames an execution plan with manufacturing and design considerations in coordination with the other tracks, and wherein under the marketing and sales track, the at least one server platform creates a pricing plan in coordination with the other functionality tracks of the plurality of functionality tracks, wherein all functionality tracks of the plurality of functionality tracks of the phase provide information to the at least one server platform, wherein the at least one server platform analyzes the data for each functionality track of the plurality of functionality tracks based on the at least one ruleset and the at least one set of parameters, wherein each functionality track of the plurality of functionality tracks incorporates data captured during other functionality tracks of the plurality of functionality tracks;

wherein the at least one server platform determines if the startup company and/or the plurality of startup companies should proceed to the second phase, wherein the at least one server platform determines if the startup company and/or plurality of startup companies should receive more funding based on the progress of the startup company and/or the plurality of startup companies, whether the startup company and/or the plurality of startup companies has met the plurality of goals and/or the plurality of milestones for the first phase, and whether the at least one confidence score are acceptable, wherein the plurality of goals, the plurality of milestones, and the at least one confidence score is based on data captured during the plurality of functionality tracks in the first phase, and wherein the at least one confidence score is based on a date of source material for the input data, and wherein the input data is periodically refreshed to ensure updated information is utilized to generate the at least one confidence score, wherein the at least one confidence score is time-stamped, wherein the at least one server platform determines at least one trend of the at least one confidence score, wherein the at least one server platform provides at least insight based on the at least one trend of the at least one confidence score;

wherein during the second phase, under the continuous market analysis track, the at least one server platform continuously collects data and provides a plurality of recommendations for a minimum viable product (MVP) based on consumer needs, wherein the at least one server platform confirms the market need, and perform a patentability analysis, wherein the at least one server platform uses the web crawler to search for patent and patent applications based on the input data, wherein the results of the patentability analysis are displayed via the GUI, wherein the GUI is customizable and sortable, wherein the GUI sorts displayed patent documents by assignee, by inventors, by publication date based on user input via the GUI, wherein under the innovation track, the at least one server platform provides at least one recommendation for securing or generating new intellectual property to meet the market need with coordination across the other functionality tracks of the plurality of functionality tracks, wherein under the business operations track, the at least one server platform includes documentation and recommendations for establishing corporate framework and legal partnerships, infrastructure, and facilities with coordination across the other functionality tracks, wherein establishing corporate framework includes establishing the management team, and wherein under the marketing and sales track, the at least one server platform develops a marketing and sales strategy and perform an appropriate level of cost/price modeling in coordination with the other functionality tracks of the plurality of functionality tracks, wherein each functionality track of the plurality of functionality tracks of the phase provide information to and gain information from the other functionality tracks of the plurality of functionality tracks using the at least one ruleset and the at least one set of parameters;

wherein the at least one server platform determines if the startup company and/or the plurality of startup companies should continue to the third phase and if the startup company and/or the plurality of startup companies should receive more funding based on the progress of the startup company and/or the plurality of startup companies, whether the startup company and/or the plurality of startup companies has met the plurality of goals and/or the plurality of milestones for the second phase, and if at least one confidence score is of sufficient value across the plurality of functionality tracks, wherein all functionality tracks of the plurality of functionality tracks of the phase provide information to and gain information from the other tracks using the at least one ruleset and the at least one set of parameters;

wherein during the third phase, under the continuous market analysis track, the at least one server platform continuously compares the MVP to the consumer data, wherein under the innovation track, the at least one server platform provides at least one detailed design and at least one working prototype of the MVP, wherein under the business operations track, the at least one server platform identify identifies an investor and/or at least one distribution partner based on the input data and in coordination with the other functionality tracks of the plurality of functionality tracks, wherein under the marketing and sales track, the at least one server platform defines the execution plan, wherein the execution plan defines every function necessary to plan the marketing and sales activities in the next phase supporting the plurality of exit thresholds, wherein all functionality tracks of the phase provide information to and gain information from the other functionality tracks of the plurality of functionality tracks using the at least one ruleset and the at least one set of parameters;

wherein the at least one server platform determines if the startup company and/or the plurality of startup companies should continue to the fourth phase and if the startup company and/or plurality of startup companies should receive more funding based on the progress of the startup company and/or plurality of startup companies, whether the startup company and/or the plurality of startup companies has met the plurality of goals and/or the plurality of milestones of the third phase with an acceptable confidence score, wherein all functionality tracks of the plurality of functionality tracks of the phase provide information to and gain information from the other functionality tracks of the plurality of functionality tracks using the at least one ruleset and the at least one set of parameters;

wherein during the fourth phase, under the continuous market analysis track, the at least one server platform monitors competition and prioritizes the MVP, wherein under the innovation track, the at least one server platform determines if the MVP is ready for full rate manufacturing and launch to market, wherein under the business operations track, the at least one server platform includes monitoring of at least one sales goal, providing at least one recommendation for creating a distribution chain, and providing employee support training documentation, and wherein under the marketing and sales track, the at least one server platform provides a plurality of recommendations for marketing and selling the MVP, wherein each functionality track of the plurality of functionality tracks are coordinated to ensure a successful transition to product delivery;

wherein across all phases of the management system, the at least one server platform further includes at least one enterprise tool, wherein the at least one enterprise tool includes a word processing tool, a spreadsheet tool, a product development tool, a product delivery tool, a product test tool, a product support group tool, a data entry tool, a presentation tool, and an analytics tool, wherein the at least one enterprise tool collects input data related to the startup company's and/or plurality of startup companies' technology and activity without reformatting or receiving manually inputted data, wherein the at least one enterprise tool receives data via the GUI, wherein the at least one enterprise tool automatically transmits the pre-normalized input data to the logic engine;

wherein the at least one server platform further includes a process and asset library, wherein the process and asset library includes all documentation, data, protocols, and tools for the management system, wherein the at least one server platform receives user input to search the data stored in the process and asset library via the GUI, wherein the at least one server platform displays the process and asset library data based on the user input via the GUI;

wherein the documentation includes templates, supplemental process, procedures and other documents needed to maintain consistency throughout the management system, wherein each protocol, method and template automatically generates quantifiable data elements, wherein the documentation further enables the management system to be used for a plurality of startup companies;

wherein the logic engine includes a market engine, an innovation discovery engine, a reporting engine, and an artificial intelligence engine, wherein the logic engine is designed to streamline the management system to automatically generate normalized, useful data to provide insights and alerts across the plurality of functionality tracks for the startup company and/or for the plurality of startup companies, wherein the alerts are sent in an email and displayed via at least one of the plurality of dashboards, wherein the alerts include levels of alerts, wherein the market engine includes a collection and recording system, an augmentation engine, at least one confidence factor, and at least one algorithm;

wherein the innovation discovery engine includes an idea engine, a technology introduction form, an initialization proposal, a viability assessment, and an innovation library, wherein the innovation library receives the input data via the web mining tool, wherein the idea engine uses the web crawler to identify technologies via network based communication, wherein the idea engine provides information to the innovation library via network communication, wherein the technology introduction form receives the startup data, wherein the innovation discovery engine determines if the startup data should be analyzed further based on the initialization proposal, wherein the startup data is transferred to the initialization proposal, wherein the initialization proposal includes questions that automatically collect pre-normalized data and scoreable data, wherein the initialization proposal data is scored by the artificial intelligence engine, and wherein the score is stored in the innovation library;

wherein the artificial intelligence engine includes scoring logic, nominations, web mining, application interfaces, and data trends based on the input data, wherein the input data includes startup data from at least one different startup company;

wherein the at least one server platform creates on-demand and auto-generated insights, alerts, and reports;

wherein the auto-generated insights include resource utilization, phase progress, market opportunities and threats, startup valuation with confidence factors, trends, forecasts and projections for at least one phase of the startup company and/or across the plurality of startup companies;

wherein the alerts, insights, reports, and the at least one confidence score are displayed via the GUI, wherein the GUI is updated in real-time to provide real-time status of the startup company, wherein updates to the GUI are communicated in real-time via email or text message, wherein the GUI provides for toggling between documents in real-time;

wherein the GUI includes a plurality of dashboards, wherein the plurality of dashboards include a dashboard for each startup of the plurality of startup companies, wherein the plurality of dashboards further includes a dashboard for each phase and a CEO dashboard, wherein each phase dashboard includes data related to the plurality of goals, the plurality of milestones, the plurality of entry thresholds, the plurality of exit thresholds, early risk identification alerts, an algorithmic interpretation of a real-time management system status that is automatically generated in the management system as a byproduct of each phase and the plurality of functionality tracks, and cross management system integrated data analysis, wherein the CEO dashboard includes key pieces of data for the startup company and/or the plurality of startup companies, wherein the key pieces of data for the startup company and/or the plurality of startup companies include a rollup of all startup company risk and phase status, cross startup company personnel resourcing, capital financing status, and innovation status, wherein the rollup of all startup company risk and phase status includes data for all positions at the startup company and/or the plurality of startup companies to enable the management team to consider impacts across the entire startup company and/or the plurality of startup companies, wherein the dashboard for the startup company and/or the plurality of startup companies includes the current phase of the startup company and/or the plurality of startup companies, the amount of funds allocated to the startup company and/or the plurality of startup companies, the amount of funds expended by the startup company and/or the plurality of startup companies, alerts, spending by each functionality track of the plurality of functionality tracks for the startup company and/or the plurality of startup companies, the progress of the startup company and/or the plurality of startup companies towards the plurality of goals and the plurality of milestones, and the pricing model for the startup company and/or the plurality of startup companies;

wherein the GUI further provides live video teleconferencing through a third-party application, and wherein recorded video, audio, and transcripts from the live video teleconferencing are saved by the at least one server platform;

wherein the GUI receives an assignment input in real-time, wherein the assignment input includes at least one new assignment for the management team and/or the startup company's and/or plurality of startup companies' employees to improve the startup company's and the plurality of startup companies' performance;

wherein the GUI displays all data defined by the at least one ruleset and the at least one set of parameters;

wherein the GUI displays data based on a user's position in the startup company, the plurality of the startup companies, and/or the management team, wherein the GUI enables the management team to make and distribute decisions for the startup and/or the plurality of startup companies, wherein the GUI allows the management team to analyze a startup company and the plurality of startup companies for each functionality track of the plurality of functionality tracks, each phase, and all activities occurring in each functionality track of the plurality of functionality tracks and each phase;

wherein the GUI is driven by the at least one ruleset, the at least one set of parameters, and the logic engine to create a real-time dynamic feedback loop to enable the management team to consider all aspects of the entire startup company and/or the plurality of startup companies before providing at least one recommendation for the startup company and/or the plurality of the startup companies;

wherein the artificial intelligence engine continuously receives, monitors and models all data received and outputted by the system, wherein the artificial intelligence engine uses the modeled data to provide a recommendation for each functionality track of the plurality of functionality tracks, phase and the GUI to lower the risk, cost, or time associated with the success of the startup company and the plurality of startup companies;

wherein the web mining tool is trained to mine data related to the startup company and the plurality of startup companies;

wherein the web mining tool is trained to interact with a nomination engine;

wherein the artificial intelligence engine analyzes time-based trends against baselines to identify anomalies, repetitive error, performance of decisions of the management team, miscalculation, and areas of manual override to nominate opportunities and risks to an organization or across organizations in a sector;

wherein the nomination engine generates a notification and posts the notification to at least one dashboard of the plurality of dashboards;

wherein the nomination engine creates a task for the web mining tool to collect information to fill a void and nominate the information for acceptance or rejection;

wherein the artificial intelligence engine receives input data from the management team, wherein the artificial intelligence stores the management team input, wherein the artificial intelligence engine modifies the scoring logic, nominations, application interfaces, and data trends based on the management team input;

wherein the artificial intelligence engine receives an acceptance or a rejection of the nomination;

wherein the artificial intelligence engine uses the acceptance or the rejection and the management team input as a training set for a future nomination by the artificial intelligence engine;

wherein the artificial intelligence engine provides predictive analysis impacts of decisions across the plurality of functionality tracks in numerical, textual, and graphical presentations and further provides multi-path decision indexing showing multiple paths for tradeoffs based on the training of the artificial intelligence engine;

wherein the artificial intelligence engine is trained based on the identified anomalies, the identified repetitive error, the identified performance of decisions of the management team, the identified miscalculation, and the identified areas of manual override to nominate opportunities and risks to an organization or across organizations in a sector;

wherein the artificial intelligence engine uses machine learning to train the web mining tool based on the management team input to identify technology for the startup company;

wherein the at least one server platform characterizes the risk and confidence of the startup company and/or the plurality of startup companies based on the alerts, insights and reports; and wherein the artificial intelligence engine includes a plurality of trade-offs of cost, risk, and time against the key areas of management, innovation, marketing and sales, and continuous market analysis as well as across phases within the startup company and/or the plurality of startup companies.

16. The system of claim 15, wherein the system reduces risk of at least one common point of failure for the startup company and/or the plurality of startup companies, wherein the startup company and/or the plurality of startup companies include early stage companies, spinoff companies, newly merged companies, a new division of a company, and/or a company directed to creating and brining a breakthrough, innovative technology to market, wherein the system further provides for a risk mitigating, repeatable, stage-gated process regulated by governance.

17. The system of claim 15, wherein the system automatically produces and harvests inherently normalized data, wherein the at least one server platform uses the normalized data for a plurality of startup companies.

18. The system of claim 15, wherein the system further includes a plurality of backend data enhancement and management decision aids.

19. The system of claim 15, wherein the system further includes automated machine learning and artificial intelligence methods, wherein the automated machine learning and artificial intelligence methods are trained to enhance and improve the management system.

20. The system of claim 15, wherein the system performs automatic quantitative assessment of opportunities and risks based on a plurality of confidence factors.

* * * * *